(12) United States Patent
Fujita et al.

(10) Patent No.: US 8,571,879 B2
(45) Date of Patent: Oct. 29, 2013

(54) SOUND REPRODUCING DEVICE ADDING AUDIO DATA TO DECODED SOUND USING PROCESSOR SELECTED BASED ON TRADE-OFFS

(75) Inventors: Takeshi Fujita, Osaka (JP); Hiroyuki Goto, Osaka (JP); Shinichi Akiyoshi, Osaka (JP); Shuhei Yamada, Osaka (JP); Masaharu Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 745 days.

(21) Appl. No.: 12/863,898

(22) PCT Filed: Jan. 14, 2009

(86) PCT No.: PCT/JP2009/000113
§ 371 (c)(1),
(2), (4) Date: Jul. 21, 2010

(87) PCT Pub. No.: WO2009/093421
PCT Pub. Date: Jul. 30, 2009

(65) Prior Publication Data
US 2010/0296676 A1    Nov. 25, 2010

(30) Foreign Application Priority Data
Jan. 21, 2008    (JP) .................................. 2008-010878

(51) Int. Cl.
*G10L 19/00*    (2013.01)
(52) U.S. Cl.
USPC ......................................................... 704/503
(58) Field of Classification Search
None
See application file for complete search history.

(56) References Cited

U.S. PATENT DOCUMENTS

| | | | |
|---|---|---|---|
| 5,847,303 A | 12/1998 | Matsumoto | |
| 6,094,638 A | 7/2000 | Ema et al. | |
| 7,302,303 B2 | 11/2007 | Reefman et al. | |
| 7,313,710 B1 | 12/2007 | Holmer | |
| 7,328,358 B1 | 2/2008 | Holmer | |

FOREIGN PATENT DOCUMENTS

| | | |
|---|---|---|
| JP | 10-187269 | 7/1998 |
| JP | 11-213558 | 8/1999 |
| JP | 2002-366179 | 12/2002 |
| JP | 2006-268931 | 10/2006 |
| JP | 2007-295144 | 11/2007 |

*Primary Examiner* — Talivaldis Ivars Smits
(74) *Attorney, Agent, or Firm* — McDermott Will & Emery LLP

(57) ABSTRACT

A sound reproducing device includes a decoder section (1200) configured to decode an audio-signal bit stream input from the outside world, and to generate a decoded PCM signal; a control section (1100) configured to identify reproduction conditions from reproduction-instruction information obtained from the outside world and decoding information obtained from the decoder section (1200), and to provide a reproduction instruction; and an additional-audio addition section (1500) configured to process additional audio data input from the outside world, to add a result with the decoded PCM signal, and to output a result as an output PCM signal. The additional-audio addition section (1500) includes an additional-audio generation section (1510) configured to process the additional audio data so that the additional audio data can be added with the decoded PCM signal, and to output a result as an additional-audio PCM signal, and an adder (1520) configured to mix the additional-audio PCM signal and the decoded PCM signal. The additional-audio generation section (1510) includes a plurality of processing means (1511 and 1512) depending on a trade-off between the amount of load of computation process in the processing and acoustic properties of a processing result. The control section (1100) identifies one of the plurality of processing means (1511 and 1512) based on the reproduction-instruction information and the decoding information. The additional-audio generation section (1510) processes the additional audio data by the processing means identified by the control section (1100).

18 Claims, 42 Drawing Sheets

FIG. 4

| Reproduction-Instruction Information (Specification of Collectively-Processed Acoustic Functions) / Decoding Information | None | Function A | Function B | Function A + Function B |
|---|---|---|---|---|
| AC3, FS=48kHz, Two-Channel | Processing Means 1 | Processing Means 1 | Processing Means 1 | Processing Means 1 |
| AC3, FS=48kHz, Multi-Channel | Processing Means 1 | Processing Means 1 | Processing Means 1 | Processing Means 2 |
| AAC, FS=48kHz, Two-Channel | Processing Means 1 | Processing Means 1 | Processing Means 1 | Processing Means 1 |
| AAC, FS=48kHz, Multi-Channel | Processing Means 1 | Processing Means 1 | Processing Means 1 | Processing Means 2 |
| Linear PCM, FS=48kHz, Two-Channel | Processing Means 1 | Processing Means 1 | Processing Means 1 | Processing Means 1 |
| Linear PCM, FS=96kHz, Two-Channel | Processing Means 1 | Processing Means 1 | Processing Means 1 | Processing Means 1 |
| Linear PCM, FS=48kHz, Multi-Channel | Processing Means 1 | Processing Means 1 | Processing Means 1 | Processing Means 2 |
| Linear PCM, FS=96kHz, Multi-Channel | Processing Means 1 | Processing Means 1 | Processing Means 2 | Processing Means 2 |

FIG. 9

| Reproduction-Instruction Information (Specification of Collectively-Processed Acoustic Functions) / Decoding Information | None | Function A | Function B | Function A + Function B |
|---|---|---|---|---|
| AC3, FS=48kHz, Two-Channel | Externally Input | Externally Input | Externally Input | Externally Input |
| AC3, FS=48kHz, Multi-Channel | Externally Input | Externally Input | Externally Input | Internally Installed |
| AAC, FS=48kHz, Two-Channel | Externally Input | Externally Input | Externally Input | Externally Input |
| AAC, FS=48kHz, Multi-Channel | Externally Input | Externally Input | Externally Input | Internally Installed |
| Linear PCM, FS=48kHz, Two-Channel | Externally Input | Externally Input | Externally Input | Externally Input |
| Linear PCM, FS=96kHz, Two-Channel | Externally Input | Externally Input | Externally Input | Externally Input |
| Linear PCM, FS=48kHz, Multi-Channel | Externally Input | Externally Input | Externally Input | Internally Installed |
| Linear PCM, FS=96kHz, Multi-Channel | Externally Input | Externally Input | Internally Installed | Internally Installed |

| Remaining Amount of PCM Output Buffer | Means to Select |
|---|---|
| At or Above Preset Threshold | Processing Means 1 |
| Below Preset Threshold | Processing Means 2 |

FIG. 18

| Remaining Amount of Additional-Audio-Data Input Buffer | Means to Select |
|---|---|
| Below Preset Threshold | Processing Means 1 |
| At or Above Preset Threshold | Processing Means 2 |

FIG. 22

| Reproduction-Instruction Information (Specification of Collectively-Processed Acoustic Functions) / Decoding Information | None | Function A | Function B | Function A + Function B |
|---|---|---|---|---|
| AC3, FS=48kHz, Two-Channel | None | Function A : Normal Mode | Function B : Normal Mode | Function A : Normal Mode<br>Function B : Normal Mode |
| AC3, FS=48kHz, Multi-Channel | None | Function A : Normal Mode | Function B : Normal Mode | Function A : Normal Mode<br>Function B : Simple Mode |
| AAC, FS=48kHz, Two-Channel | None | Function A : Normal Mode | Function B : Normal Mode | Function A : Normal Mode<br>Function B : Normal Mode |
| AAC, FS=48kHz, Multi-Channel | None | Function A : Normal Mode | Function B : Normal Mode | Function A : Normal Mode<br>Function B : Simple Mode |
| Linear PCM, FS=48kHz, Two-Channel | None | Function A : Normal Mode | Function B : Normal Mode | Function A : Normal Mode<br>Function B : Normal Mode |
| Linear PCM, FS=96kHz, Two-Channel | None | Function A : Normal Mode | Function B : Normal Mode | Function A : Normal Mode<br>Function B : Simple Mode |
| Linear PCM, FS=48kHz, Multi-Channel | None | Function A : Normal Mode | Function B : Normal Mode | Function A : Normal Mode<br>Function B : Simple Mode |
| Linear PCM, FS=96kHz, Multi-Channel | None | Function A : Normal Mode | Function B : Simple Mode | Function A : Simple Mode<br>Function B : Reduced Mode |

FIG. 27

| Reproduction-Instruction Information (Specification of Collectively-Processed Acoustic Functions) / Decoding Information | None | Function A | Function B (FS=96 kHz in Reproduction) | Function A + Function B (FS=96 kHz in Reproduction) |
|---|---|---|---|---|
| AC3, FS=48kHz, Two-Channel | Normal Flow | Normal Flow | Normal Flow | Normal Flow |
| AC3, FS=48kHz, Multi-Channel | Normal Flow | Normal Flow | Normal Flow | Additional-Audio Addition Process Precedes |
| AAC, FS=48kHz, Two-Channel | Normal Flow | Normal Flow | Normal Flow | Normal Flow |
| AAC, FS=48kHz, Multi-Channel | Normal Flow | Normal Flow | Normal Flow | Additional-Audio Addition Process Precedes |
| Linear PCM, FS=48kHz, Two-Channel | Normal Flow | Normal Flow | Normal Flow | Normal Flow |
| Linear PCM, FS=96kHz, Two-Channel | Normal Flow | Normal Flow | Normal Flow | Normal Flow |
| Linear PCM, FS=48kHz, Multi-Channel | Normal Flow | Normal Flow | Normal Flow | Additional-Audio Addition Process Precedes |
| Linear PCM, FS=96kHz, Multi-Channel | Normal Flow | Normal Flow | Normal Flow | Normal Flow |

FIG. 29

| Reproduction-Instruction Information (Specification of Collectively-Processed Acoustic Functions) / Decoding Information | None | Function A | Function B | Function A + Function B |
|---|---|---|---|---|
| AC3, FS=48kHz, Two-Channel | Pointer 1 | Pointer 1 | Pointer 1 | Pointer 1 |
| AC3, FS=48kHz, Multi-Channel | Pointer 1 | Pointer 1 | Pointer 1 | Pointer 2 |
| AAC, FS=48kHz, Two-Channel | Pointer 1 | Pointer 1 | Pointer 1 | Pointer 1 |
| AAC, FS=48kHz, Multi-Channel | Pointer 1 | Pointer 1 | Pointer 1 | Pointer 2 |
| Linear PCM, FS=48kHz, Two-Channel | Pointer 1 | Pointer 1 | Pointer 1 | Pointer 1 |
| Linear PCM, FS=96kHz, Two-Channel | Pointer 1 | Pointer 1 | Pointer 1 | Pointer 1 |
| Linear PCM, FS=48kHz, Multi-Channel | Pointer 1 | Pointer 1 | Pointer 2 | Pointer 2 |
| Linear PCM, FS=96kHz, Multi-Channel | Pointer 1 | Pointer 1 | Pointer 2 | Pointer 2 |

FIG. 30

| Processing-Means Pointer Information / Use Case Information | Pointer 1 | Pointer 2 |
|---|---|---|
| Use Case 1 | Processing Means 1 | Processing Means 2 |
| Use Case 2 | Processing Means 1 | Processing Means 1 |
| Use Case 3 | Processing Means 2 | Processing Means 3 |

FIG. 33

Acoustic-Processing Load-Condition Decision Table 1110c

| Reproduction-Instruction Information (Specification of Collectively-Processed Acoustic Functions) / Decoding Information | None | Function A | Function B | Function A + Function B |
|---|---|---|---|---|
| AC3、FS=48kHz、Two-Channel | 1 | 1 | 1 | 1 |
| AC3、FS=48kHz、Multi-Channel | 1 | 1 | 1 | 2 |
| AAC、FS=48kHz、Two-Channel | 1 | 1 | 1 | 1 |
| AAC、FS=48kHz、Multi-Channel | 1 | 1 | 1 | 2 |
| Linear PCM、FS=48kHz、Two-Channel | 1 | 1 | 1 | 1 |
| Linear PCM、FS=96kHz、Two-Channel | 1 | 1 | 1 | 1 |
| Linear PCM、FS=48kHz、Multi-Channel | 1 | 1 | 1 | 2 |
| Linear PCM、FS=96kHz、Multi-Channel | 1 | 1 | 2 | 2 |

Use-Case-Information Conversion Table 1110d

| Use Case Information | Differential Pointer Value |
|---|---|
| Use Case 1 | 1 |
| Use Case 2 | 0 |
| Use Case 3 | 2 |

Pointer-Information Conversion Table 1110e

| Total Pointer Value | Processing Means |
|---|---|
| 0 | Processing Means 1 |
| 1 | Processing Means 1 |
| 2 | Processing Means 2 |
| 3 | Processing Means 2 |
| 4 | Processing Means 3 |
| 5 | Processing Means 3 |

FIG. 35

Acoustic-Processing Load-Condition Decision Table 1110c

| Reproduction-Instruction Information (Specification of Collectively-Processed Acoustic Functions) / Decoding Information | None | Function A | Function B | Function A + Function B |
|---|---|---|---|---|
| AC3, FS=48kHz, Two-Channel | 1 | 1 | 1 | 1 |
| AC3, FS=48kHz, Multi-Channel | 1 | 1 | 1 | 2 |
| AAC, FS=48kHz, Two-Channel | 1 | 1 | 1 | 1 |
| AAC, FS=48kHz, Multi-Channel | 1 | 1 | 1 | 2 |
| Linear PCM, FS=48kHz, Two-Channel | 1 | 1 | 1 | 1 |
| Linear PCM, FS=96kHz, Two-Channel | 1 | 1 | 1 | 1 |
| Linear PCM, FS=48kHz, Multi-Channel | 1 | 1 | 1 | 2 |
| Linear PCM, FS=96kHz, Multi-Channel | 1 | 1 | 2 | 2 |

Use-Case-Information Conversion Table 1110d

| Use Case Information | Differential Pointer Value |
|---|---|
| Use Case 1 | 1 |
| Use Case 2 | 0 |
| Use Case 3 | 2 |

Pointer-Information Conversion Table 1110e

| Total Pointer Value | External-Audio Generation Condition |
|---|---|
| 0 | Externally Input |
| 1 | Externally Input |
| 2 | Internally Installed |
| 3 | Internally Installed |
| 4 | Internally Installed |
| 5 | Internally Installed |

FIG. 37

Decoding-Process Load-Condition Conversion Table 1140a

| Decoding Information | Pointer Value |
|---|---|
| AC3, FS=48kHz, Two-Channel | 0 |
| AC3, FS=48kHz, Multi-Channel | 3 |
| AAC, FS=48kHz, Two-Channel | 1 |
| AAC, FS=48kHz, Multi-Channel | 3 |
| Linear PCM, FS=48kHz, Two-Channel | 0 |
| Linear PCM, FS=96kHz, Two-Channel | 2 |
| Linear PCM, FS=48kHz, Multi-Channel | 2 |
| Linear PCM, FS=96kHz, Multi-Channel | 5 |

Use-Case-Information Conversion Table 1140b

| Use Case Information | Differential Pointer Value |
|---|---|
| Use Case 1 | 1 |
| Use Case 2 | 0 |
| Use Case 3 | 2 |

Acoustic-Processing Load-Condition Decision Table 1140c

| Reproduction-Instruction Information (Specification of Collectively-Processed Acoustic Functions) / Total Pointer Value | None | Function A | Function B | Function A + Function B |
|---|---|---|---|---|
| 0 | None | Function A : Normal Mode | Function B : Normal Mode | Function A : Normal Mode  Function B : Normal Mode |
| 1 | None | Function A : Normal Mode | Function B : Normal Mode | Function A : Normal Mode  Function B : Normal Mode |
| 2 | None | Function A : Normal Mode | Function B : Normal Mode | Function A : Normal Mode  Function B : Normal Mode |
| 3 | None | Function A : Normal Mode | Function B : Normal Mode | Function A : Normal Mode  Function B : Normal Mode |
| 4 | None | Function A : Normal Mode | Function B : Normal Mode | Function A : Normal Mode  Function B : Simple Mode |
| 5 | None | Function A : Normal Mode | Function B : Normal Mode | Function A : Normal Mode  Function B : Simple Mode |
| 6 | None | Function A : Normal Mode | Function B : Simple Mode | Function A : Simple Mode  Function B : Simple Mode |
| 7 | None | Function A : Normal Mode | Function B : Simple Mode | Function A : Simple Mode  Function B : Reduced Mode |

FIG. 39

Decoding-Process Load-Condition Conversion Table 1150a

| Decoding Information | Pointer Value |
|---|---|
| AC3, FS=48kHz, Two-Channel | 0 |
| AC3, FS=48kHz, Multi-Channel | 3 |
| AAC, FS=48kHz, Two-Channel | 1 |
| AAC, FS=48kHz, Multi-Channel | 3 |
| Linear PCM, FS=48kHz, Two-Channel | 0 |
| Linear PCM, FS=96kHz, Two-Channel | 2 |
| Linear PCM, FS=48kHz, Multi-Channel | 2 |
| Linear PCM, FS=96kHz, Multi-Channel | 5 |

Use-Case-Information Conversion Table 1150b

| Use Case Information | Differential Pointer Value |
|---|---|
| Use Case 1 | 1 |
| Use Case 2 | 0 |
| Use Case 3 | 2 |

Process-Flow Decision Table 1150c

| Reproduction-Instruction Information (Specification of Collectively-Processed Acoustic Functions) / Total Pointer Value | None | Function A | Function B (FS=96 kHz in Reproduction) | Function A + Function B (FS=96 kHz in Reproduction) |
|---|---|---|---|---|
| 0 | Normal Flow | Normal Flow | Normal Flow | Normal Flow |
| 1 | Normal Flow | Normal Flow | Normal Flow | Additional-Audio Addition Process Precedes |
| 2 | Normal Flow | Normal Flow | Normal Flow | Normal Flow |
| 3 | Normal Flow | Normal Flow | Normal Flow | Additional-Audio Addition Process Precedes |
| 4 | Normal Flow | Normal Flow | Normal Flow | Normal Flow |
| 5 | Normal Flow | Normal Flow | Normal Flow | Additional-Audio Addition Process Precedes |
| 6 | Normal Flow | Normal Flow | Normal Flow | Normal Flow |
| 7 | Normal Flow | Normal Flow | Normal Flow | Normal Flow |

SOUND REPRODUCING DEVICE ADDING AUDIO DATA TO DECODED SOUND USING PROCESSOR SELECTED BASED ON TRADE-OFFS

RELATED APPLICATIONS

This application is the U.S. National Phase under 35 U.S.C. §371 of International Application No. PCT/JP2009/000113, filed on Jan. 14, 2009, which in turn claims the benefit of Japanese Application No. 2008-010878, filed on Jan. 21, 2008, the disclosures of which Applications are incorporated by reference herein.

TECHNICAL FIELD

The present invention relates to digital signal processing technologies, and more particularly to sound reproducing devices which decode audio-signal bit streams input from the outside world, and generate decoded PCM signals; then process additional audio data input from the outside world, add the additional audio data with the decoded PCM signals, and output the results to the outside world.

BACKGROUND ART

In recent years, media-content reproducing apparatuses involving digital processing have been providing various functions due to technological advancement and increasing availability of various digital media-content reproducing apparatuses such as digital television systems and optical disk devices. As functions within such a background, for example, functions are more often provided than ever in such apparatuses to mix main audio of digital television broadcast or disk-content-reproduced audio with external audio such as guidance audio or an alert sound, and to output the mixed audio. Furthermore, if such a mixing process of external audio is implemented in a same apparatus, especially in a semiconductor device such as a system LSI, there is an increasing demand to implement these processes all at once, from decoding and reproduction processes of bit streams, through acoustic processing of reproduced sound, to a mixing process with external audio, in order to minimize the cost drivers in relation to functionality expansion.

A sound reproducing device for meeting such a demand is achieved by, for example, a configuration as shown in FIG. 41.

A sound reproducing device 7000 shown in FIG. 41 includes a control section 1100, a decoder section 1200, a sampling-frequency conversion section 1300, an acoustic processing section 1400, and an additional-audio addition section 1500. The additional-audio addition section 1500 includes therein an additional-audio generation section 1510 and an adder 1520.

Functions provided in the acoustic processing section 1400 include, for example, a sound-quality enhancement process involving an oversampling process, a sound-quality adjustment function for setting speakers, a channel expansion process, sound-volume processing, etc.; the acoustic processing section 1400 is instructed to perform these processes through the control section 1100 from the outside world.

A reproduction process by the sound reproducing device 7000 is performed according to the flowchart shown in FIGS. 42-43.

First, the decoder section 1200 decodes an audio bit stream input from the outside world, generates a decoded PCM signal (ST701 and ST702), and then outputs decoding information to the control section 1100, including decoder type information, sampling frequency information, channel configuration information, etc. (ST703), which are obtained when decoding the audio bit stream.

The control section 1100 receives reproduction-instruction information from the outside world and the decoding information from the decoder section 1200 (ST705), and determines whether or not to perform sampling frequency conversion and whether or not to perform various acoustic processing on the decoded PCM signal (ST706 and ST707). For example, the reproduction-instruction information received from the outside world includes instructions on acoustic processing including, among others, a sound-quality enhancement process involving an oversampling process provided in the acoustic processing section 1400. Here, a case where an instruction on a sound-quality enhancement process involving an oversampling process is provided will be described as an example. In this case, since the reproduction-instruction information received from the outside world includes an instruction on a sound-quality enhancement process involving an oversampling process, the sampling frequency of the output PCM signal output from the sound reproducing device 7000 is different from the sampling frequency of the decoded PCM signal, but is equal to a sampling frequency after the oversampling process. For example, if the decoded PCM signal is at 48 kHz, and the sampling frequency for the sound-quality enhancement process is 96 kHz, then the sampling frequency of the output PCM signal is 96 kHz.

In such a case, since the control section 1100 determines that sampling frequency conversion should be performed (No at ST707), the control section 1100 instructs the sampling-frequency conversion section 1300 on an oversampling process of the decoded PCM signal (ST708), and the sampling-frequency conversion section 1300 performs an oversampling process according to the instruction of the control section 1100 (ST709).

Next, the acoustic processing section 1400 receives the reproduction-instruction information from the control section 1100 (ST710), and performs the acoustic processing on the decoded PCM signal according to the instruction (ST711). Since the reproduction-instruction information here includes a sound-quality enhancement process, the acoustic processing includes the sound-quality enhancement process.

Then, the control section 1100 transmits the sampling frequency information on the output PCM signal to the additional-audio addition section 1500, and instructs the additional-audio addition section 1500 to generate an additional-audio PCM signal, and to add the additional-audio PCM signal with the decoded PCM signal after the acoustic processing (ST712).

The additional-audio addition section 1500 first receives the additional audio data form the outside world (ST713), and generates the additional-audio PCM signal in the additional-audio generation section 1510 therein (ST714). Since, at this stage, the sampling frequency of the additional-audio PCM signal needs to be the same as that of the decoded PCM signal after the acoustic processing, the process of generating the additional-audio PCM signal includes an oversampling process to convert the sampling frequency to 96 kHz. In addition, the additional-audio PCM signal generated in the additional-audio generation section 1510 and the decoded PCM signal on which the acoustic processing has been performed in the acoustic processing section 1400 are added together by the adder 1520 (ST715), and the result is output to the outside world as the output PCM signal (ST716).

Performing the processes described above achieves the mixing process of the decoded PCM signal obtained from an audio bit stream and the additional audio data input from the outside world.

Note that Patent Document 1 describes one of the technologies similar to this conventional example. Patent Document 1 relates to a process to mix a plurality of digital audio data different from each other in sampling frequencies, and the object is to achieve a mixing process throughout in the form of digital signals.

CITATION LIST

Patent Document

PATENT DOCUMENT 1: Japanese Patent Publication No. H11-213558

SUMMARY OF THE INVENTION

Technical Problem

When a sound reproducing device described above is implemented, there will be decoding process of audio bit streams; various acoustic processing such as a sound-quality enhancement process involving an oversampling process as needed, a sound-quality adjustment function for setting speakers, a channel expansion process, and sound-volume processing; and conversion and addition processes of the additional audio data input from the outside world.

However, when these processes are performed, difference in properties of the streams to decode and in acoustic processing functions required, as well as involvement of additional-audio-data processing cause required processing capability to vary depending on the properties of streams and reproduction conditions if the above processes are implemented in a same device. Especially, for example, if the sampling frequency of a reproduced PCM is increased due to the properties of a bit stream and/or a demand for reproduction with a sound-quality enhancement process, the amount of processing required for a processing process of external audio is increased accordingly, thus the amount of processing in the entire sound reproducing device may exceed the limit of ability thereof.

Furthermore, in order to avoid such a situation, it is required to reduce the sampling frequency of the reproduced PCM; however, this may cause sound quality degradation of decoded PCM and may hinder a sound-quality enhancement process requested from the outside world from being performed.

Thus, it is an object of the present invention to reduce the limitation of processing ability and sound quality degradation which occur depending on the respective decoding conditions for various bit streams and the respective reproduction conditions of acoustic processing, and to achieve a mixing process with additional audio as easily as possible and in an optimal condition.

Solution to the Problem

A first sound reproducing device according to the present invention includes a decoder section configured to decode an audio-signal bit stream input from the outside world, and to generate a decoded PCM signal, a control section configured to identify reproduction conditions from reproduction-instruction information obtained from the outside world and decoding information obtained from the decoder section, and to provide a reproduction instruction, and an additional-audio addition section configured to process additional audio data input from the outside world, to add a result with the decoded PCM signal, and to output a result as an output PCM signal, where the additional-audio addition section includes an additional-audio generation section configured to process the additional audio data so that the additional audio data can be added with the decoded PCM signal, and to output a result as an additional-audio PCM signal, and an adder configured to mix the additional-audio PCM signal and the decoded PCM signal; the additional-audio generation section includes a plurality of processing means depending on a trade-off between the amount of load of computation process in the processing and acoustic properties of a processing result; the control section identifies one of the plurality of processing means based on the reproduction-instruction information and the decoding information; and the additional-audio generation section processes the additional audio data by the processing means identified by the control section.

A second sound reproducing device according to the present invention further includes, with respect to the first sound reproducing device, a sampling-frequency conversion section configured to perform sampling-frequency conversion processing on the decoded PCM signal according to the reproduction instruction transmitted from the control section.

A third sound reproducing device according to the present invention further includes, with respect to the first or the second sound reproducing device, an acoustic processing section configured to perform acoustic processing on the decoded PCM signal according to the reproduction instruction transmitted from the control section.

A fourth sound reproducing device according to the present invention is characterized in that, in any one of the first to the third sound reproducing devices, the control section includes an external-audio generation-condition decision table in which combinations of the decoding information and the reproduction-instruction information and ones of the plurality of processing means are associated.

According to the first to the fourth sound reproducing devices, even if required by properties of reproduced bit streams, even with a reproduction request involving a sound-quality enhancement process, or even if the sampling frequency of the reproduced PCM is high, the processing load during a processing process of an external audio associated with the reproduction conditions can be minimized, thereby allowing the amount of processing of each entire sound reproducing device to be more easily prevented accordingly from exceeding the limit of ability thereof. In addition, this can be achieved by only adjusting the load of the audio processing means in generating the additional audio, and there is no need to reduce the sampling frequency of the output PCM signal; therefore, sound quality degradation of the PCM decoded by the decoder section can be reduced, and a sound-quality enhancement process requested from the outside world can be implemented.

A fifth sound reproducing device according to the present invention is characterized in that, in any one of the first to the third sound reproducing devices, the sound reproducing device is implemented on a single processor (system) together with other processing devices, and the control section identifies the one of the plurality of processing means based on system load information and on the reproduction-instruction information obtained from the outside world, and on the decoding information.

A sixth sound reproducing device according to the present invention includes a decoder section configured to decode an audio-signal bit stream input from the outside world, and to generate a decoded PCM signal, a control section configured to identify reproduction conditions from reproduction-instruction information obtained from the outside world and decoding information obtained from the decoder section, and to provide a reproduction instruction, an acoustic processing section configured to perform acoustic processing on the decoded PCM signal generated in the decoder section, and an additional-audio addition section configured to process additional audio data input from the outside world, to add a result with the decoded PCM signal on which the acoustic processing is performed by the acoustic processing section, and to output a result as an output PCM signal, where the additional-audio addition section includes an additional-audio generation section configured to process the additional audio data input from the outside world so that the additional audio data can be added with the decoded PCM signal, and to output a result as an additional-audio PCM signal, and an adder configured to mix the additional-audio PCM signal and the decoded PCM signal; the control section identifies processing load based on the reproduction-instruction information and the decoding information, and identifies acoustic processing conditions in the acoustic processing section according to the processing load; and the acoustic processing section performs the acoustic processing on the decoded PCM signal according to the acoustic processing conditions identified by the control section.

A seventh sound reproducing device according to the present invention is characterized in that, in the sixth sound reproducing device, the control section includes an acoustic-processing-condition decision table in which combinations of the decoding information and the reproduction-instruction information and the acoustic processing conditions are associated.

An eighth sound reproducing device according to the present invention further includes, with respect to the sixth or the seventh sound reproducing device, a sampling-frequency conversion section configured to perform sampling-frequency conversion processing on the decoded PCM signal generated in the decoder section, according to the reproduction instruction transmitted from the control section.

According to the sixth to the eighth sound reproducing devices, even if required by properties of reproduced bit streams, even with a reproduction request involving a sound-quality enhancement process, or even if the sampling frequency of the reproduced PCM signal is high, the amount of processing of each entire sound reproducing device can be more easily prevented accordingly from exceeding the limit of ability thereof by skipping a portion of the processing, or switching to simple reproduction, with respect to the acoustic processing section. In such a case, since a portion of the processing is skipped, or switching is made to simple reproduction with respect to the acoustic processing section, required acoustic processing may not be fully performed depending on the reproduction conditions; however, higher priority processes can be effectively performed for a limited amount of processing.

A ninth sound reproducing device according to the present invention is characterized in that, in the sixth sound reproducing device, the sound reproducing device is implemented on a single processor (system) together with other processing devices, and the control section identifies processing load based on system load information and on the reproduction-instruction information obtained from the outside world, and on the decoding information, and identifies the acoustic processing conditions in the acoustic processing section according to the processing load.

A tenth sound reproducing device according to the present invention includes a decoder section configured to decode an audio-signal bit stream input from the outside world, and to generate a decoded PCM signal, a control section configured to identify reproduction conditions from reproduction-instruction information obtained from the outside world and decoding information obtained from the decoder section, and to provide a reproduction instruction, a sampling-frequency conversion section configured to perform sampling-frequency conversion processing on the decoded PCM signal generated in the decoder section, according to the reproduction instruction transmitted from the control section, an acoustic processing section configured to perform acoustic processing on the decoded PCM signal output from the decoder section or output from the sampling-frequency conversion section, according to the reproduction instruction transmitted from the control section, and an additional-audio addition section configured to process additional audio data input from the outside world, to add a result with the decoded PCM signal output from the decoder section or output from the acoustic processing section, and to output a result as an output PCM signal, where the additional-audio addition section includes an additional-audio generation section configured to process the additional audio data input from the outside world so that the additional audio data can be added with the decoded PCM signal, and to output a result as an additional-audio PCM signal, and an adder configured to mix the additional-audio PCM signal and the decoded PCM signal; and the control section identifies processing load based on the reproduction-instruction information and the decoding information, and determines, depending on the processing load, a processing order of the sampling-frequency conversion processing by the sampling-frequency conversion section and the processing and the additive processes of the additional audio data by the additional-audio addition section.

An eleventh sound reproducing device according to the present invention is characterized in that, in the tenth sound reproducing device, the control section includes a process-flow decision table in which combinations of the decoding information and the reproduction-instruction information, and the processing order of the sampling-frequency conversion processing by the sampling-frequency conversion section and the processing and the additive processes of the additional audio data by the additional-audio addition section are associated.

According to the tenth to the eleventh sound reproducing devices, since the processing order of the sampling-frequency conversion processing and the processing and the additive processes of the additional audio data is determined depending on the processing load, for example, the processing load of the sampling-frequency conversion generated during the processing process of the additional audio data can be reduced by configuring such that if the processing load is high, the processing and the additive processes of the additional audio data are performed at a stage earlier than the sampling-frequency conversion processing, thereby allowing the amount of processing of each entire sound reproducing device to be more easily prevented accordingly from exceeding the limit of ability thereof. In such a case, since the acoustic processing is performed after the mixing process of the additional audio, the acoustic processing is also performed on the additional audio; however, there is no need to reduce the sampling frequency of the output PCM signal, thus sound quality degradation of the PCM decoded by the decoder section can be reduced, and a sound-quality enhancement process requested from the outside world can be implemented.

A twelfth sound reproducing device according to the present invention is characterized in that, in the tenth sound reproducing device, the sound reproducing device is implemented on a single processor (system) together with other processing devices, and the control section identifies processing load based on system load information and on the reproduction-instruction information obtained from the outside world, and on the decoding information, and determines, depending on the processing load, a processing order of the sampling-frequency conversion processing by the sampling-frequency conversion section and the processing and the additive processes of the additional audio data by the additional-audio addition section.

A thirteenth sound reproducing device according to the present invention includes a decoder section configured to decode an audio-signal bit stream input from the outside world, and to generate a decoded PCM signal, a control section configured to identify reproduction conditions from reproduction-instruction information obtained from the outside world and decoding information obtained from the decoder section, and to provide a reproduction instruction, an internally-installed-additional-audio-data buffer configured to store additional audio data installed in the sound reproducing device (internally-installed additional audio data), and an additional-audio addition section configured to process additional audio data input from the outside world (externally-input additional audio data) or the internally-installed additional audio data, to add a result with the decoded PCM signal, and to output a result as an output PCM signal, where the control section identifies the externally-input additional audio data or the internally-installed additional audio data based on the reproduction-instruction information and the decoding information, and the additional-audio addition section includes an additional-audio generation section configured to process the externally-input additional audio data or the internally-installed additional audio data, whichever has been identified by the control section, so that the identified additional audio data can be added with the decoded PCM signal, and to output a result as an additional-audio PCM signal, and an adder configured to mix the additional-audio PCM signal and the decoded PCM signal.

A fourteenth sound reproducing device according to the present invention further includes, with respect to the thirteenth sound reproducing device, a sampling-frequency conversion section configured to perform sampling-frequency conversion processing on the decoded PCM signal according to the reproduction instruction transmitted from the control section.

A fifteenth sound reproducing device according to the present invention further includes, with respect to the thirteenth or the fourteenth sound reproducing device, an acoustic processing section configured to perform acoustic processing on the decoded PCM signal according to the reproduction instruction transmitted from the control section.

A sixteenth sound reproducing device according to the present invention is characterized in that, in any one of the thirteenth to the fifteenth sound reproducing devices, the control section includes an external-audio generation-condition decision table in which combinations of the decoding information and the reproduction-instruction information and information indicating the externally-input additional audio data or the internally-installed additional audio data are associated.

According to the thirteenth to the sixteenth sound reproducing devices, even if required by properties of reproduced bit streams, even with a reproduction request involving a sound-quality enhancement process, or even if the sampling frequency of the reproduced PCM is high, for example, providing the internally-installed-additional-audio-data buffer with additional audio data corresponding to the entire sampling frequency range required for reproduction allows the sampling-frequency conversion processing to be skipped when generating an additional-audio PCM signal from the additional audio by using the internally-installed additional audio data if the processing load is high; therefore, the processing load during a processing process of an external audio associated with the reproduction conditions can be minimized, thereby allowing the amount of processing of each entire sound reproducing device to be more easily prevented accordingly from exceeding the limit of ability thereof. In this case, although sound sources of the additional audio data are limited due to usage of the internally-installed additional audio data, there is no need to reduce the sampling frequency of the output PCM signal, thus sound quality degradation of the PCM decoded by the decoder section can be reduced, and a sound-quality enhancement process requested from the outside world can be implemented.

A seventeenth sound reproducing device according to the present invention is characterized in that, in any one of the thirteenth to the fifteenth sound reproducing devices, the sound reproducing device is implemented on a single processor (system) together with other processing devices, and the control section identifies the externally-input additional audio data or the internally-installed additional audio data based on system load information and on the reproduction-instruction information obtained from the outside world, and on the decoding information.

An eighteenth sound reproducing device according to the present invention includes a decoder section configured to decode an audio-signal bit stream input from the outside world, and to generate a decoded PCM signal, a control section configured to identify reproduction conditions from reproduction-instruction information obtained from the outside world and decoding information obtained from the decoder section, and to provide a reproduction instruction, an additional-audio addition section configured to process additional audio data input from the outside world, to add a result with the decoded PCM signal, and to output a result as an output PCM signal, and a PCM output buffer configured to accumulate the output PCM signals output from the additional-audio addition section, where the additional-audio addition section includes an additional-audio generation section configured to process the additional audio data so that the additional audio data can be added with the decoded PCM signal, and to output a result as an additional-audio PCM signal, and an adder configured to mix the additional-audio PCM signal and the decoded PCM signal; the additional-audio generation section includes a plurality of processing means depending on a trade-off between the amount of load of computation process in the processing and acoustic properties of a processing result; the control section includes a PCM-output-buffer remaining-amount monitoring means configured to monitor a remaining amount of the output PCM signals of the PCM output buffer, and identifies one of the plurality of processing means based on the remaining amount status of the output PCM signals of the PCM output buffer; and the additional-audio generation section processes the additional audio data by the processing means identified by the control section.

According to the eighteenth sound reproducing device, it is possible to monitor the remaining amount of the PCM output buffer, to determine that the processing load is high depending on the remaining amount status (e.g., when the PCM output buffer is almost in an underflow state), and to switch the additional-audio generation methods; therefore, the processing load of each entire sound reproducing device can be more easily adjusted.

A nineteenth sound reproducing device according to the present invention includes a decoder section configured to decode an audio-signal bit stream input from the outside world, and to generate a decoded PCM signal, a control section configured to identify reproduction conditions from reproduction-instruction information obtained from the outside world and decoding information obtained from the decoder section, and to provide a reproduction instruction, an additional-audio-data input buffer configured to accumulate additional audio data input from the outside world, and an additional-audio addition section configured to process the additional audio data accumulated in the additional-audio-data input buffer, to add a result with the decoded PCM signal, and to output a result as an output PCM signal, where the additional-audio addition section includes an additional-audio generation section configured to process the additional audio data so that the additional audio data can be added with the decoded PCM signal, and to output a result as an additional-audio PCM signal, and an adder configured to mix the additional-audio PCM signal and the decoded PCM signal; the additional-audio generation section includes a plurality of processing means depending on a trade-off between the amount of load of computation process in the processing and acoustic properties of a processing result; the control section includes an additional-audio-data-input-buffer remaining-amount monitoring means configured to monitor a remaining amount of the additional audio data of the additional-audio-data input buffer, and identifies one of the plurality of processing means based on the remaining amount status of the additional audio data of the additional-audio-data input buffer; and the additional-audio generation section processes the additional audio data by the processing means identified by the control section.

According to the nineteenth sound reproducing device, it is possible to monitor the remaining amount of the additional-audio-data input buffer, to determine that the processing load is high depending on the remaining amount status (e.g., when the additional-audio-data input buffer is almost in an overflow state), and to switch the additional audio generation methods; therefore, the processing load of each entire sound reproducing device can be more easily adjusted.

Advantages of the Invention

According to a sound reproducing device of the present invention, even when the processing load increases depending on a decoding process and/or a reproduction condition, the processing load can be attempted to be reduced internally and automatically; therefore, the limitation of processing capability and sound quality degradation which occur for every decoding condition for various bit streams and every reproduction condition of acoustic processing can be reduced, and a mixing process with additional audio can be achieved as easily as possible and in an optimal condition.

BRIEF DESCRIPTION OF THE DRAWINGS

FIG. 4 shows an example of an external-audio generation-condition decision table.
FIG. 9 shows an example of an external-audio generation-condition decision table.
FIG. 18 shows an example of an external-audio generation-condition decision table.
FIG. 22 shows an example of an acoustic-processing-condition decision table.
FIG. 27 shows an example of an external-audio generation-condition decision table.
FIG. 29 shows an example of an acoustic-processing load-condition decision table.
FIG. 30 shows an example of a processing-means selection table.
FIG. 33 shows examples of an acoustic-processing load-condition decision table, a use-case-information conversion table, and a pointer-information conversion table according to the eighth embodiment.

FIG. 35 shows examples of an acoustic-processing load-condition decision table, a use-case-information conversion table, and a pointer-information conversion table according to the ninth embodiment.

FIG. 37 shows examples of a decoding-process load-condition conversion table, a use-case-information conversion table, and an acoustic-processing load-condition decision table according to the tenth embodiment.

FIG. 39 shows examples of a decoding-process load-condition conversion table, a use-case-information conversion table, and a process-flow decision table according to the eleventh embodiment.

Figure 1:
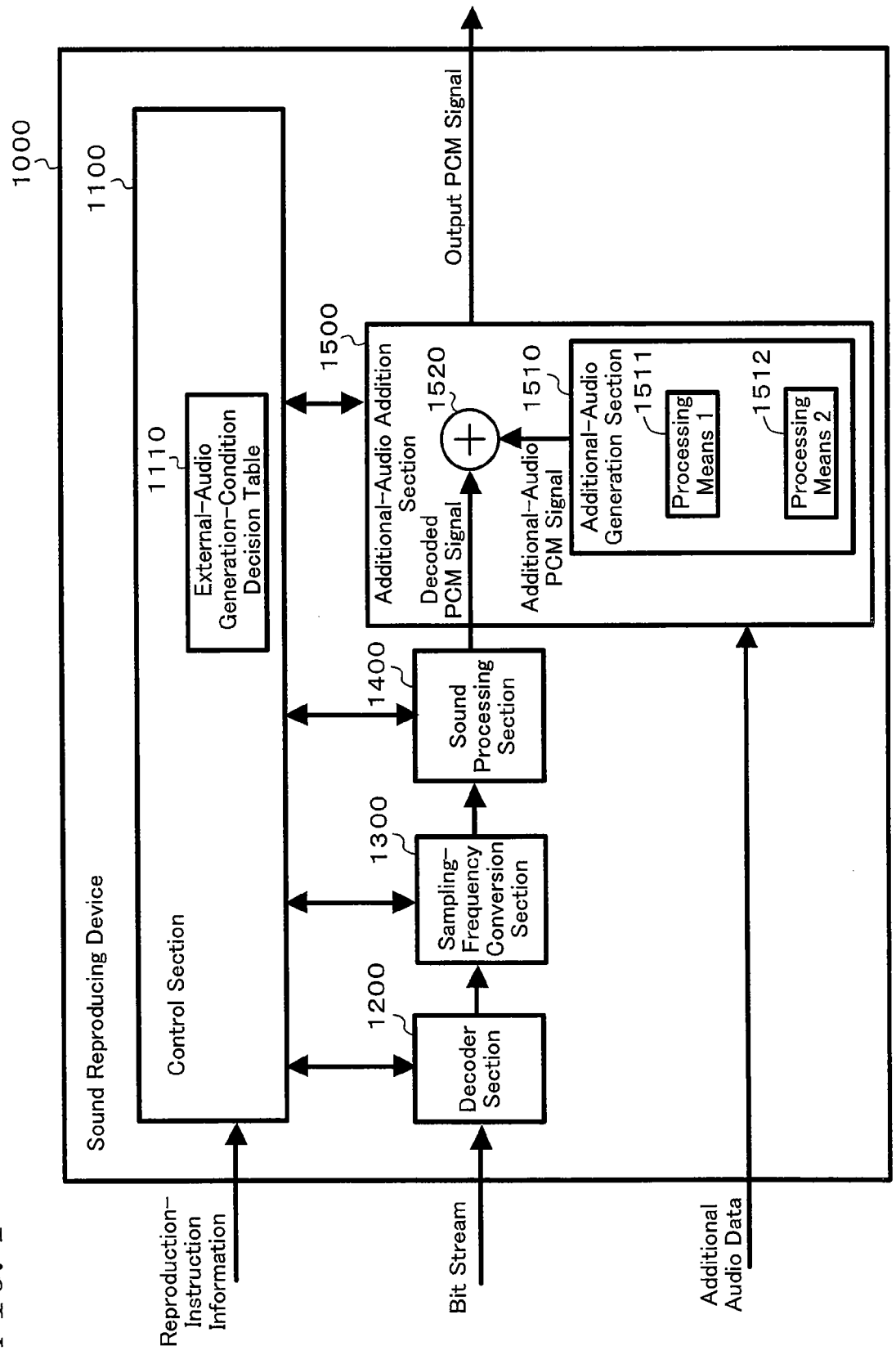
FIG. 1 is a block diagram illustrating a configuration of a sound reproducing device according to the first embodiment.

DESCRIPTION OF REFERENCE CHARACTERS 1000, 2000, 3000, 4000, 5000, 6000, 7000 Sound Reproducing Device
1100 Control Section
1110 External-Audio Generation-Condition Decision Table
1110a, 1110c Acoustic-Processing Load-Condition Decision Table
1110b Processing-Means Selection Table
1110d Use-Case-Information Conversion Table
1110e Pointer-Information Conversion Table
1120 PCM-Output-Buffer Remaining-Amount Monitoring Means
1130 Additional-Audio-Data-Input-Buffer Remaining-Amount Monitoring Means
1140 Acoustic-Processing-Condition Decision Table
1140a Decoding-Process Load-Condition Conversion Table
1140b Use-Case-Information Conversion Table
1140c Acoustic-Processing Load-Condition Decision Table
1150 Process-Flow Decision Table
1150a Decoding-Process Load-Condition Conversion Table
1150b Use-Case-Information Conversion Table
1150c Process-Flow Decision Table
1200 Decoder Section
1300 Sampling-Frequency Conversion Section
1400 Acoustic Processing Section
1500 Additional-Audio Addition Section
1510 Additional-Audio Generation Section
1511 Processing Means 1
1512 Processing Means 2
1513 Processing Means 3
1520 Adder
1530 Additional-Audio Selector Switch
1600 Internally-Installed-Additional-Audio-Data Buffer
1700 PCM Output Buffer
1800 Additional-Audio-Data Input Buffer

DESCRIPTION OF EMBODIMENTS

Preferred embodiments will be described below with reference to the drawings. Note that, in some cases, like reference characters in the drawings indicate the components having substantially same functions, and the explanation thereof is omitted.

First Embodiment

A configuration of a sound reproducing device according to the first embodiment is shown in FIG. 1. This sound reproducing device 1000 includes a control section 1100, a decoder section 1200, a sampling-frequency conversion section 1300, an acoustic processing section 1400, and an additional-audio addition section 1500.

The decoder section 1200 decodes an audio bit stream input from the outside world, and generates and outputs a decoded PCM signal. When decoding the audio bit stream, the decoder section 1200 outputs decoder type information, sampling frequency information, and channel configuration information to the control section 1100 as decoding information.

The control section 1100 receives reproduction-instruction information from the outside world and decoding information from the decoder section 1200, determines whether or not to perform sampling frequency conversion and whether or not to perform various acoustic processing on the decoded PCM signal, and instructs the sampling-frequency conversion section 1300, the acoustic processing section 1400, and the additional-audio addition section 1500 on processing. The control section 1100 includes therein an external-audio generation-condition decision table 1110, refers to the external-audio generation-condition decision table 1110 based on the decoding information and the reproduction-instruction information, and determines a processing means for an additional-audio PCM signal in an additional-audio generation section 1510.

The sampling-frequency conversion section 1300 performs conversion processing of the sampling frequency on the decoded PCM signal output from the decoder section 1200, as necessary, according to the instruction of the control section 1100.

The acoustic processing section 1400 receives the reproduction-instruction information from the control section 1100, and performs acoustic processing on the decoded PCM signal according to the instruction. Functions provided in the acoustic processing section 1400 include, for example, a sound-quality enhancement process involving an oversampling process, a sound-quality adjustment function for setting speakers, a channel expansion process, sound-volume processing, etc.; an instruction to perform these processes is provided by the control section 1100.

The additional-audio addition section 1500 includes the additional-audio generation section 1510 and an adder 1520. The additional-audio generation section 1510 receives additional audio data input from the outside world, processes the additional audio data received so that the additional audio data can be added with the decoded PCM signal, and generates an additional-audio PCM signal. The additional-audio generation section 1510 includes two kinds of processing means 1511 and 1512 for generating the additional-audio PCM signal. The processing means 1 (1511) is characterized in that the computation process load is high, meanwhile a processing result has excellent acoustic properties. The processing means 2 (1512) is characterized in that the acoustic properties of a processing result is poorer than that of the processing means 1, meanwhile the computation process load is lower than that of the processing means 1. These two kinds of processing means 1511 and 1512 are selectively used according to an instruction from the control section 1100. The adder 1520 adds the additional-audio PCM signal generated in the additional-audio generation section 1510 with the decoded PCM signal. Note that, for simplicity of explanation here, the number of kinds of the processing means included in the additional-audio generation section 1510 is two; however, more than two kinds of processing means may be provided in the additional-audio generation section 1510 depending on a trade-off between the amount of load of computation process in the processing and the acoustic properties of a processing result. This also applies to the other embodiments.

FIG. 4 shows content of the external-audio generation-condition decision table 1110. The external-audio generation-condition decision table 1110 is a table for determining an instruction to specify the processing means for the additional-audio PCM signal in the additional-audio generation section 1510, based on the decoding information and the reproduction-instruction information. In the external-audio generation-condition decision table 1110, combinations of the decoding information and the reproduction-instruction information and the processing means are associated. In the external-audio generation-condition decision table 1110 of FIG. 4, combinations of decoder types, sampling frequencies FS, and channel configurations are set as the decoding information. Here, AC3, AAC, and linear PCM are set for the decoder type. For the sampling frequency FS, only 48 kHz is set when the decoder type is AC3 or AAC, and 48 kHz or 96 kHz is set when the decoder type is linear PCM. For the channel configuration, two types, which are two-channel and multi-channel, are set for each decoder type. In addition, in the external-audio generation-condition decision table 1110 of FIG. 4, "neither the function A nor the function B is performed" (None), "only the function A is performed" (Function A), "only the function B is performed" (Function B), and "both the functions A and B are performed" (Function A+Function B) are set for the reproduction-instruction information. Furthermore, in the external-audio generation-condition decision table 1110 of FIG. 4, the combinations of respective decoding information contents and respective reproduction-instruction information contents are associated with the processing means 1 or the processing means 2. Note that, for simplicity of explanation here, it is assumed that the sampling frequency needs to be converted to 96 kHz if the function B is performed.

Figure 2:
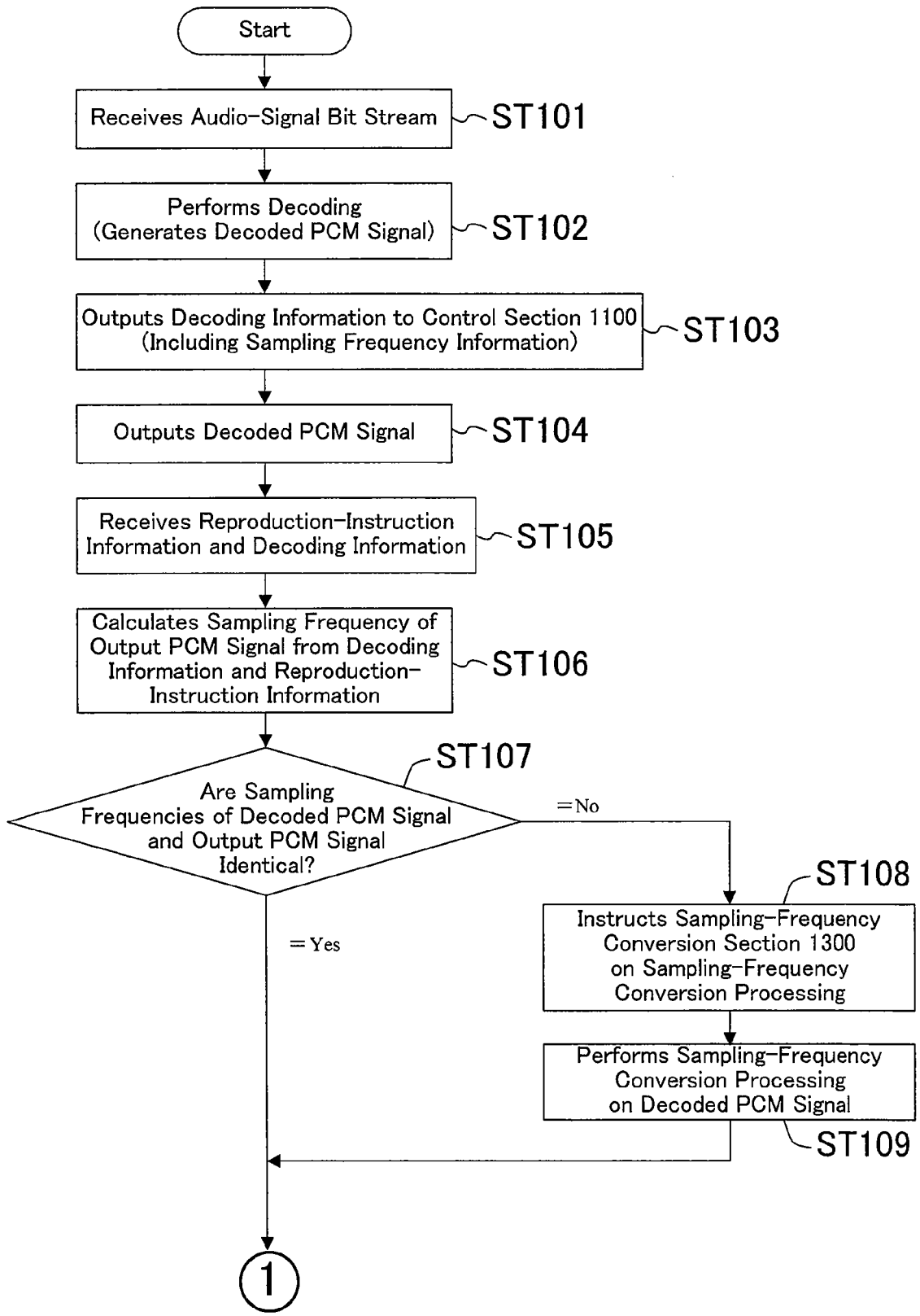
FIG. 2 is a flowchart showing a procedure of the sound reproducing device according to the first embodiment.
Figure 3:
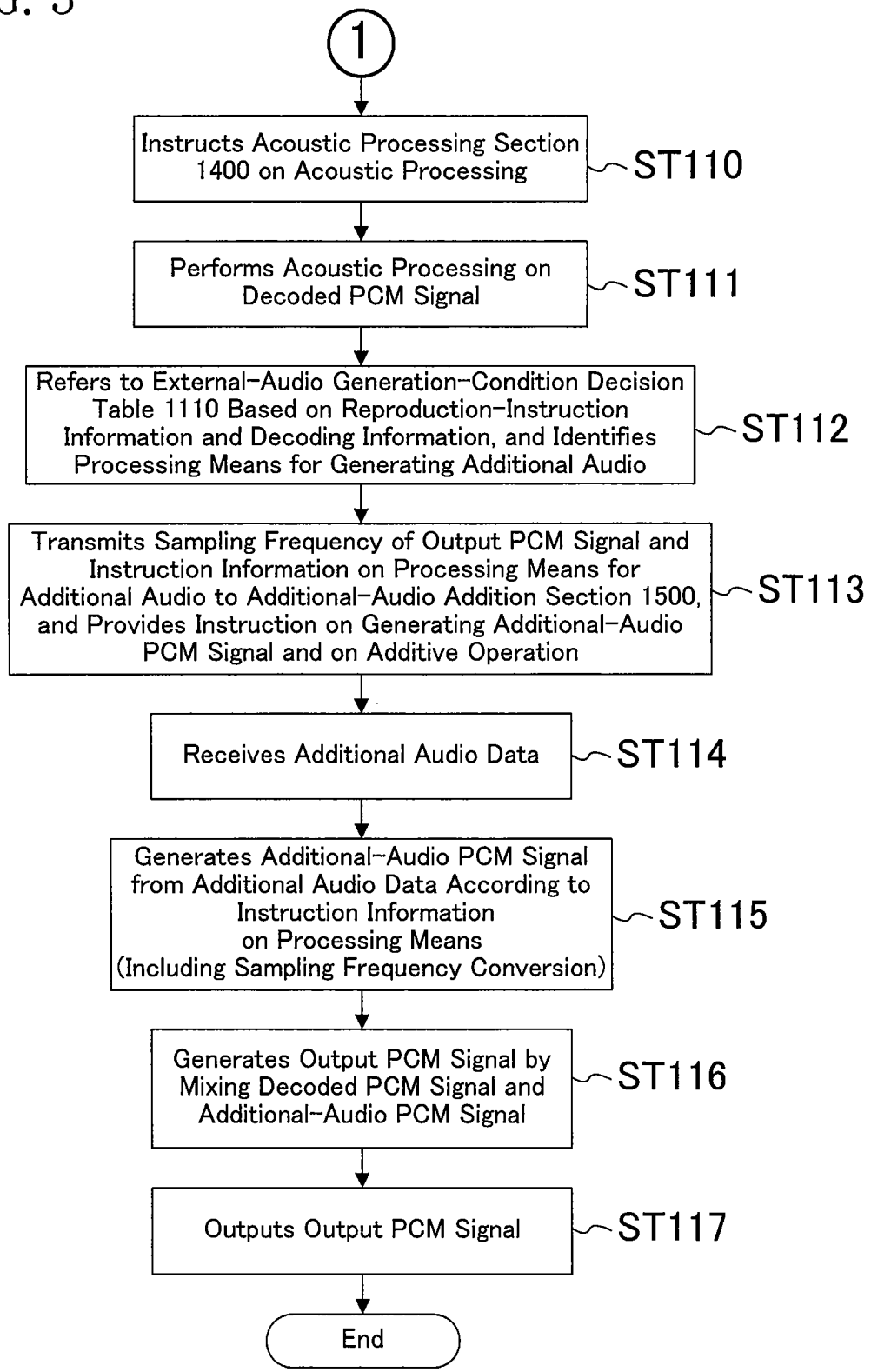
FIG. 3 is a flowchart showing a procedure of the sound reproducing device according to the first embodiment.

Next, the operation of the sound reproducing device 1000 configured as described above will be described with reference to the flowchart shown in FIGS. 2-3. Note that, for simplicity of explanation here, operations in the following two cases will be described.

(Case 1)
Decoding information—Decoder type: AC3, sampling frequency: 48 kHz, channel configuration: two-channel (AC3, FS=48 kHz, two-channel)
Reproduction-instruction information—Of the functions A and B, only the function A is performed (Function A).

(Case 2)
Decoding information—Decoder type: AAC, sampling frequency: 48 kHz, channel configuration: multi-channel (AAC, FS=48 kHz, multi-channel)
Reproduction-instruction information—Both the functions A and B are performed (Function A+Function B).

(Operation in Case 1)
First, the decoder section 1200 decodes an audio bit stream input from the outside world, and generates a decoded PCM signal (ST101 and ST102); then, obtains decoding information when decoding the audio bit stream, and outputs the decoding information to the control section 1100 (ST103).

The control section 1100 receives an instruction to perform a function A as reproduction-instruction information from the outside world, and receives the decoding information from the decoder section 1200 (ST105). At this stage, information on the decoder type (AC3), the sampling frequency (48 kHz), and the channel configuration (two-channel) is obtained as the decoding information. Since performing a function B is not included in the instruction, it is determined that sampling-frequency conversion processing of the decoded PCM signal is not needed (Yes at ST107).

Since the control section 1100 determines that sampling-frequency conversion processing is not needed (Yes at ST107), there is no need to perform sampling-frequency conversion processing of the decoded PCM signal (ST108 and ST109) in the sampling-frequency conversion section 1300.

Next, the acoustic processing section 1400 receives the reproduction-instruction information from the control section 1100 (ST110), and performs acoustic processing corresponding to the function A on the decoded PCM signal according to the instruction (ST111). The reproduction-instruction information here does not include sound-quality enhancement process, which corresponds to the function B.

The control section 1100 refers to the external-audio generation-condition decision table 1110 (FIG. 4), and identifies external-audio generation conditions (ST112). At this stage, the processing means 1 (1511), which has a high computation process load, but is excellent in acoustic properties of a processing result, is identified based on the decoding information (AC3, FS=48 kHz, two-channel) and the reproduction-instruction information (Function A). Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST113).

The additional-audio addition section 1500 receives the additional audio data from the outside world (ST114), and generates the additional-audio PCM signal in the additional-audio generation section 1510 (ST115). In this process, the processing means 1 (1511) is specified by the control section 1100 as the processing means used for generating the additional-audio PCM signal. After the additional-audio PCM signal is generated using the processing means 1 (1511), the decoded PCM signal and the additional-audio PCM signal are added together by the adder 1520 (ST116), and the result is output to the outside world as the output PCM signal (ST117).

(Operation in Case 2)
First, the decoder section 1200 decodes an audio bit stream input from the outside world, and generates a decoded PCM signal (ST101 and ST102); then, obtains decoding information when decoding the audio bit stream, and outputs the decoding information to the control section 1100 (ST103).

The control section 1100 receives an instruction to perform functions A and B as reproduction-instruction information from the outside world, and receives the decoding information from the decoder section 1200 (ST105). At this stage, information on the decoder type (AAC), the sampling frequency (48 kHz), and the channel configuration (multi-channel) is obtained as the decoding information. Here, since the sampling frequency is 48 kHz, and performing the function B is included in the instruction, it is determined that sampling-frequency conversion processing is needed for the decoded PCM signal (No at ST107).

Since the control section 1100 determines that sampling-frequency conversion is needed (No at ST107), the control section 1100 instructs the sampling-frequency conversion section 1300 on an oversampling process of the decoded PCM signal (ST108), and the sampling-frequency conversion section 1300 performs an oversampling process according to the instruction of the control section 1100 (ST109).

Next, the acoustic processing section 1400 receives the reproduction-instruction information from the control section 1100 (ST110), and performs the acoustic processing corresponding to the functions A and B on the decoded PCM signal according to the instruction (ST111).

The control section 1100 refers to the external-audio generation-condition decision table 1110 (FIG. 4), and identifies external-audio generation conditions (ST112). At this stage, the processing means 2 (1512), which has a poorer acoustic properties of a processing result than those of the processing means 1 (1511), but has a lower computation process load than that of the processing means 1 (1511), is identified based on the decoding information (AAC, FS=48 kHz, multi-channel) and the reproduction-instruction information (Function A+Function B). Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST113).

The additional-audio addition section 1500 receives the additional audio data from the outside world (ST114), and generates the additional-audio PCM signal in the additional-audio generation section 1510 (ST115). In this process, the processing means 2 (1512) is specified by the control section 1100 as the processing means used for generating the additional-audio PCM signal. Here, although the sampling frequency in the decoding information is 48 kHz, the sampling frequency of the decoded PCM signal is 96 kHz because the function B process has been performed. This requires the sampling frequency of the additional-audio PCM signal to be also 96 kHz, therefore the processing load is increased accordingly; however, using the processing means 2 (1512) allows the processing load to be reduced. After the additional-audio PCM signal is generated using the processing means 2 (1512) in the additional-audio generation section 1510, the decoded PCM signal and the additional-audio PCM signal are added together by the adder 1520 (ST116), and the result is output to the outside world as the output PCM signal (ST117).

As described above, in the first embodiment, the load of decoding process in the decoder section 1200 is higher in the <case 2> as compared with the <case 1>, and in addition, performing an oversampling process in the sampling-frequency conversion section 1300 causes the processing load during the reproduction process to be increased accordingly. However, since the processing means 2 (1512) is specified as the processing means used in the additional-audio addition section 1500, the processing load for generating the additional-audio PCM signal is reduced, thereby allowing the processing load on the entire sound reproducing device 1000 to be reduced accordingly.

Second Embodiment

Figure 5:
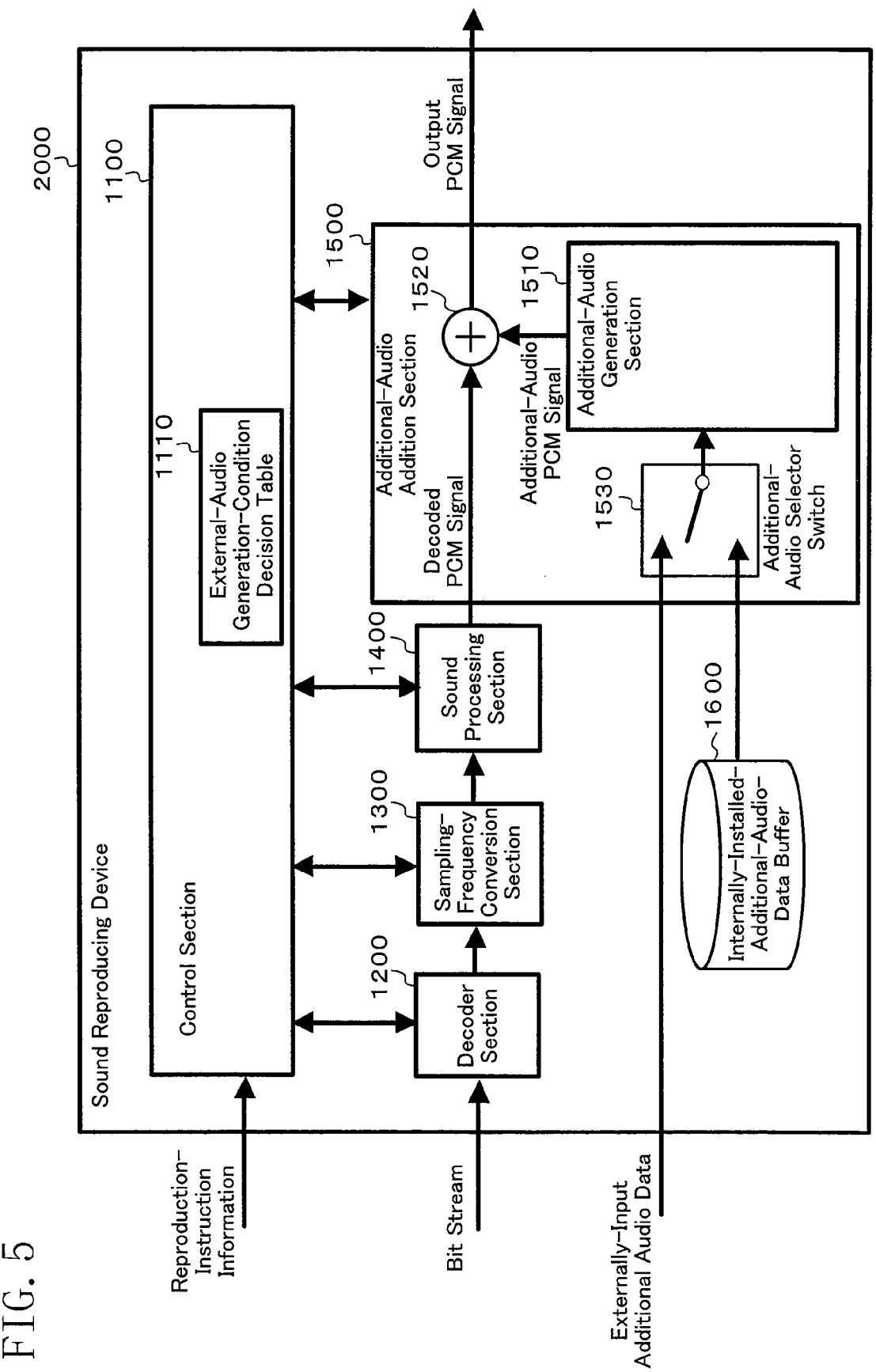
FIG. 5 is a block diagram illustrating a configuration of a sound reproducing device according to the second embodiment.

A configuration of a sound reproducing device according to the second embodiment is shown in FIG. 5. This sound reproducing device 2000 includes a control section 1100, a decoder section 1200, a sampling-frequency conversion section 1300, an acoustic processing section 1400, an additional-audio addition section 1500, and an internally-installed-additional-audio-data buffer 1600.

The internally-installed-additional-audio-data buffer 1600 is a buffer for storing additional audio data installed in the sound reproducing device 2000, and stores additional audio data corresponding to respective sampling frequencies needed for reproduction.

The control section 1100 refers to the external-audio generation-condition decision table 1110, and determines which to use, externally-input additional audio data or the internally-installed additional audio data, as the sound source of an additional-audio PCM signal supplied from an additional-audio generation section 1510 to an adder 1520 in the additional-audio addition section 1500.

The additional-audio addition section 1500 includes an additional-audio selector switch 1530, the additional-audio generation section 1510, and the adder 1520. The additional-audio selector switch 1530 selects either the externally-input additional audio data input from the outside world or the additional audio data stored in the internally-installed-additional-audio-data buffer 1600, according to an instruction from the control section 1100. The additional-audio generation section 1510 processes the additional audio data selected by the additional-audio selector switch 1530 so that the additional audio data can be added with the decoded PCM signal, and generates the additional-audio PCM signal. The adder 1520 adds the additional-audio PCM signal generated in the additional-audio generation section 1510 with the decoded PCM signal.

FIG. 9 shows content of the external-audio generation-condition decision table 1110. The external-audio generation-condition decision table 1110 is a table for determining an instruction on which to select, on the additional-audio selector switch 1530, the additional audio data input from the outside world or the additional audio data stored in the internally-installed-additional-audio-data buffer 1600, based on the decoding information and the reproduction-instruction information. In the external-audio generation-condition decision table 1110, combinations of the decoding information and the reproduction-instruction information and information indicating the additional audio data to be selected are associated. In the external-audio generation-condition decision table 1110 of FIG. 9, combinations of decoder types, sampling frequencies FS, and channel configurations are set as the decoding information. Here, AC3, AAC, and linear PCM are set for the decoder type. For the sampling frequency FS, only 48 kHz is set when the decoder type is AC3 or AAC, and 48 kHz or 96 kHz is set when the decoder type is linear PCM. For the channel configuration, two types, which are two-channel and multi-channel, are set for each decoder type. In addition, in the external-audio generation-condition decision table 1110 of FIG. 9, "neither the function A nor the function B is performed" (None), "only the function A is performed" (Function A), "only the function B is performed" (Function B), and "both the functions A and B are performed" (Function A+Function B) are set for the reproduction-instruction information. Furthermore, in the external-audio generation-condition decision table 1110 of FIG. 9, the combinations of respective decoding information contents and respective reproduction-instruction information contents are associated with <Externally Input> or <Internally Installed>. <Externally Input> is the information indicating the additional audio data input from the outside world. <Internally Installed> is the information indicating the additional audio data stored in the internally-installed-additional-audio-data buffer 1600. Note that, for simplicity of explanation here, it is assumed that the sampling frequency needs to be converted to 96 kHz if the function B is performed.

Next, the operation of the sound reproducing device 2000 configured as described above will be described with reference to the flowchart shown in FIGS. 6-8. Note that, for simplicity of explanation here, operations in the following two cases will be described.

(Case 1)
Decoding information—Decoder type: AC3, sampling frequency: 48 kHz, channel configuration: two-channel (AC3, FS=48 kHz, two-channel)
Reproduction-instruction information—Of the functions A and B, only the function A is performed (Function A).

(Case 2)
Decoding information—Decoder type: AAC, sampling frequency: 48 kHz, channel configuration: multi-channel (AAC, FS=48 kHz, multi-channel)
Reproduction-instruction information—Both the functions A and B are performed (Function A+Function B).

(Operation in Case 1)
First, the decoder section 1200 decodes an audio bit stream input from the outside world, and generates a decoded PCM signal (ST201 and ST202); then, obtains decoding information when decoding the audio bit stream, and outputs the decoding information to the control section 1100 (ST203).

The control section 1100 receives an instruction to perform a function A as reproduction-instruction information from the outside world, and receives the decoding information from the decoder section 1200 (ST205). At this stage, information on the decoder type (AC3), the sampling frequency (48 kHz), and the channel configuration (two-channel) is obtained as the decoding information. Since performing a function B is not included in the instruction, it is determined that sampling-frequency conversion processing of the decoded PCM signal is not needed (Yes at ST207).

Since the control section 1100 determines that sampling-frequency conversion processing is not needed (Yes at ST207), there is no need to perform sampling-frequency conversion processing of the decoded PCM signal (ST208 and ST209) in the sampling-frequency conversion section 1300.

Next, the acoustic processing section 1400 receives the reproduction-instruction information from the control section 1100 (ST210), and performs acoustic processing corresponding to the function A on the decoded PCM signal according to the instruction (ST211). The reproduction-instruction information here does not include sound-quality enhancement process, which corresponds to the function B.

The control section 1100 refers to the external-audio generation-condition decision table 1110 (FIG. 9), and identifies the additional audio data (the data source of the additional-audio PCM signal) (ST212). At this stage, the additional audio data input from the outside world (Externally Input) is identified based on the decoding information (AC3, FS=48 kHz, two-channel) and the reproduction-instruction information (Function A).

Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST213).

Since the additional-audio addition section 1500 is instructed by the control section 1100 to select the additional audio data input from the outside world, the additional-audio selector switch 1530 selects and transmits the externally-input additional audio data to the additional-audio generation section 1510 (ST214, ST215, and Yes at ST216).

The additional-audio generation section 1510 generates the additional-audio PCM signal from the additional audio data transmitted from the additional-audio selector switch 1530 (ST217 and ST218). After the additional-audio PCM signal is generated in the additional-audio generation section 1510, the decoded PCM signal and the additional-audio PCM signal are added together by the adder 1520 (ST221), and the result is output to the outside world as the output PCM signal (ST222).

(Operation in Case 2)
First, the decoder section 1200 decodes an audio bit stream input from the outside world, and generates a decoded PCM signal (ST201 and ST202); then, obtains decoding information when decoding the audio bit stream, and outputs the decoding information to the control section 1100 (ST203).

The control section 1100 receives an instruction to perform functions A and B as reproduction-instruction information from the outside world, and receives the decoding information from the decoder section 1200 (ST205). At this stage, information on the decoder type (AAC), the sampling frequency (48 kHz), and the channel configuration (multi-channel) is obtained as the decoding information. Here, since the sampling frequency is 48 kHz, and performing the function B is included in the instruction, it is determined that sampling-frequency conversion processing is needed for the decoded PCM signal (No at ST207).

Since the control section 1100 determines that sampling-frequency conversion is needed (No at ST207), the control section 1100 instructs the sampling-frequency conversion section 1300 on an oversampling process of the decoded PCM signal (ST208), and the sampling-frequency conversion section 1300 performs an oversampling process according to the instruction of the control section 1100 (ST209).

Next, the acoustic processing section 1400 receives the reproduction-instruction information from the control section 1100 (ST210), and performs the acoustic processing corresponding to the functions A and B on the decoded PCM signal according to the instruction (ST211).

The control section 1100 refers to the external-audio generation-condition decision table 1110 (FIG. 9), and identifies the additional audio data (the data source of the additional-audio PCM signal) (ST212). At this stage, the additional audio data stored in the audio data buffer 1600 (Internally Installed) is identified based on the decoding information (AAC, FS=48 kHz, multi-channel) and the reproduction-instruction information (Function A+Function B). Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST213).

Since the additional-audio addition section 1500 is instructed by the control section 1100 to select the additional audio data stored in the internally-installed-additional-audio-data buffer 1600, the additional-audio selector switch 1530 refers to the sampling frequency information on the output PCM signal, selects the necessary additional audio data from the internally-installed-additional-audio-data buffer 1600, and transmits the additional audio data to the additional-audio generation section 1510 (ST215, No at ST216, and ST219).

The additional-audio generation section 1510 generates the additional-audio PCM signal from the additional audio data transmitted from the additional-audio selector switch 1530 (ST220). Here, although the sampling frequency in the decoding information is 48 kHz, the sampling frequency of the decoded PCM signal is 96 kHz because the function B process has been performed. This requires the sampling frequency of the additional-audio PCM signal to be also 96 kHz; however, since the sampling frequency information on the output PCM signal has been referred to and the necessary additional audio data has been selected in the additional-audio selector switch 1530, there is no further need to perform an oversampling process (ST220).

After the additional-audio PCM signal is generated in the additional-audio generation section 1510, the decoded PCM signal and the additional-audio PCM signal are added together by the adder 1520 (ST221), and the result is output to the outside world as the output PCM signal (ST222).

As described above, in the second embodiment, the load of decoding process in the decoder section 1200 is higher in the <case 2> as compared with the <case 1>, and in addition, performing an oversampling process in the sampling-frequency conversion section 1300 causes the processing load during the reproduction process to be increased accordingly. However, since the additional audio data stored in the internally-installed-additional-audio-data buffer 1600 is selected for the additional audio data to be processed in the additional-audio addition section 1500, and the oversampling process is not performed when generating the additional-audio PCM signal, the processing load for generating the additional-audio PCM signal is reduced, thereby allowing the processing load on the entire sound reproducing device 2000 to be reduced accordingly.

Third Embodiment

Figure 10:
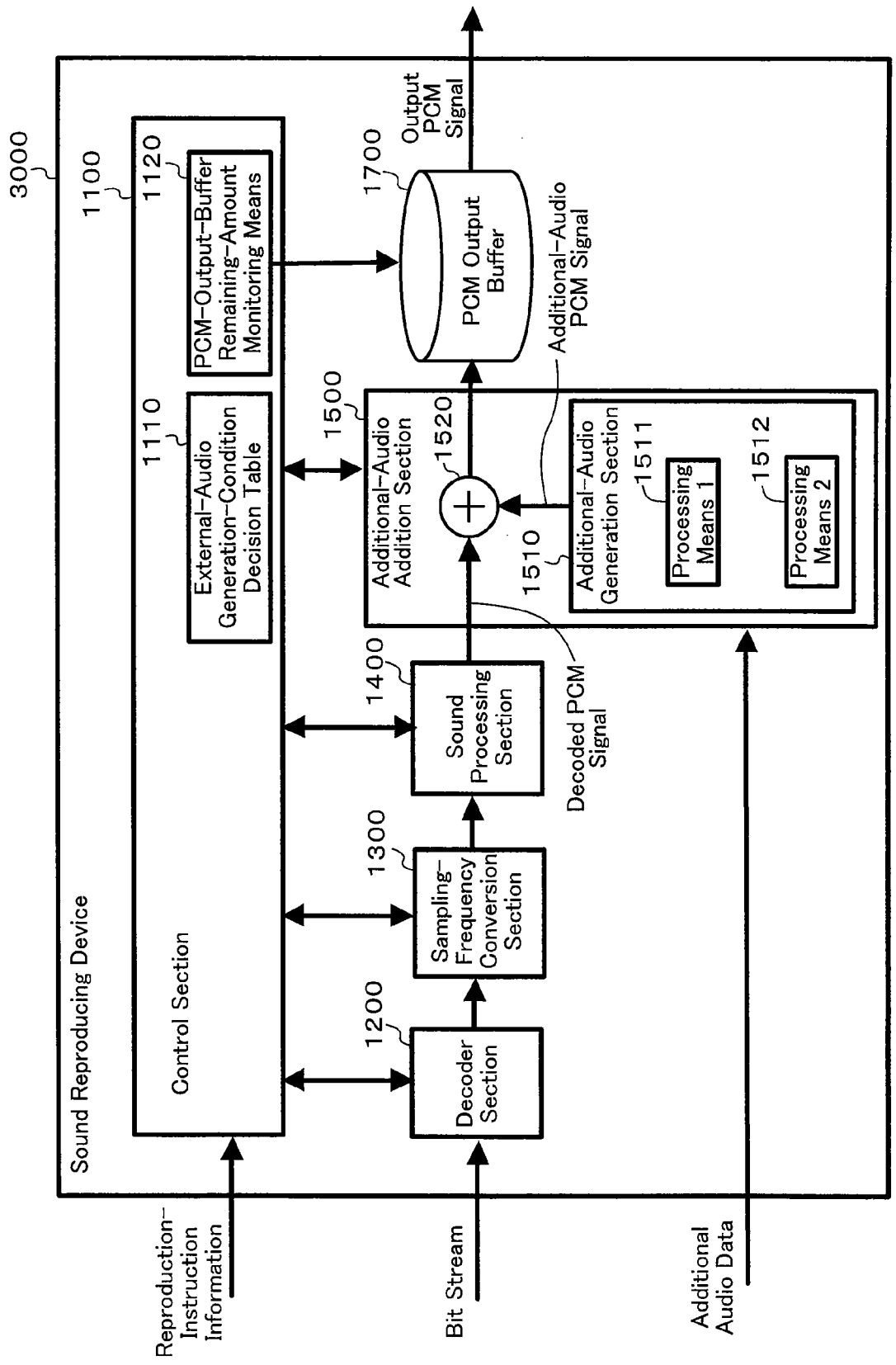
FIG. 10 is a block diagram illustrating a configuration of a sound reproducing device according to the third embodiment.

A configuration of a sound reproducing device according to the third embodiment is shown in FIG. 10. This sound reproducing device 3000 includes a control section 1100, a decoder section 1200, a sampling-frequency conversion section 1300, an acoustic processing section 1400, an additional-audio addition section 1500, and a PCM output buffer 1700.

The control section 1100 receives reproduction-instruction information from the outside world and the decoding information from the decoder section 1200, determines whether or not to perform sampling frequency conversion and whether or not to perform various acoustic processing on the decoded PCM signal, and instructs the sampling-frequency conversion section 1300, the acoustic processing section 1400, and the additional-audio addition section 1500 on processing. In this embodiment, it is assumed that the reproduction-instruction information received from the outside world includes not only instructions to perform various acoustic processing functions, but also specification of underflow conditions for the remaining amount of the PCM output buffer. For example, these conditions may include a start timing of an underflow determination (since the remaining amount of the PCM output buffer always starts with an underflow state at an initial decoding timing, the determination start timing needs to be delayed), a threshold of the buffer remaining amount for underflow determination, etc. The control section 1100 includes therein a PCM-output-buffer remaining-amount monitoring means 1120 and an external-audio generation-condition decision table 1110. The PCM-output-buffer remaining-amount monitoring means 1120 monitors the remaining amount of the output PCM signal of the PCM output buffer 1700. The PCM-output-buffer remaining-amount monitoring means 1120 monitors the remaining amount status of the output PCM signal of the PCM output buffer 1700 after a start timing specified from the outside world, and monitors whether or not an underflow state is reached (the buffer remaining amount is below a threshold). The control section 1100 refers to the external-audio generation-condition decision table 1110 based on the remaining amount status of the output PCM signal of the PCM output buffer 1700, and determines a processing means for the additional-audio PCM signal in an additional-audio generation section 1510.

Figures 13, 14:
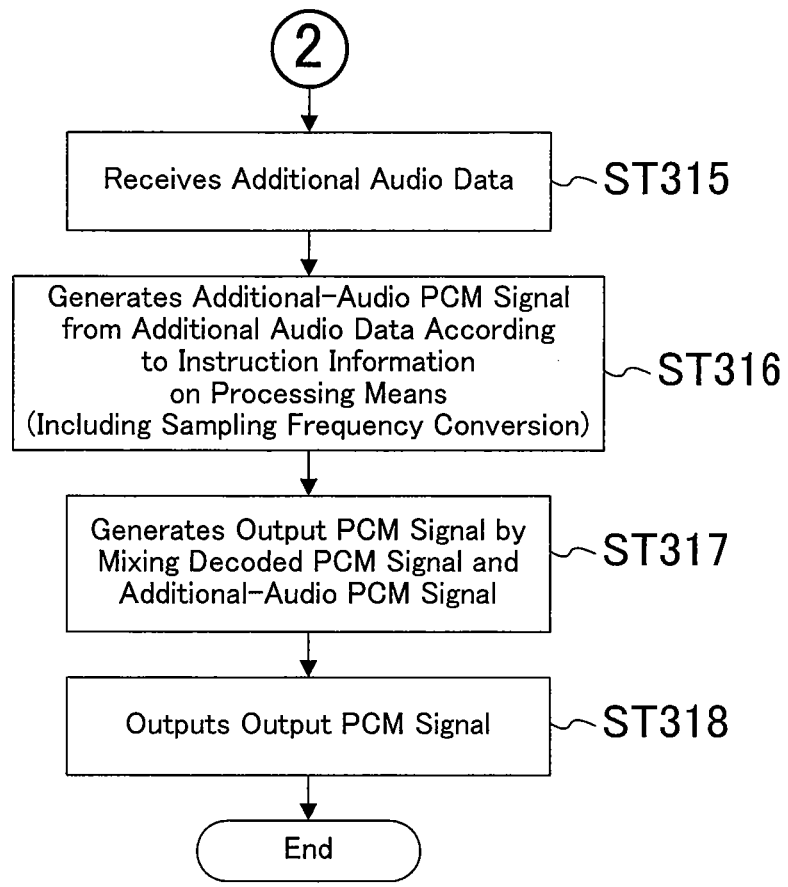
FIG. 13 is a flowchart showing a procedure of the sound reproducing device according to the third embodiment.
FIG. 14 shows an example of an external-audio generation-condition decision table.

FIG. 14 shows content of the external-audio generation-condition decision table 1110. The external-audio generation-condition decision table 1110 is a table for determining an instruction to specify the processing means for the additional-audio PCM signal in the additional-audio generation section 1510, based on the remaining amount status of the output PCM signal of the PCM output buffer 1700.

In the external-audio generation-condition decision table 1110, the remaining amount statuses of the output PCM signal of the PCM output buffer 1700 (the remaining amounts of the PCM output buffer) and the processing means to be selected are associated. In the external-audio generation-condition decision table 1110 of FIG. 14, a status in which the remaining amount of the PCM output buffer is at or above a preset threshold is associated with the processing means 1, while a status in which the remaining amount of the PCM output buffer is below the preset threshold is associated with the processing means 2.

Figure 11:
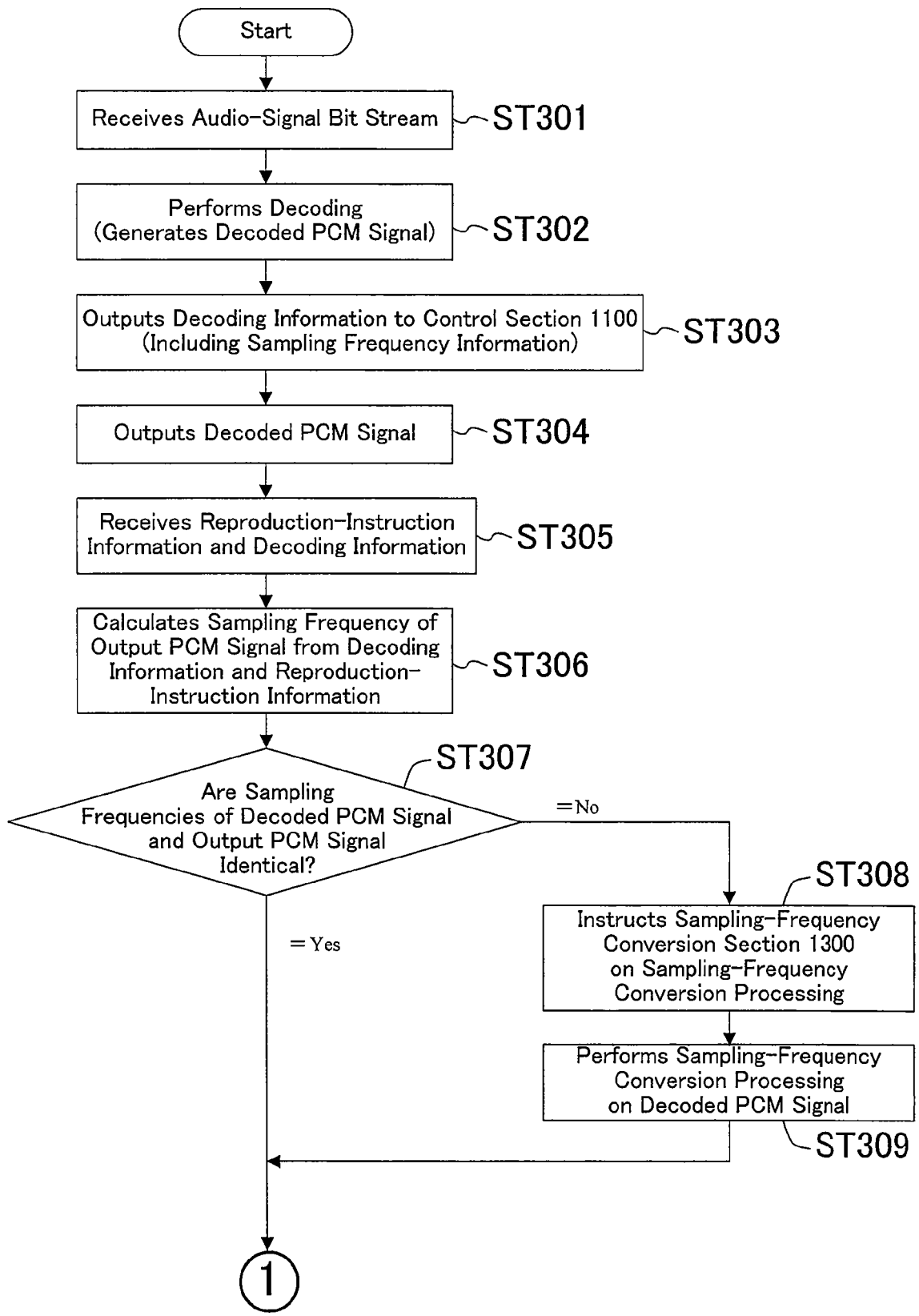
FIG. 11 is a flowchart showing a procedure of the sound reproducing device according to the third embodiment.
Figure 12:
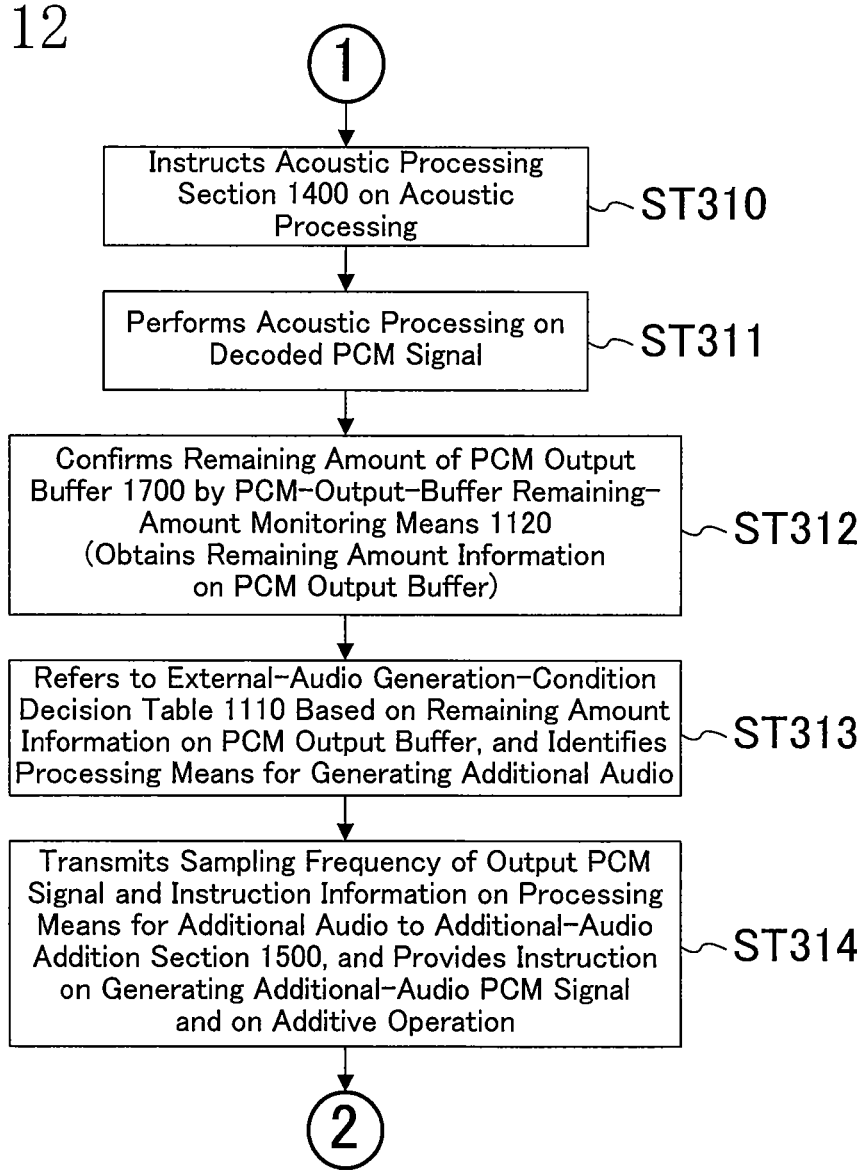
FIG. 12 is a flowchart showing a procedure of the sound reproducing device according to the third embodiment.

Next, the operation of the sound reproducing device 3000 configured as described above will be described with reference to the flowchart shown in FIGS. 11-13. Note that, for simplicity of explanation here, operations in the following two cases will be described.

(Case 1)—A case where the processing load is relatively low, and no underflow state is detected as the remaining amount status of the output PCM signal of the PCM output buffer 1700.

(Case 2)—A case where the processing load is high, and an underflow state is detected as the remaining amount status of the output PCM signal of the PCM output buffer 1700.

(Operation in Case 1)

For simplicity of explanation, it is assumed here that a time period longer than one corresponding to the start timing of an underflow determination specified from the outside world has already elapsed since the start of decoding.

First, the decoder section 1200 decodes an audio bit stream input from the outside world, and generates a decoded PCM signal (ST301 and ST302); then, obtains decoding information when decoding the audio bit stream, and outputs the decoding information to the control section 1100 (ST303).

The control section 1100 receives reproduction-instruction information from the outside world, and receives the decoding information from the decoder section 1200 (ST305). Note that, among others, explanation of content of the decoding information will be omitted in this embodiment; for simplicity of explanation, it is assumed that sampling-frequency conversion processing of the decoded PCM signal is determined to be unnecessary (Yes at ST307).

Since the control section 1100 determines that sampling-frequency conversion processing is not needed (Yes at ST107), there is no need to perform sampling-frequency conversion processing of the decoded PCM signal (ST308 and ST309) in the sampling-frequency conversion section 1300.

Next, the acoustic processing section 1400 receives the reproduction-instruction information from the control section 1100 (ST310), and performs acoustic processing on the decoded PCM signal according to the instruction (ST311).

The control section 1100 monitors the remaining amount status of the output PCM signal of the PCM output buffer

1700 by the PCM-output-buffer remaining-amount monitoring means 1120 (ST312). In addition, the control section 1100 refers to the external-audio generation-condition decision table 1110 (FIG. 14), and determines the external-audio generation condition (a processing means used for generating the additional audio) based on the remaining amount status of the output PCM signal of the PCM output buffer 1700 (ST313). Since this is a case where the processing load is relatively low, and no underflow state is detected as the remaining amount status of the output PCM signal of the PCM output buffer 1700 (the remaining amount of the PCM output buffer is at or above a preset threshold), the processing means 1 (1511), which has a high computation process load, but is excellent in acoustic properties of a processing result, is determined to be used. Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST314).

The additional-audio addition section 1500 receives the additional audio data from the outside world (ST315), and generates the additional-audio PCM signal in the additional-audio generation section 1510 therein (ST316). In this process, processing by the processing means 1 (1511) is specified by the control section 1100 as the processing means used for generating the additional-audio PCM signal. After the additional-audio PCM signal is generated using the processing means 1 (1511), the decoded PCM signal and the additional-audio PCM signal are added together by the adder 1520 (ST317), and the result is output to the outside world as the output PCM signal (ST318).

(Operation in Case 2)

Note that, also for simplicity of explanation, it is assumed here that a time period longer than one corresponding to the start timing of an underflow determination specified from the outside world has already elapsed since the start of decoding.

First, the decoder section 1200 decodes an audio bit stream input from the outside world, and generates a decoded PCM signal (ST301 and ST302); then, obtains decoding information when decoding the audio bit stream, and outputs the decoding information to the control section 1100 (ST303).

The control section 1100 receives reproduction-instruction information from the outside world, and receives the decoding information from the decoder section 1200 (ST305). Note that, among others, explanation of content of the decoding information will be omitted in this embodiment; for simplicity of explanation, it is assumed that the sampling frequency FS in the decoding information is 48 kHz, that performing a sound-quality enhancement process is included in the instruction in the reproduction-instruction information, and that an oversampling process to 96 kHz has been determined to be needed for the decoded PCM signal (No at ST307).

Since the control section 1100 determines that sampling-frequency conversion is needed (No at ST307), the control section 1100 instructs the sampling-frequency conversion section 1300 on an oversampling process of the decoded PCM signal (ST308), and the sampling-frequency conversion section 1300 performs an oversampling process according to the instruction of the control section 1100 (ST309).

Next, the acoustic processing section 1400 receives the reproduction-instruction information from the control section 1100 (ST310), and performs the acoustic processing on the decoded PCM signal according to the instruction (ST311).

The control section 1100 monitors the remaining amount status of the output PCM signal of the PCM output buffer 1700 by the PCM-output-buffer remaining-amount monitoring means 1120 (ST312). In addition, the control section 1100 refers to the external-audio generation-condition decision table 1110 (FIG. 14), and determines the external-audio generation condition (a processing means for generating the additional audio) based on the remaining amount status of the output PCM signal of the PCM output buffer 1700 (ST313). Since this is a case where the processing load is relatively low, and an underflow state is detected as the remaining amount status of the output PCM signal of the PCM output buffer 1700 (the remaining amount of the PCM output buffer is below a preset threshold), the processing means 2 (1512), which has a poorer acoustic properties of a processing result than those of the processing means 1 (1511), but has a lower computation process load than that of the processing means 1 (1511), is determined to be used. Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST314).

The additional-audio addition section 1500 receives the additional audio data from the outside world (ST315), and generates the additional-audio PCM signal in the additional-audio generation section 1510 therein (ST316). In this process, processing by the processing means 2 (1512) is specified by the control section 1100 as the processing means used for generating the additional-audio PCM signal. Here, although the sampling frequency in the decoding information is 48 kHz, the sampling frequency of the additional-audio PCM signal needs to be 96 kHz because sampling-frequency conversion processing has been performed and thus the sampling frequency of the decoded PCM signal is 96 kHz, therefore the processing load is increased accordingly; however, using the processing means 2 (1512) allows the processing load to be reduced. After the additional-audio PCM signal is generated using the processing means 2 (1512) in the additional-audio generation section 1510, the decoded PCM signal and the additional-audio PCM signal are added together by the adder 1520 (ST317), and the result is output to the outside world as the output PCM signal (ST318).

As described above, in the third embodiment, the load of decoding process in the decoder section 1200 is higher in the <case 2> as compared with the <case 1>, and in addition, performing an oversampling process in the sampling-frequency conversion section 1300 causes the processing load during the reproduction process to be increased accordingly. However, since the PCM-output-buffer remaining-amount monitoring means 1120 is provided in the control section 1100, and the plurality of processing means 1511 and 1512, which are switchable depending on the processing load, are provided in the additional-audio generation section 1510, the additional-audio generation methods can be switched depending on the remaining amount status by monitoring the remaining amount of the PCM output buffer; therefore, designating the processing using the processing means 2 (1512) as the processing means in the additional-audio addition section 1500 allows the processing load for generating the additional-audio PCM signal to be reduced, thereby allows the processing load on the entire sound reproducing device to be reduced accordingly.

Fourth Embodiment

Figure 15:
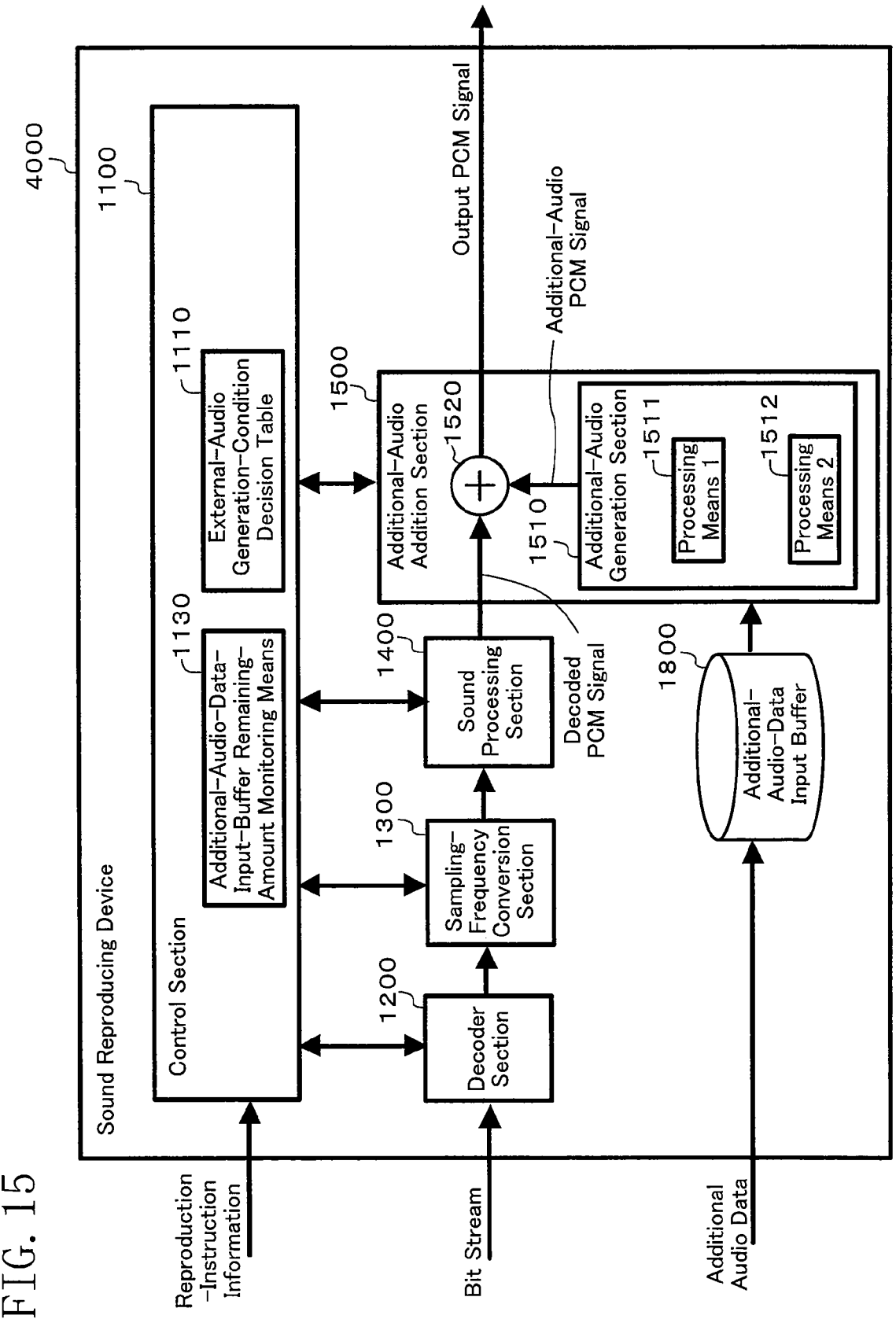
FIG. 15 is a block diagram illustrating a configuration of a sound reproducing device according to the fourth embodiment.

A configuration of a sound reproducing device according to the fourth embodiment is shown in FIG. 15. This sound reproducing device 4000 includes a control section 1100, a decoder section 1200, a sampling-frequency conversion section 1300, an acoustic processing section 1400, an additional-audio addition section 1500, and an additional-audio-data input buffer 1800.

The control section 1100 receives reproduction-instruction information from the outside world and decoding information from the decoder section 1200, determines whether or not to perform sampling frequency conversion and whether or not to perform various acoustic processing on the decoded PCM signal, and instructs the sampling-frequency conversion section 1300, the acoustic processing section 1400, and the additional-audio addition section 1500 on processing. In this embodiment, the reproduction-instruction information obtained from the outside world includes not only instructions to perform respective acoustic processing functions, but also specification of overflow conditions for the remaining amount of the additional-audio-data input buffer 1800. For example, these conditions may include a threshold of the buffer remaining amount for an overflow determination etc. The control section 1100 further includes therein an additional-audio-data-input-buffer remaining-amount monitoring means 1130, which monitors the remaining amount of the additional audio data of the additional-audio-data input buffer 1800, and an external-audio generation-condition decision table 1110. The additional-audio-data-input-buffer remaining-amount monitoring means 1130 monitors the remaining amount status of the additional audio data of the additional-audio-data input buffer 1800, and monitors whether or not an overflow state is reached (the buffer remaining amount is at or above a threshold). In addition, the control section 1100 refers to the external-audio generation-condition decision table 1110 based on the remaining amount status of the additional audio data of the additional-audio-data input buffer 1800, and determines a processing means for an additional-audio PCM signal in an additional-audio generation section 1510 depending on the remaining amount status of the additional audio data of the additional-audio-data input buffer 1800.

FIG. 18 shows content of the external-audio generation-condition decision table 1110. The external-audio generation-condition decision table 1110 is a table for determining an instruction to specify the processing means for the additional-audio PCM signal in the additional-audio generation section 1510, based on the remaining amount status of the additional audio data of the additional-audio-data input buffer 1800.

In the external-audio generation-condition decision table 1110, the remaining amount statuses of the additional audio data of the additional-audio-data input buffer 1800 (the remaining amounts of the additional-audio-data input buffer) and the processing means to be selected are associated. In the external-audio generation-condition decision table 1110 of FIG. 18, a status in which the remaining amount of the additional-audio-data input buffer is below a preset threshold is associated with the processing means 1, while a status in which the remaining amount of the additional-audio-data input buffer is at or above the preset threshold is associated with the processing means 2.

Figure 16:
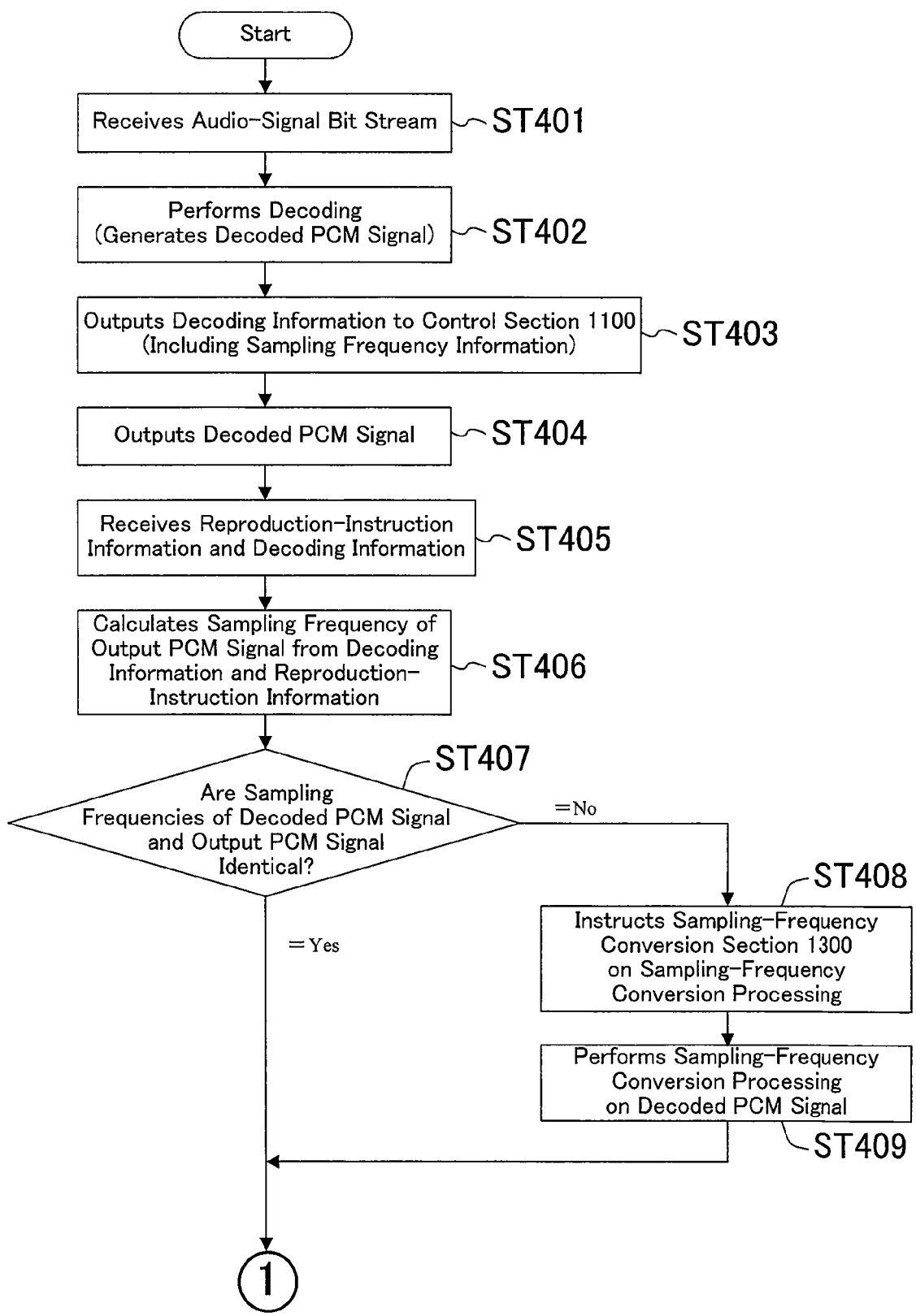
FIG. 16 is a flowchart showing a procedure of the sound reproducing device according to the fourth embodiment.
Figure 17:
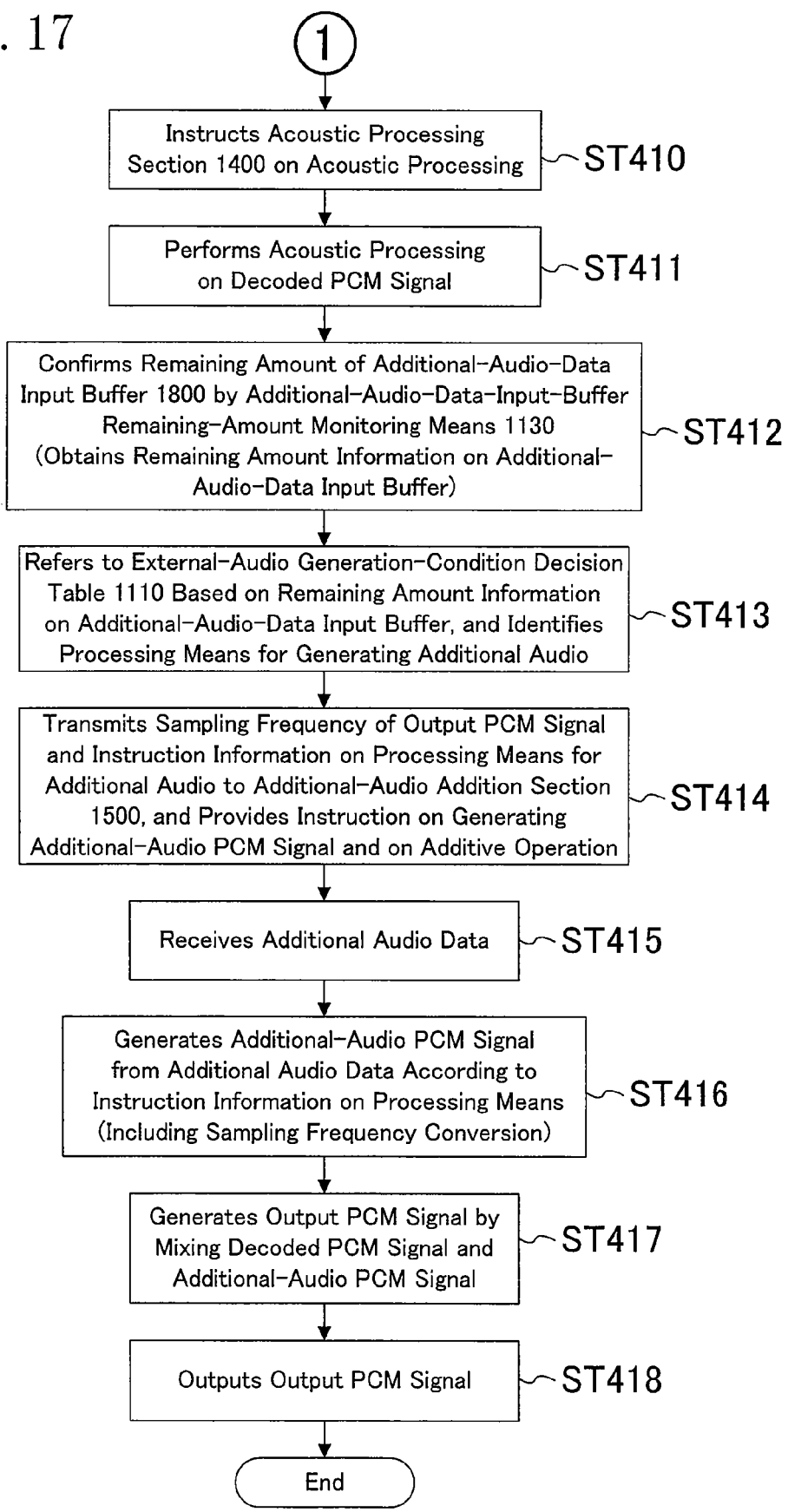
FIG. 17 is a flowchart showing a procedure of the sound reproducing device according to the fourth embodiment.

Next, the operation of the sound reproducing device 4000 configured as described above will be described with reference to the flowchart shown in FIGS. 16-17. Note that, for simplicity of explanation here, operations in the following two cases will be described.

(Case 1)—A case where the processing load is relatively low, and no overflow state is detected as the remaining amount status of the additional audio data of the additional-audio-data input buffer 1800.

(Case 2)—A case where the processing load is high, and an overflow state is detected as the remaining amount status of the additional audio data of the additional-audio-data input buffer 1800.

(Operation in Case 1)

First, the decoder section 1200 decodes an audio bit stream input from the outside world, and generates a decoded PCM signal (ST401 and ST402); then, obtains decoding information when decoding the audio bit stream, and outputs the decoding information to the control section 1100 (ST403).

The control section 1100 receives reproduction-instruction information from the outside world, and receives the decoding information from the decoder section 1200 (ST405). Note that, among others, explanation of content of the decoding information will be omitted in this embodiment; for simplicity of explanation, it is assumed that sampling-frequency conversion processing of the decoded PCM signal is determined to be unnecessary (Yes at ST407).

Since the control section 1100 determines that sampling-frequency conversion processing is not needed (Yes at ST407), there is no need to perform sampling-frequency conversion processing of the decoded PCM signal (ST408 and ST409) in the sampling-frequency conversion section 1300.

Next, the acoustic processing section 1400 receives the reproduction-instruction information from the control section 1100 (ST410), and performs acoustic processing on the decoded PCM signal according to the instruction (ST411).

The control section 1100 monitors the remaining amount status of the additional audio data of the additional-audio-data input buffer 1800 by the additional-audio-data-input-buffer remaining-amount monitoring means 1130 (ST412). In addition, the control section 1100 refers to the external-audio generation-condition decision table 1110 (FIG. 18), and determines the external-audio generation condition (a processing means used for generating the additional audio) based on the remaining amount status of the additional audio data of the additional-audio-data input buffer 1800 (ST413). Since this is a case where the processing load is relatively low, and no overflow state is detected as the remaining amount status of the additional audio data of the additional-audio-data input buffer 1800 (the remaining amount of the additional-audio-data input buffer is below a preset threshold), the processing means 1 (1511), which has a high computation process load, but is excellent in acoustic properties of a processing result, is determined to be used. Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST414).

The additional-audio addition section 1500 receives the additional audio data from the outside world (ST415), and generates the additional-audio PCM signal in the additional-audio generation section 1510 therein (ST416). In this process, processing by the processing means 1 (1511) is specified by the control section 1100 as the processing means used for generating the additional-audio PCM signal. After the additional-audio PCM signal is generated using the processing means 1 (1511), the decoded PCM signal and the additional-audio PCM signal are added together by the adder 1520 (ST417), and the result is output to the outside world as the output PCM signal (ST418).

(Operation in Case 2)

First, the decoder section 1200 decodes an audio bit stream input from the outside world, and generates a decoded PCM signal (ST401 and ST402); then, obtains decoding information when decoding the audio bit stream, and outputs the decoding information to the control section 1100 (ST403).

The control section 1100 receives reproduction-instruction information from the outside world, and receives the decoding information from the decoder section 1200 (ST405). Note that, among others, explanation of content of the decoding information will be omitted in this embodiment; for simplicity of explanation, it is assumed that the sampling frequency FS in the decoding information is 48 kHz, that performing a sound-quality enhancement process is included in the instruction in the reproduction-instruction information, and that an oversampling process to 96 kHz has been determined to be needed for the decoded PCM signal (No at ST407).

Since the control section 1100 determines that sampling-frequency conversion is needed (No at ST407), the control section 1100 instructs the sampling-frequency conversion section 1300 on an oversampling process of the decoded PCM signal (ST408), and the sampling-frequency conversion section 1300 performs an oversampling process according to the instruction of the control section 1100 (ST409).

Next, the acoustic processing section 1400 receives the reproduction-instruction information from the control section 1100 (ST410), and performs the acoustic processing on the decoded PCM signal according to the instruction (ST411).

The control section 1100 monitors the remaining amount status of the additional audio data of the additional-audio-data input buffer 1800 by the additional-audio-data-input-buffer remaining-amount monitoring means 1130 (ST412). In addition, the control section 1100 refers to the external-audio generation-condition decision table 1110 (FIG. 18), and determines the external-audio generation condition (a processing means used for generating the additional audio) based on the remaining amount status of the additional audio data of the additional-audio-data input buffer 1800 (ST413). Since this is a case where the processing load is relatively low, and an overflow state is detected as the remaining amount status of the additional audio data of the additional-audio-data input buffer 1800 (the remaining amount of the additional-audio-data input buffer is at or above a preset threshold), the processing means 2 (1512), which has a poorer acoustic properties of a processing result than those of the processing means 1 (1511), but has a lower computation process load than that of the processing means 1 (1511), is determined to be used. Furthermore, the control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST414).

The additional-audio addition section 1500 receives the additional audio data from the outside world (ST415), and generates the additional-audio PCM signal in the additional-audio generation section 1510 therein (ST416). In this process, processing by the processing means 2 (1512) is specified by the control section 1100 as the processing means used for generating the additional-audio PCM signal. Here, although the sampling frequency in the decoding information is 48 kHz, the sampling frequency of the additional-audio PCM signal needs to be 96 kHz because sampling-frequency conversion processing has been performed and thus the sampling frequency of the decoded PCM signal is 96 kHz, therefore the processing load is increased accordingly; however, using the processing means 2 (1512) allows the processing load to be reduced. After the additional-audio PCM signal is generated using the processing means 2 (1512) in the additional-audio generation section 1510, the decoded PCM signal and the additional-audio PCM signal are added together by the adder 1520 (ST417), and the result is output to the outside world as the output PCM signal (ST418).

As described above, in the fourth embodiment, the load of decoding process in the decoder section 1200 is higher in the <case 2> as compared with the <case 1>, and in addition, performing an oversampling process in the sampling-frequency conversion section 1300 causes the processing load during the reproduction process to be increased accordingly. However, since the additional-audio-data-input-buffer remaining-amount monitoring means 1130 is provided in the control section 1100, and the plurality of processing means 1511 and 1512, which are switchable depending on the processing load, are provided in the additional-audio generation section 1510, the additional-audio generation methods can be switched depending on the remaining amount status by monitoring the remaining amount of the additional-audio-data input buffer; therefore, designating the processing using the processing means 2 (1512) as the processing means in the additional-audio addition section 1500 allows the processing load for generating the additional-audio PCM signal to be reduced, thereby allows the processing load on the entire sound reproducing device to be reduced accordingly.

Fifth Embodiment

Figure 19:
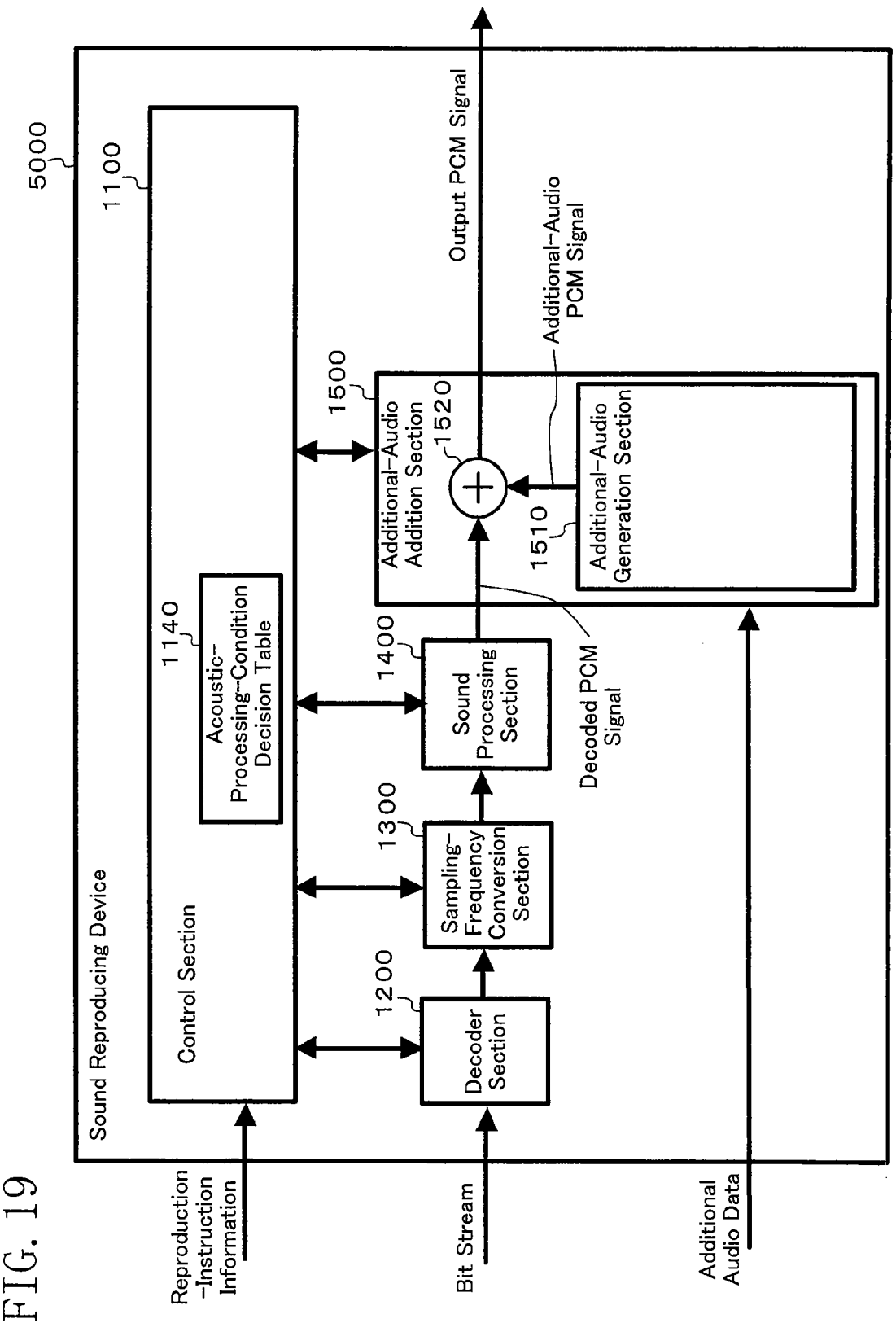
FIG. 19 is a block diagram illustrating a configuration of a sound reproducing device according to the fifth embodiment.

A configuration of a sound reproducing device according to the fifth embodiment is shown in FIG. 19. This sound reproducing device 5000 includes a control section 1100, a decoder section 1200, a sampling-frequency conversion section 1300, an acoustic processing section 1400, and an additional-audio addition section 1500.

The control section 1100 includes an acoustic-processing-condition decision table 1140 therein. The control section 1100 refers to the acoustic-processing-condition decision table 1140 based on the decoding information and the reproduction-instruction information, and determines an instruction on acoustic processing conditions (normal processing, processing with a portion skipped, and simple reproduction) for the acoustic processing section 1400.

FIG. 22 shows content of the acoustic-processing-condition decision table 1140. The acoustic-processing-condition decision table 1140 is a table for determining an instruction to specify the acoustic processing conditions in the acoustic processing section 1400 based on the decoding information and the reproduction-instruction information. In the acoustic-processing-condition decision table 1140, combinations of the decoding information and the reproduction-instruction information and the acoustic processing conditions are associated. In the acoustic-processing-condition decision table 1140 of FIG. 22, combinations of decoder types, sampling frequencies FS, and channel configurations are set as the decoding information. Here, AC3, AAC, and linear PCM are set for the decoder type. For the sampling frequency FS, only 48 kHz is set when the decoder type is AC3 or AAC, and 48 kHz or 96 kHz is set when the decoder type is linear PCM. For the channel configuration, two types, which are two-channel and multi-channel, are set for each decoder type. In addition, in the acoustic-processing-condition decision table 1140 of FIG. 22, "neither the function A nor the function B is performed" (None), "only the function A is performed" (Function A), "only the function B is performed" (Function B), and "both the functions A and B are performed" (Function A+Function B) are set for the reproduction-instruction information. In the acoustic-processing-condition decision table 1140 of FIG. 22, the combinations of respective decoding information contents and respective reproduction-instruction information contents are associated with the acoustic processing conditions, which herein are: "no acoustic processing is performed" (None), "normal acoustic processing" (Normal Mode), "normal acoustic processing with a portion skipped" (Reduced Mode), and "simple acoustic processing" (Simple Mode). Note that, for simplicity of explanation here, it is assumed that the sampling frequency needs to be converted to 96 kHz if the function B is performed.

Next, the operation of the sound reproducing device 5000 configured as described above will be described with reference to the flowchart shown in FIGS. 20-21. Note that, for simplicity of explanation here, operations in the following two cases will be described.

(Case 1)
Decoding information—Decoder type: AC3, sampling frequency: 48 kHz, channel configuration: two-channel (AC3, FS=48 kHz, two-channel)
Reproduction-instruction information—Of the functions A and B, only the function A is performed (Function A).

(Case 2)
Decoding information—Decoder type: AAC, sampling frequency: 48 kHz, channel configuration: multi-channel (AAC, FS=48 kHz, multi-channel)
Reproduction-instruction information—Both the functions A and B are performed (Function A+Function B).

(Operation in Case 1)
First, the decoder section 1200 decodes an audio bit stream input from the outside world, and generates a decoded PCM signal (ST501 and ST502); then, obtains decoding information when decoding the audio bit stream, and outputs the decoding information to the control section 1100 (ST503).

The control section 1100 receives an instruction to perform a function A as reproduction-instruction information from the outside world, and receives the decoding information from the decoder section 1200 (ST505). At this stage, information on the decoder type (AC3), the sampling frequency (48 kHz), and the channel configuration (two-channel) is obtained as the decoding information. Since performing a function B is not included in the instruction, it is determined that sampling-frequency conversion processing of the decoded PCM signal is not needed (Yes at ST507).

Since the control section 1100 determines that sampling-frequency conversion processing is not needed (Yes at ST507), there is no need to perform sampling-frequency conversion processing of the decoded PCM signal (ST508 and ST509) in the sampling-frequency conversion section 1300.

The control section 1100 refers to the acoustic-processing-condition decision table 1140 (FIG. 22) for determining the acoustic processing conditions, determines to perform the function A in a normal mode as the acoustic processing on which to instruct the acoustic processing section 1400, based on the decoding information (decoder type: AC3, sampling frequency FS: 48 kHz, channel configuration: two-channel) as well as the reproduction-instruction information (only the function A is performed) (ST506), and instructs the acoustic processing section 1400 to perform the corresponding acoustic processing (ST510).

Next, the acoustic processing section 1400 receives the instruction on the acoustic processing from the control section 1100 (ST510), and performs the acoustic processing corresponding to the function A on the decoded PCM signal according to the instruction (ST511). The reproduction-instruction information here does not include sound-quality enhancement process, which corresponds to the function B.

The control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST512).

The additional-audio addition section 1500 receives the additional audio data from the outside world (ST513), and generates the additional-audio PCM signal in the additional-audio generation section 1510 (ST514); then, the decoded PCM signal and the additional-audio PCM signal are added together by the adder 1520 (ST515), and the result is output to the outside world as the output PCM signal (ST516).

(Operation in Case 2)
First, the decoder section 1200 decodes an audio bit stream input from the outside world, and generates a decoded PCM signal (ST501 and ST502); then, obtains decoding information when decoding the audio bit stream, and outputs the decoding information to the control section 1100 (ST503).

The control section 1100 receives an instruction to perform functions A and B as reproduction-instruction information from the outside world, and receives the decoding information from the decoder section 1200 (ST505). At this stage, information on the decoder type (AAC), the sampling frequency (48 kHz), and the channel configuration (multi-channel) is obtained as the decoding information. Here, since the sampling frequency is 48 kHz, and performing the function B is included in the instruction, it is determined that sampling-frequency conversion processing is needed for the decoded PCM signal (No at ST507).

Since the control section 1100 determines that sampling-frequency conversion is needed (No at ST507), the control section 1100 instructs the sampling-frequency conversion section 1300 on an oversampling process of the decoded PCM signal (ST508), and the sampling-frequency conversion section 1300 performs an oversampling process according to the instruction of the control section 1100 (ST509).

The control section 1100 refers to the acoustic-processing-condition decision table 1140 (FIG. 22) for determining the acoustic processing conditions, determines to perform the function A in a normal mode and the function B in a simple mode as the acoustic processing on which to instruct the acoustic processing section 1400, based on the decoding information (decoder type: AAC, sampling frequency FS: 48 kHz, channel configuration: multi-channel) as well as the reproduction-instruction information (both the functions A and B are performed) (ST506), and instructs the acoustic processing section 1400 to perform the corresponding acoustic processing (ST510).

Next, the acoustic processing section 1400 receives the instruction on the acoustic processing from the control section 1100 (ST510), and performs the acoustic processing corresponding to the functions A and B on the decoded PCM signal according to the instruction (ST511).

The control section 1100 transmits the sampling frequency information on the output PCM signal to the additional-audio addition section 1500, instructs the additional-audio addition section 1500 to generate an additional-audio PCM signal, and instructs the additional-audio addition section 1500 to add the additional-audio PCM signal with the decoded PCM signal after the acoustic processing (ST512).

The additional-audio addition section 1500 receives the additional audio data from the outside world (ST513), and generates the additional-audio PCM signal in the additional-audio generation section 1510 (ST514); then, the decoded PCM signal and the additional-audio PCM signal are added together by the adder 1520 (ST515), and the result is output to the outside world as the output PCM signal (ST516).

As described above, in the fifth embodiment, the load of decoding process in the decoder section 1200 is higher in the <case 2> as compared with the <case 1>, and in addition, performing an oversampling process in the sampling-frequency conversion section 1300 causes the processing load during the reproduction process to be increased accordingly. However, by providing the acoustic-processing-condition decision table 1140 in the control section 1100, and by providing an instruction for the acoustic processing section 1400 to skip a portion of the processing, or to switch to simple reproduction, the processing load on the entire sound reproducing device is reduced accordingly even when the processing load is high, thereby allowing it to be easier to prevent the amount of processing from exceeding the limit of ability.

Sixth Embodiment

Figure 23:
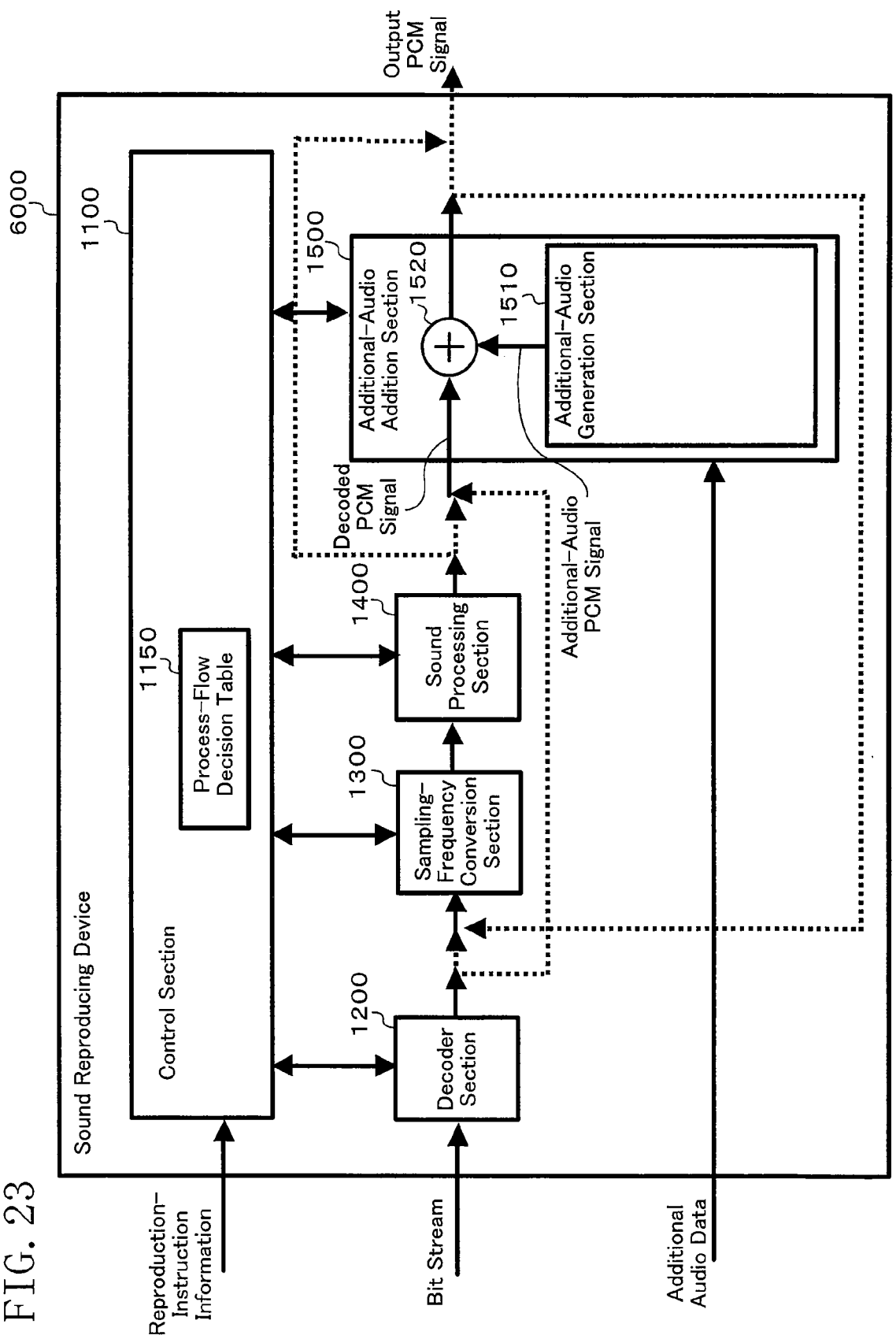
FIG. 23 is a block diagram illustrating a configuration of a sound reproducing device according to the sixth embodiment.

A configuration of a sound reproducing device according to the sixth embodiment is shown in FIG. 23. Similarly to that of the fifth embodiment (FIG. 19), this sound reproducing device 6000 includes a control section 1100, a decoder section 1200, a sampling-frequency conversion section 1300, an acoustic processing section 1400, and an additional-audio addition section 1500.

The difference from the fifth embodiment (FIG. 19) is that the table included in the control section 1100 is a process-flow decision table 1150, and that the content of determination conditions indicated in the process-flow decision table 1150 as well as the order of the processes on which the control section 1100 instructs the sampling-frequency conversion section 1300, the acoustic processing section 1400, and the additional-audio addition section 1500 are different.

FIG. 27 shows content of the process-flow decision table 1150. The process-flow decision table 1150 is a table for determining an instruction to specify the processing order with respect to the sampling-frequency conversion section 1300, the acoustic processing section 1400, and the additional-audio addition section 1500, based on the decoding information and the reproduction-instruction information. In the process-flow decision table 1150, combinations of the decoding information and the reproduction-instruction information and the processing orders are associated. In the process-flow decision table 1150 of FIG. 27, combinations of decoder types, sampling frequencies FS, and channel configurations are set as the decoding information. Here, AC3, AAC, and linear PCM are set for the decoder type. For the sampling frequency FS, only 48 kHz is set when the decoder type is AC3 or AAC, and 48 kHz or 96 kHz is set when the decoder type is linear PCM. For the channel configuration, two types, which are two-channel and multi-channel, are set for each decoder type. In addition, in the process-flow decision table 1150 of FIG. 27, "neither the function A nor the function B is performed" (None), "only the function A is performed" (Function A), "only the function B is performed" (Function B), and "both the functions A and B are performed" (Function A+Function B) are set for the reproduction-instruction information. In the process-flow decision table 1150 of FIG. 27, the combinations of respective decoding information contents and respective reproduction-instruction information contents are associated with the processing orders, which herein are: "normal processing order" (Normal Flow) and "the process of the additional-audio addition section 1500 precedes" (Additional-Audio Addition Process Precedes). Note that, for simplicity of explanation here, it is assumed that the sampling frequency needs to be converted to 96 kHz if the function B is performed.

Next, the operation of the sound reproducing device 6000 configured as described above will be described with reference to the flowchart shown in FIGS. 24-26. Note that, for simplicity of explanation here, operations in the following two cases will be described.

(Case 1)
Decoding information—Decoder type: AC3, sampling frequency: 48 kHz, channel configuration: two-channel
Reproduction-instruction information—Of the functions A and B, only the function A is performed.
(Case 2)
Decoding information—Decoder type: AAC, sampling frequency: 48 kHz, channel configuration: multi-channel
Reproduction-instruction information—Both the functions A and B are performed.

(Operation in Case 1)
First, the decoder section 1200 decodes an audio bit stream input from the outside world, and generates a decoded PCM signal (ST601 and ST602); then, obtains decoding information when decoding the audio bit stream, and outputs the decoding information to the control section 1100 (ST603).

The control section 1100 receives an instruction to perform a function A as reproduction-instruction information from the outside world, and receives the decoding information from the decoder section 1200 (ST605). Then, the control section 1100 refers to the process-flow decision table 1150 (FIG. 27) for determining the process flow after the decoding process of the decoder section 1200, and determines the processing order based on the decoding information (decoder type: AC3, sampling frequency FS: 48 kHz, channel configuration: two-channel) as well as the reproduction-instruction information (only the function A is performed) (ST606). Here, it is determined that processing of the sampling-frequency conversion section 1300 is not needed, and that the additional-audio addition process is performed after the processing in the acoustic processing section 1400 (Yes at ST607). According to a reference result of the process-flow decision table 1150, the acoustic processing section 1400 is first instructed to perform the acoustic processing (ST611).

The acoustic processing section 1400 receives the instruction on the acoustic processing from the control section 1100, and performs the acoustic processing corresponding to the function A on the decoded PCM signal according to the instruction (ST612). The acoustic-processing-instruction information here does not include sound-quality enhancement process, which corresponds to the function B.

The additional-audio addition section 1500 receives the additional audio data from the outside world (ST614), and generates the additional-audio PCM signal in the additional-audio generation section 1510 (ST615); then, the decoded PCM signal and the additional-audio PCM signal are added together by the adder 1520 (ST616), and the result is output to the outside world as the output PCM signal (ST617).

(Operation in Case 2)
First, the decoder section 1200 decodes an audio bit stream input from the outside world, and generates a decoded PCM signal (ST601 and ST602); then, obtains decoding information when decoding the audio bit stream, and outputs the decoding information to the control section 1100 (ST603).

The control section 1100 receives an instruction to perform functions A and B as reproduction-instruction information from the outside world, and receives the decoding information from the decoder section 1200 (ST605). Then, the control section 1100 refers to the process-flow decision table 1150

(FIG. 27) for determining the process flow after the decoding process of the decoder section 1200, and determines the processing order based on the decoding information (decoder type: AAC, sampling frequency FS: 48 kHz, channel configuration: multi-channel) as well as the reproduction-instruction information (both the functions A and B are performed) (ST606). Here, it is determined that the additional-audio addition process in the additional-audio addition section 1500 is first performed, the processing in the sampling-frequency conversion section 1300 is next performed, and the acoustic processing in the acoustic processing section 1400 is then performed (Additional-Audio Addition Process Precedes) (No at ST607). According to a reference result of the process-flow decision table 1150, the additional-audio addition section 1500 is first instructed to perform the additional-audio addition process (ST618).

The additional-audio addition section 1500 receives the additional audio data from the outside world (ST619), and generates the additional-audio PCM signal in the additional-audio generation section 1510 (ST620); then, the decoded PCM signal and the additional-audio PCM signal are added together by the adder 1520 (ST621). Here, an oversampling process is not performed on the additional-audio PCM signal in the additional-audio generation section 1510.

Next, since the control section 1100 determines that sampling-frequency conversion is needed (No at ST623), the control section 1100 instructs the sampling-frequency conversion section 1300 on an oversampling process of the output PCM signal output from the additional-audio addition section 1500 (ST624), and the sampling-frequency conversion section 1300 performs an oversampling process according to the instruction of the control section 1100 (ST625).

In addition, the control section 1100 instructs the acoustic processing section 1400 to perform the acoustic processing (ST626). The acoustic processing section 1400 receives the instruction on the acoustic processing from the control section 1100, performs the acoustic processing corresponding to the functions A and B on the decoded PCM signal according to the instruction (ST627), and outputs a result to the outside world as the output PCM signal (ST628).

As described above, in the sixth embodiment, the load of decoding process in the decoder section 1200 is higher in the <case 2> as compared with the <case 1>, and in addition, performing an oversampling process in the sampling-frequency conversion section 1300 causes the processing load during the reproduction process to be increased accordingly. However, by providing the process-flow decision table 1150 in the control section 1100, and by configuring so that the processing and the additive processes of the additional audio data in the additional-audio addition section 1500 are performed at stages earlier than the sampling-frequency conversion processing in the sampling-frequency conversion section 1300 when the processing load is high, the processing load of the sampling-frequency conversion generated in the processing process of the additional audio data can be reduced, thereby allowing it to be easier to prevent the amount of processing in the entire sound reproducing device from exceeding the limit of ability accordingly. In this case, since the acoustic processing in the acoustic processing section 1400 is performed after the mixing process of additional audio, the acoustic processing is also performed on the additional audio; however, there is no need to reduce the sampling frequency of the output PCM signal, thus sound quality degradation of the PCM decoded by the decoder section 1200 can be reduced, and a sound-quality enhancement process requested from the outside world can be implemented.

Seventh Embodiment

In the first to sixth embodiments, since it is assumed that the sound reproducing devices 1000-6000 are each implemented on a single independent processor, each processing load of the entire sound reproducing devices 1000-6000 is fixed. On the contrary, in the seventh to eleventh embodiments hereinafter, it is assumed that the sound reproducing devices are each implemented on a single processor (system) together with other processing devices. In these cases, the processing load of an entire sound reproducing device varies depending on the system load (e.g., use case, etc.), thus the processing load of an entire sound reproducing device needs to be managed.

Figure 28:
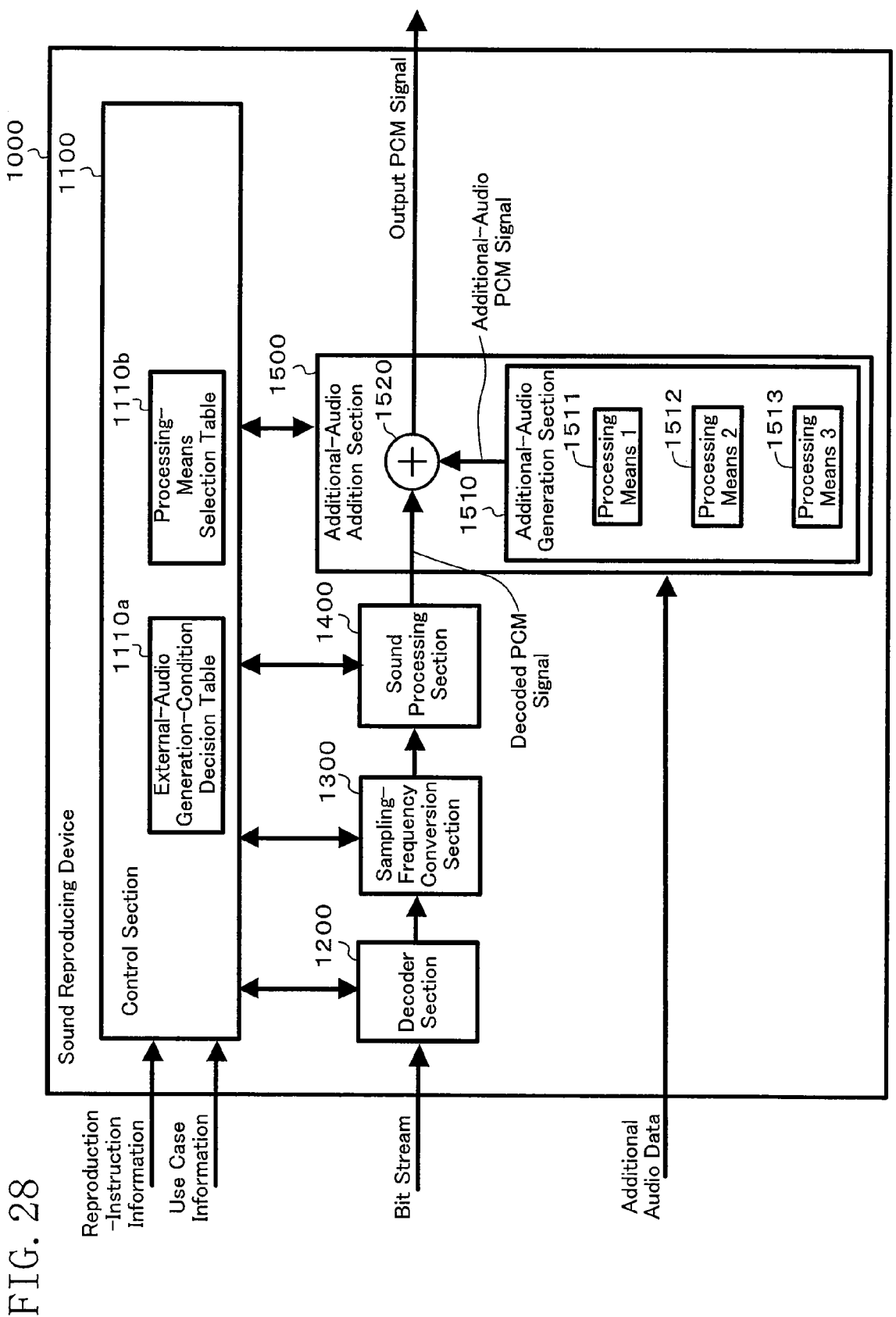
FIG. 28 is a block diagram illustrating a configuration of a sound reproducing device according to the seventh embodiment.

A configuration of a sound reproducing device according to the seventh embodiment is shown in FIG. 28. This sound reproducing device is assumed to be in a form in which the sound reproducing device 1000 (FIG. 1) of the first embodiment is implemented on a single processor (system) together with other processing devices.

In this embodiment, the control section 1100 receives reproduction-instruction information and use case information from the outside world, and the decoding information from the decoder section 1200, determines whether or not to perform sampling frequency conversion and whether or not to perform various acoustic processing on the decoded PCM signal, and instructs the sampling-frequency conversion section 1300, the acoustic processing section 1400, and the additional-audio addition section 1500 on processing. The use case information is an example of information which represents the load of a system in which the sound reproducing device 1000 is incorporated. The control section 1100 includes therein an acoustic-processing load-condition decision table 1110a and a processing-means selection table 1110b, refers to the acoustic-processing load-condition decision table 1110a and the processing-means selection table 1110b based on the decoding information, the reproduction-instruction information, and the use case information, and determines a processing means for an additional-audio PCM signal in an additional-audio generation section 1510.

The additional-audio generation section 1510 includes three kinds of processing means 1511, 1512, and 1513 for generating the additional-audio PCM signal. Here, it is assumed that the order of processing means in descending order of amount of computation process load is: the processing means 1 (1511), the processing means 2 (1512), and the processing means 3 (1513); and that the order of processing means in descending order of goodness of acoustic properties of a processing result is: the processing means 1 (1511), the processing means 2 (1512), and the processing means 3 (1513). These three kinds of processing means 1511, 1512, and 1513 are selectively used according to an instruction from the control section 1100.

FIG. 29 shows content of the acoustic-processing load-condition decision table 1110a. In the acoustic-processing load-condition decision table 1110a, combinations of the decoding information and the reproduction-instruction information and processing-means pointer information are associated. In the acoustic-processing load-condition decision table 1110a of FIG. 29, combinations of decoder types, sampling frequencies FS, and channel configurations are set as the decoding information. Here, AC3, AAC, and linear PCM are set for the decoder type. For the sampling frequency FS, only 48 kHz is set when the decoder type is AC3 or AAC, and 48 kHz or 96 kHz is set when the decoder type is linear PCM. For the channel configuration, two types, which are two-channel and multi-channel, are set for each decoder type. In addition, in the acoustic-processing load-condition decision table 1110a of FIG. 29, "neither the function A nor the function B is performed" (None), "only the function A is performed" (Function A), "only the function B is performed" (Function B), and "both the functions A and B are performed" (Function A+Function B) are set for the reproduction-instruction information. Furthermore, in the acoustic-processing load-condition decision table 1110a of FIG. 29, the combinations of respective decoding information contents and respective reproduction-instruction information contents are associated with pointer 1 or pointer 2. Note that, for simplicity of explanation here, it is assumed that the sampling frequency needs to be converted to 96 kHz if the function B is performed.

FIG. 30 shows content of the processing-means selection table 1110b. In the processing-means selection table 1110b, combinations of the use case information and the processing-means pointer information and the processing means are associated. In the processing-means selection table 1110b of FIG. 30, use cases 1, 2, and 3 are set as the use case information, and pointers 1 and 2 are set as the processing-means pointer information. Furthermore, the combinations of respective use case information contents and respective processing-means pointer information contents are associated with the processing means 1, the processing means 2, or the processing means 3. Note that, by way of example here, it is assumed that single reproduction of a medium (video and audio) is set as the use case 1; single reproduction of a medium (audio only) is set as the use case 2; and simultaneous processing of media reproduction and interne connection is set as the use case 3.

Figure 31:
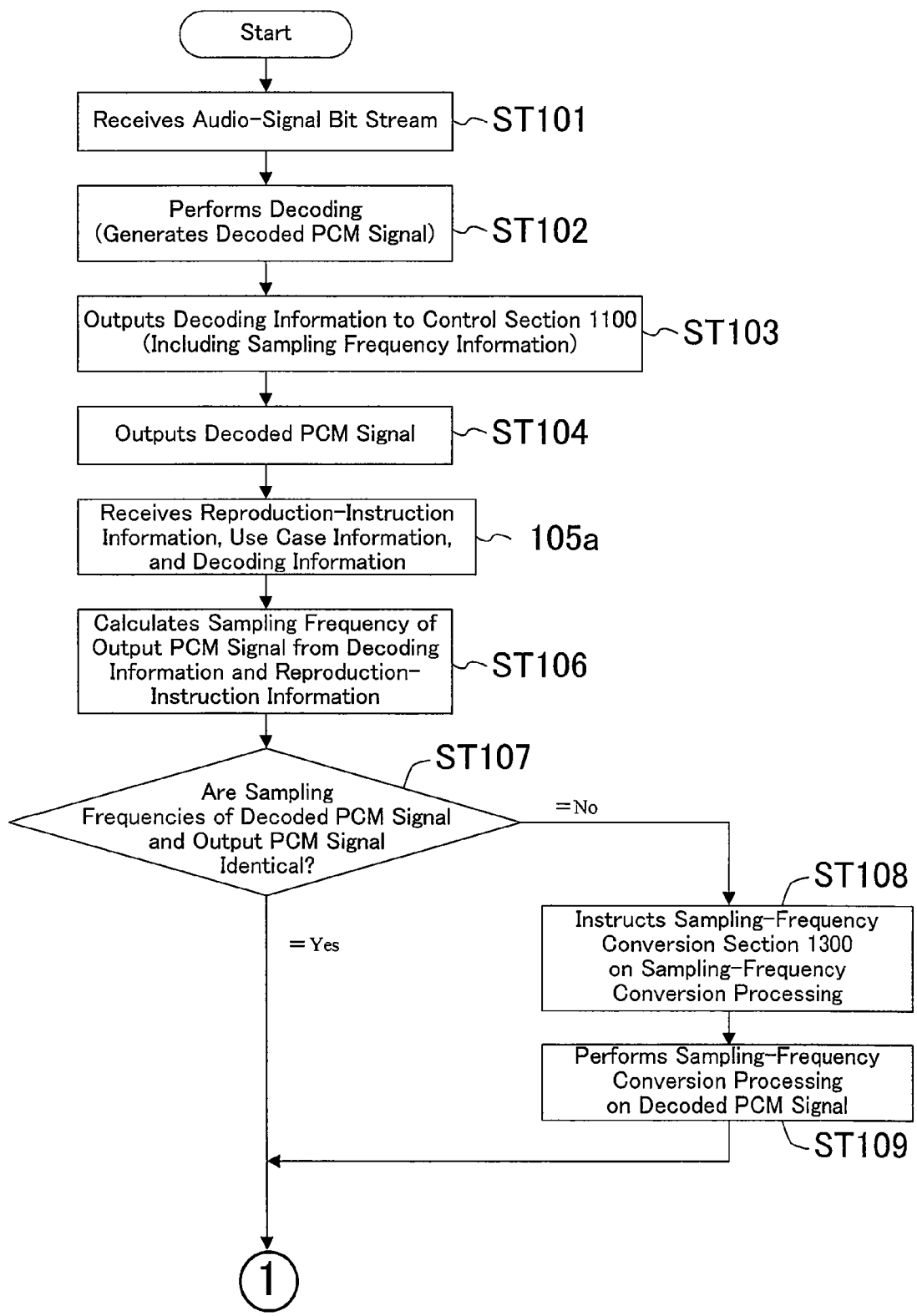
FIG. 31 is a flowchart showing a procedure of the sound reproducing device according to the seventh embodiment.
Figure 32:
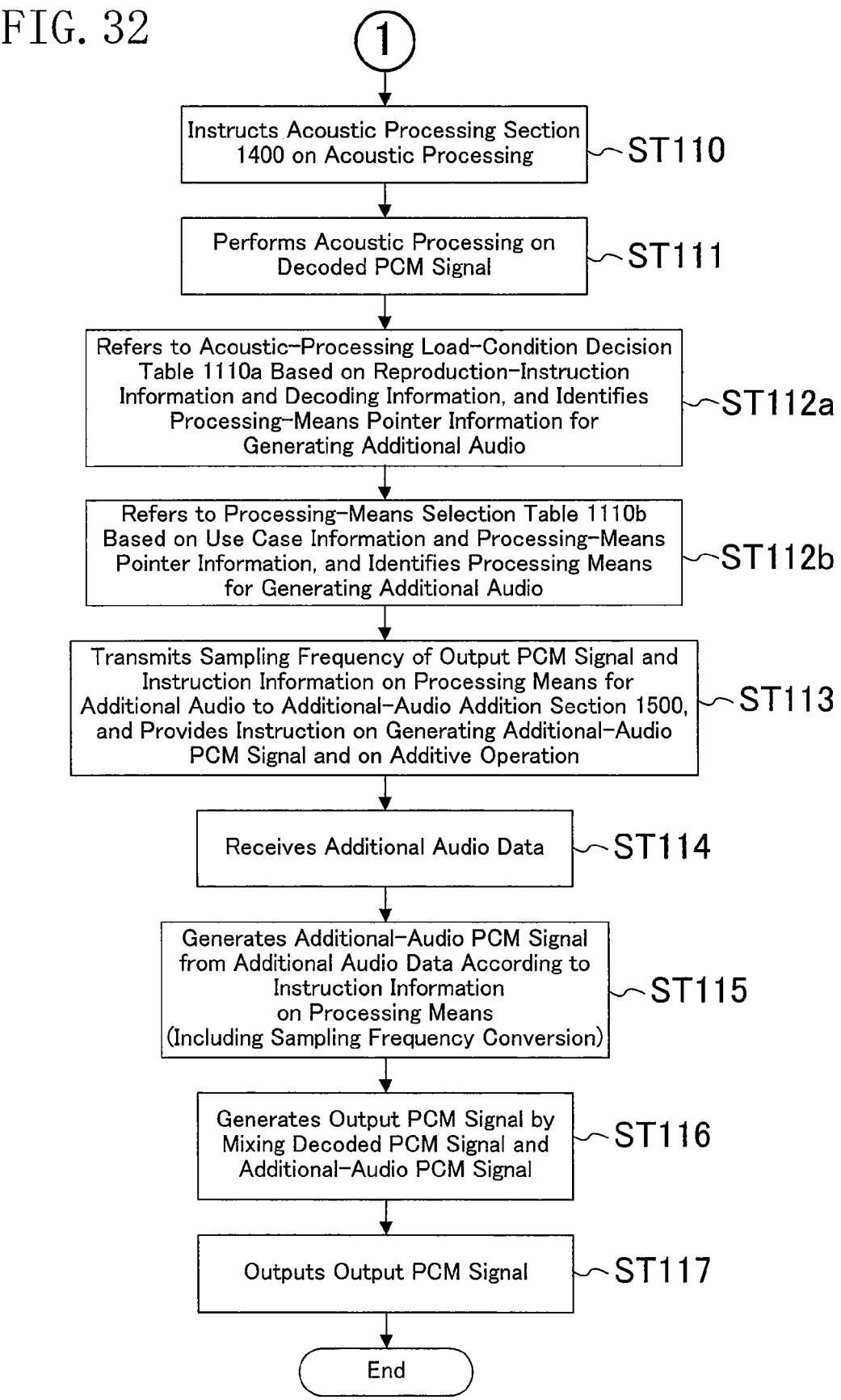
FIG. 32 is a flowchart showing a procedure of the sound reproducing device according to the seventh embodiment.

The process flow performed by the sound reproducing device 1000 according to this embodiment is illustrated in FIGS. 31-32. The flowchart shown in FIGS. 31-32 is very similar to the flowchart shown in FIGS. 2-3. However, this embodiment is different in that step ST105a (FIG. 31) is executed instead of the step ST105 (FIG. 2), and in that steps ST112a and ST112b (FIG. 32) are executed instead of the step ST112 (FIG. 3). The operation in these different steps will be described below.

At step ST105a, the control section 1100 also receives the use case information, in addition to the reproduction-instruction information, from the outside world, and receives the decoding information from the decoder section 1200.

At step ST112a, the control section 1100 refers to the acoustic-processing load-condition decision table 1110a (FIG. 29), and identifies processing-means pointer information associated with the reproduction-instruction information and the decoding information received at step ST105a.

At step ST112b, the control section 1100 refers to the processing-means selection table 1110b (FIG. 30), and identifies a processing means associated with the use case information received at step ST105a and with the processing-means pointer information identified at step ST112a.

As described above, in the seventh embodiment, since a processing means is identified based on system load information (use case information) and acoustic-processing load condition (reproduction-instruction information and decoding information), similar advantages to those described for the first embodiment are also provided when the sound reproducing device 1000 is implemented on a single processor (system) together with other processing devices.

Eighth Embodiment

A sound reproducing device according to the eighth embodiment is a variation of the sound reproducing device according to the seventh embodiment, and has a similar configuration thereto. However, in this embodiment, the control section 1100 includes therein an acoustic-processing load-condition decision table 1110c, a use-case-information conversion table 1110d, and a pointer-information conversion table 1110e; refers to these tables 1110c, 1110d, and 1110e based on the decoding information, the reproduction-instruction information, and the use case information; and determines a processing means for an additional-audio PCM signal in the additional-audio generation section 1510.

FIG. 33 shows contents of the acoustic-processing load-condition decision table 1110c, the use-case-information conversion table 1110d, and the pointer-information conversion table 1110e. In the acoustic-processing load-condition decision table 1110c, combinations of the decoding information and the reproduction-instruction information and differential pointer values are associated. In addition, in the use-case-information conversion table 1110d, the use case information and the differential pointer values are associated. In the pointer-information conversion table 1110e, total pointer values and the processing means are associated.

Figure 34:
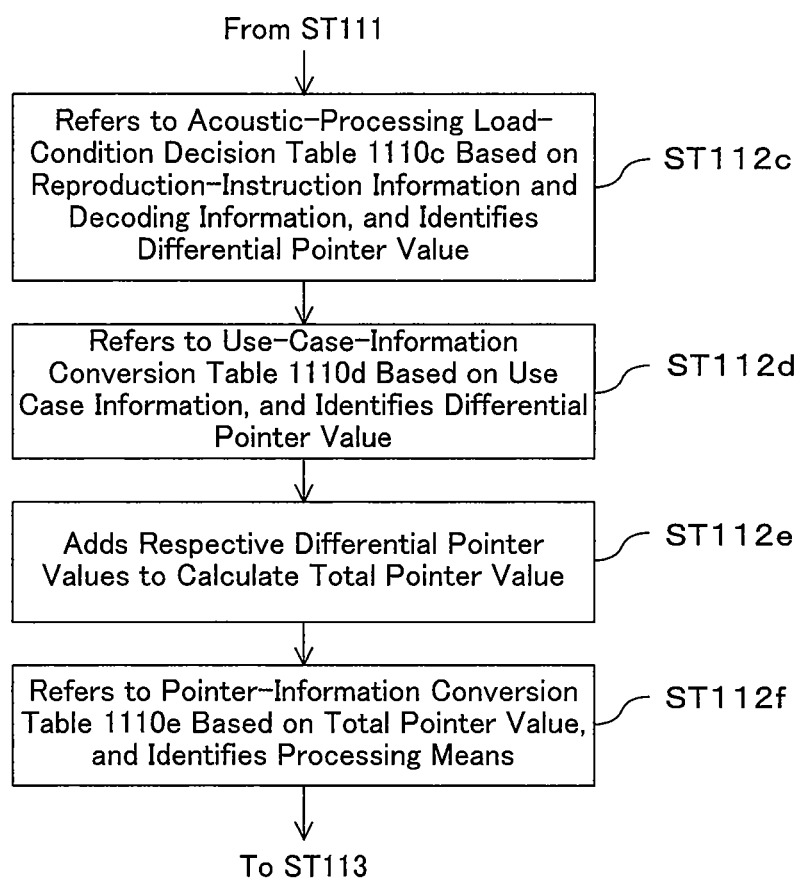
FIG. 34 is a flowchart showing a procedure of the sound reproducing device according to the eighth embodiment.

The process flow performed by the sound reproducing device of this embodiment is very similar to that of the flow-chart shown in FIGS. 31-32. However, this embodiment is different in that steps ST112c, ST112d, ST112e, and ST112f (FIG. 34) are executed instead of the steps ST112a and ST112b (FIG. 32). The operation in these different steps will be described below.

At step ST112c, the control section 1100 refers to the acoustic-processing load-condition decision table 1110c (FIG. 33), and identifies a differential pointer value associated with the reproduction-instruction information and the decoding information received at step ST105a.

At step ST112d, the control section 1100 refers to the use-case-information conversion table 1110d (FIG. 33), and identifies a differential pointer value associated with the use case information received at step ST105a.

At step ST112e, the control section 1100 adds the differential pointer value identified at step ST112c with the differential pointer value identified at step ST112d to calculates a total pointer value.

At step ST112f, the control section 1100 refers to the pointer-information conversion table 1110e (FIG. 33), and identifies a processing means associated with the total pointer value calculated at step ST112e.

Ninth Embodiment

A sound reproducing device according to the ninth embodiment is assumed to be in a form in which the sound reproducing device 2000 (FIG. 5) of the second embodiment is implemented on a single processor (system) together with other processing devices, and has a similar configuration thereto.

However, in this embodiment, the control section 1100 receives reproduction-instruction information and use case information from the outside world, and the decoding information from the decoder section 1200, determines whether or not to perform sampling frequency conversion and whether or not to perform various acoustic processing on the decoded PCM signal, and instructs the sampling-frequency conversion section 1300, the acoustic processing section 1400, and the additional-audio addition section 1500 on processing. The control section 1100 includes therein the acoustic-processing load-condition decision table 1110c, the use-case-information conversion table 1110d, and the pointer-information conversion table 1110e; refers to these tables 1110c, 1110d, and 1110e based on the decoding information, the reproduction-instruction information, and the use case information; and determines which to use, externally-input additional audio data or internally-installed additional audio data, as the sound source of an additional-audio PCM signal supplied from the additional-audio generation section 1510 to the adder 1520 in the additional-audio addition section 1500.

FIG. 35 shows contents of the acoustic-processing load-condition decision table 1110c, the use-case-information conversion table 1110d, and the pointer-information conversion table 1110e. In the acoustic-processing load-condition decision table 1110c, combinations of the decoding information and the reproduction-instruction information and differential pointer values are associated. In addition, in the use-case-information conversion table 1110d, the use case information and the differential pointer values are associated. In the pointer-information conversion table 1110e, total pointer values and external-audio generation conditions (Externally Input and Internally Installed) are associated.

Figure 6:
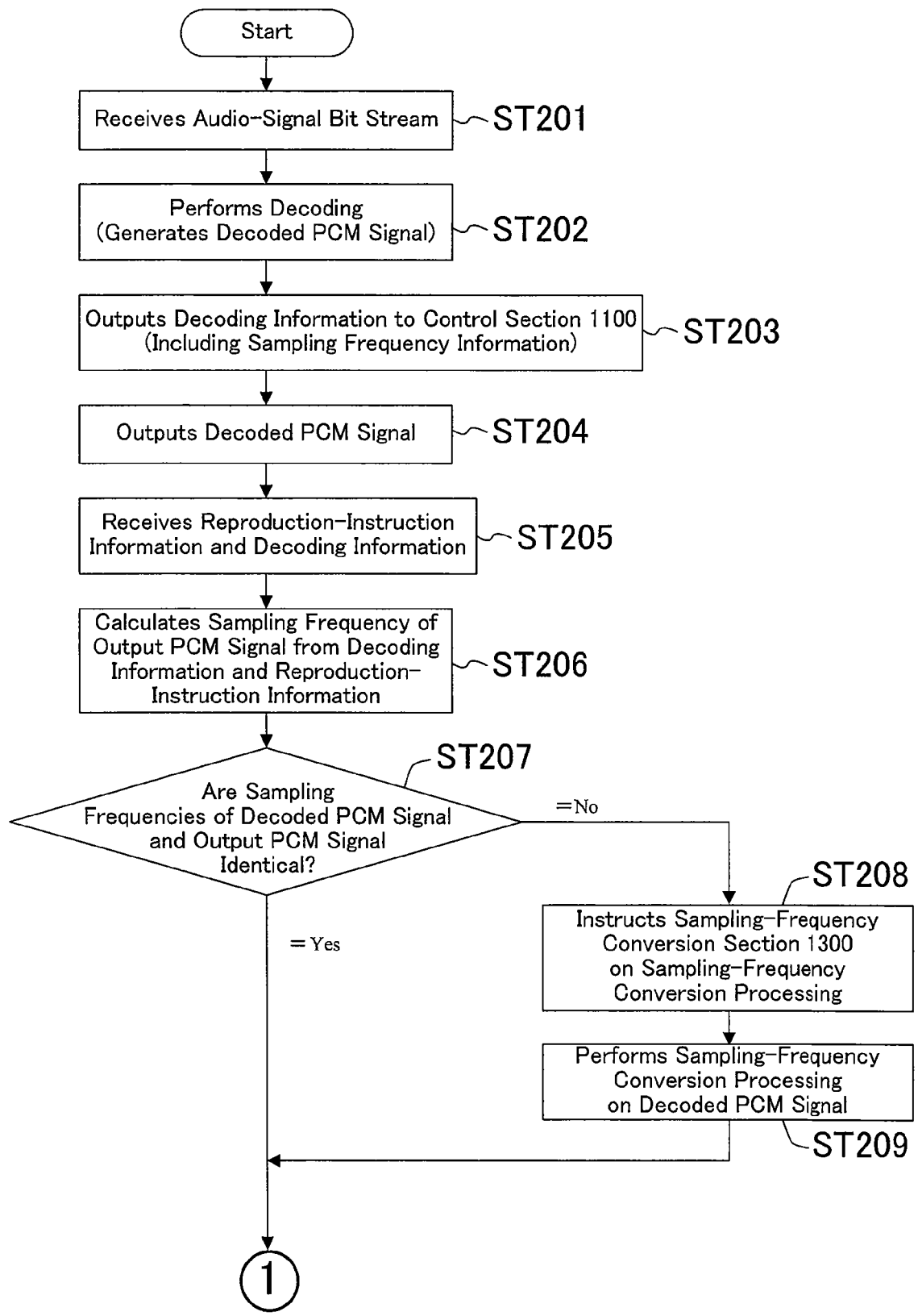
FIG. 6 is a flowchart showing a procedure of the sound reproducing device according to the second embodiment.
Figure 7:
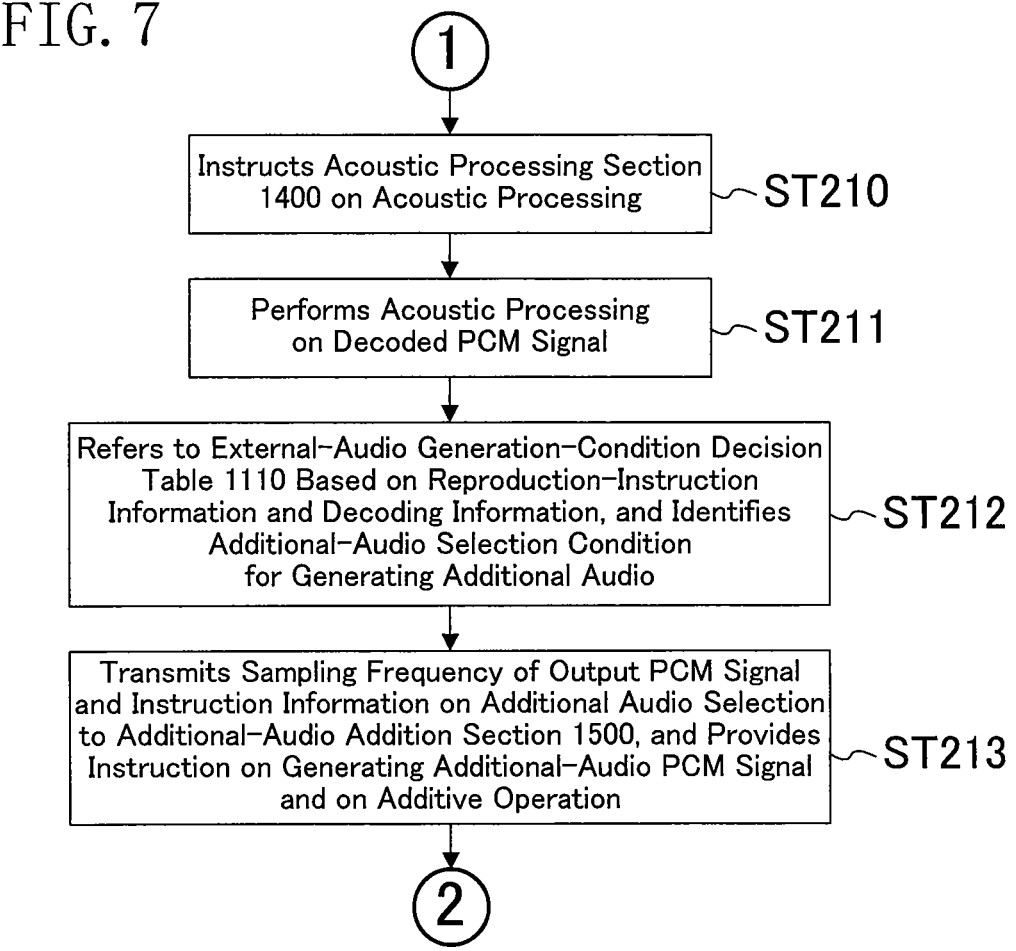
FIG. 7 is a flowchart showing a procedure of the sound reproducing device according to the second embodiment.
Figure 8:
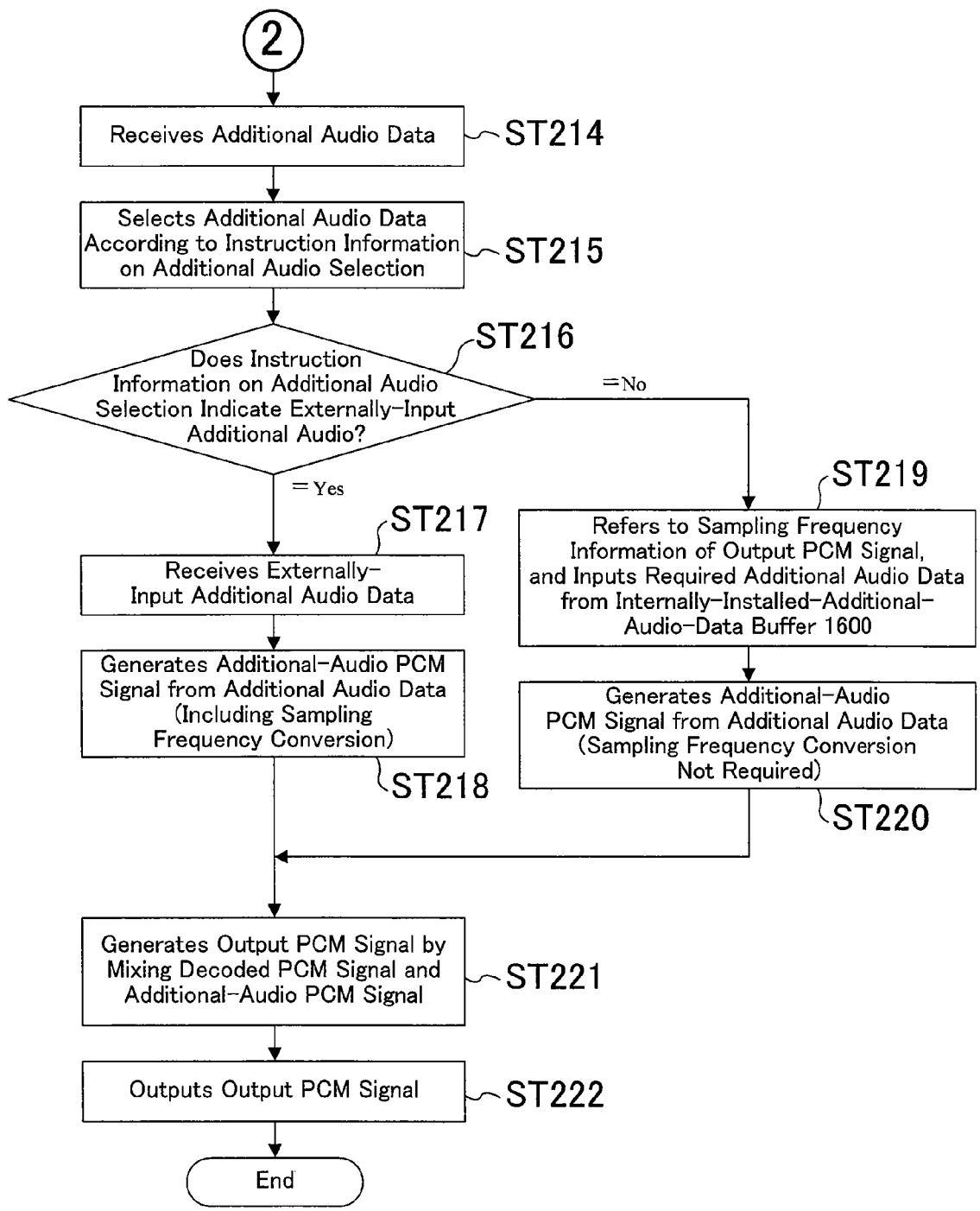
FIG. 8 is a flowchart showing a procedure of the sound reproducing device according to the second embodiment.
Figure 36:
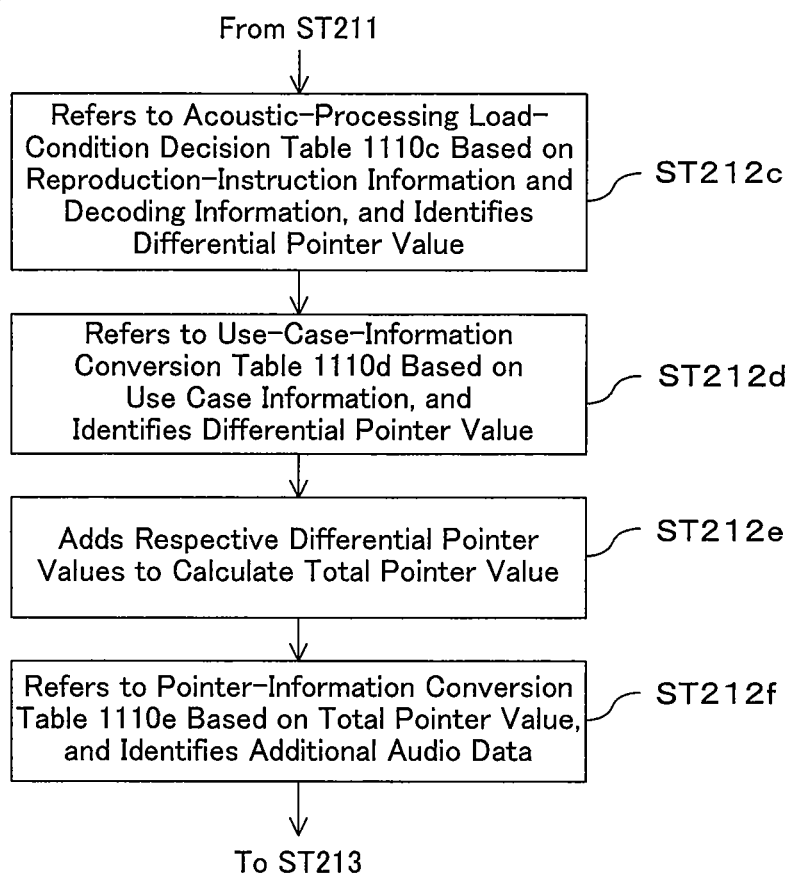
FIG. 36 is a flowchart showing a procedure of the sound reproducing device according to the ninth embodiment.

The process flow performed by the sound reproducing device of this embodiment is very similar to that of the flowchart shown in FIGS. 6-8. However, this embodiment is different in that step ST105a (FIG. 31) is executed instead of the step ST205 (FIG. 6), and in that steps ST212c, ST212d, ST212e, and ST212f (FIG. 36) are executed instead of the step ST212 (FIG. 7). The operation in these different steps will be described below.

The operation at step ST105a is similar to that of the seventh embodiment described above.

At step ST212c, the control section 1100 refers to the acoustic-processing load-condition decision table 1110c (FIG. 35), and identifies a differential pointer value associated with the reproduction-instruction information and the decoding information received at step ST105a.

At step ST212d, the control section 1100 refers to the use-case-information conversion table 1110d (FIG. 35), and identifies a differential pointer value associated with the use case information received at step ST105a.

At step ST212e, the control section 1100 adds the differential pointer value identified at step ST212c with the differential pointer value identified at step ST212d to calculates a total pointer value.

At step ST212f, the control section 1100 refers to the pointer-information conversion table 1110e (FIG. 35), and identifies an external-audio generation condition (Externally Input or Internally Installed) associated with the total pointer value calculated at step ST212e.

Tenth Embodiment

A sound reproducing device according to the tenth embodiment is assumed to be in a form in which the sound reproducing device 5000 (FIG. 19) of the fifth embodiment is implemented on a single processor (system) together with other processing devices, and has a similar configuration thereto.

However, in this embodiment, the control section 1100 includes therein a decoding-process load-condition conversion table 1140a, a use-case-information conversion table 1140b, and an acoustic-processing load-condition decision table 1140c. The control section 1100 refers to these tables 1140a, 1140b, and 1140c based on the decoding information, the reproduction-instruction information, and the use case information, and determines an instruction on acoustic processing conditions (normal processing, processing with a portion skipped, and simple reproduction) for the acoustic processing section 1400.

FIG. 37 shows contents of the decoding-process load-condition conversion table 1140a, the use-case-information conversion table 1140b, and the acoustic-processing load-condition decision table 1140c. In the decoding-process load-condition conversion table 1140a, the decoding information and pointer values are associated. In the use-case-information conversion table 1140b, the use case information and the differential pointer values are associated. In the acoustic-processing load-condition decision table 1140c, combinations of total pointer values and the reproduction-instruction information and acoustic processing conditions (None, Normal Mode, Reduced Mode, and Simple Mode) are associated.

Figure 20:
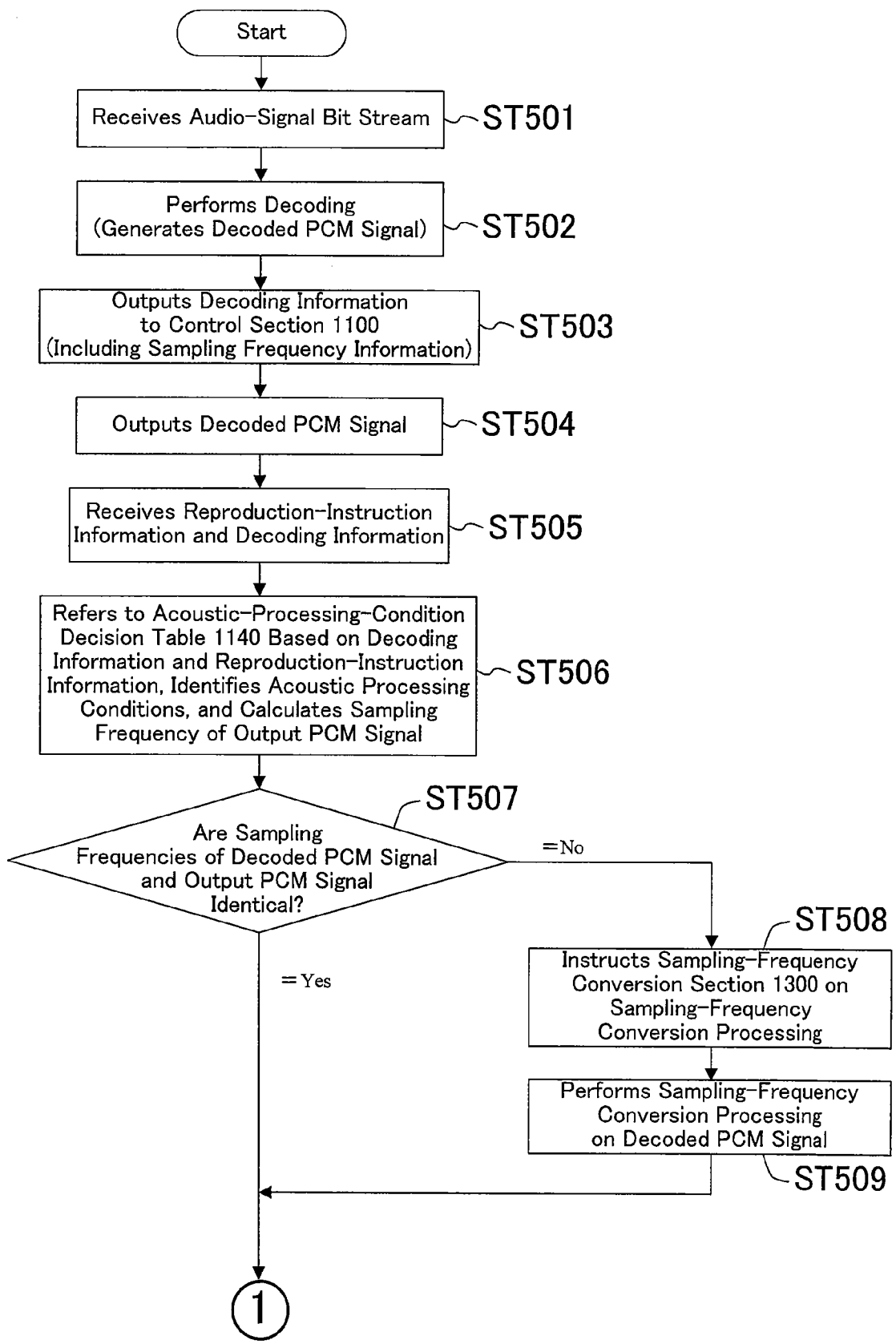
FIG. 20 is a flowchart showing a procedure of the sound reproducing device according to the fifth embodiment.
Figure 21:
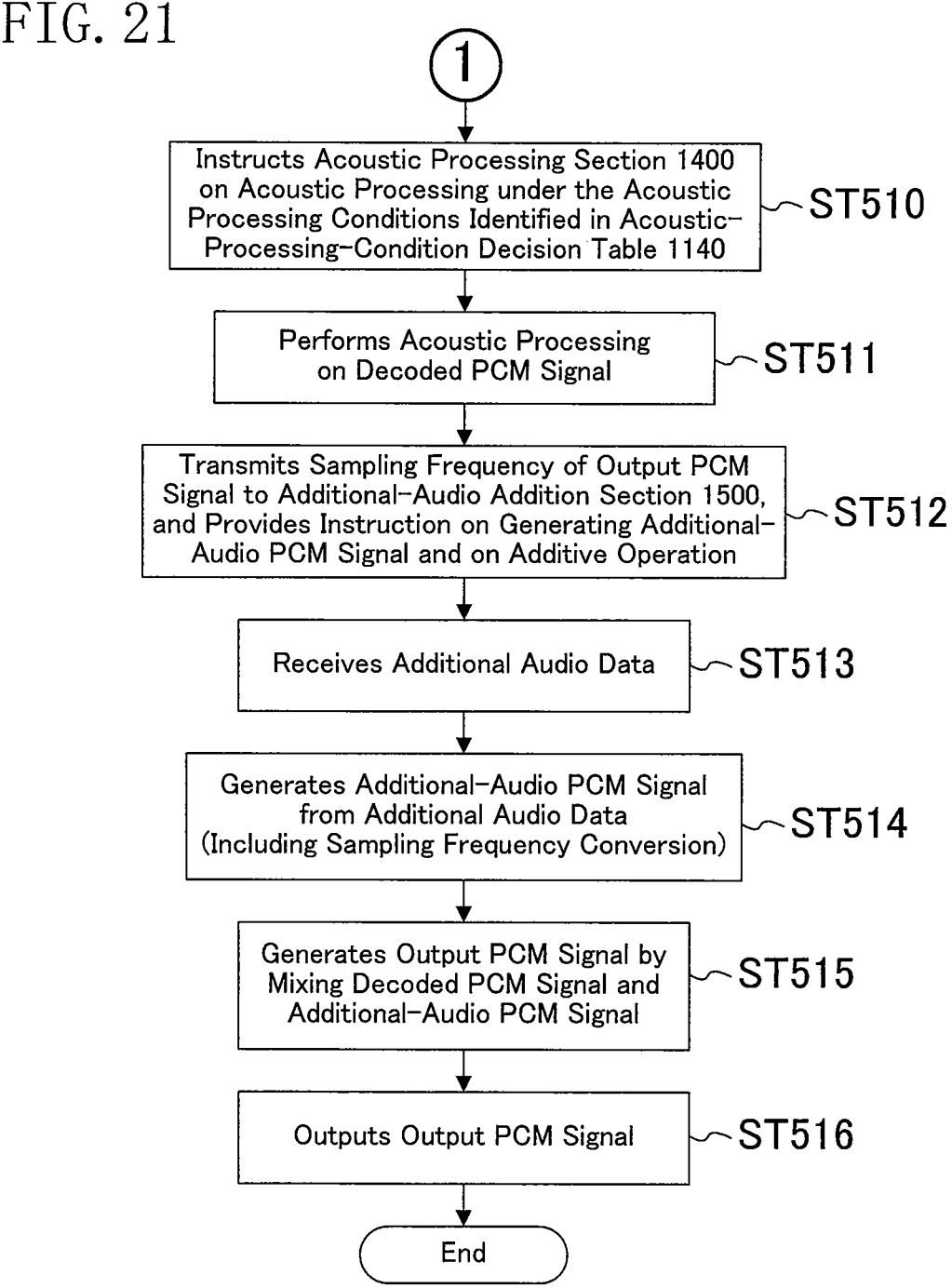
FIG. 21 is a flowchart showing a procedure of the sound reproducing device according to the fifth embodiment.
Figure 38:
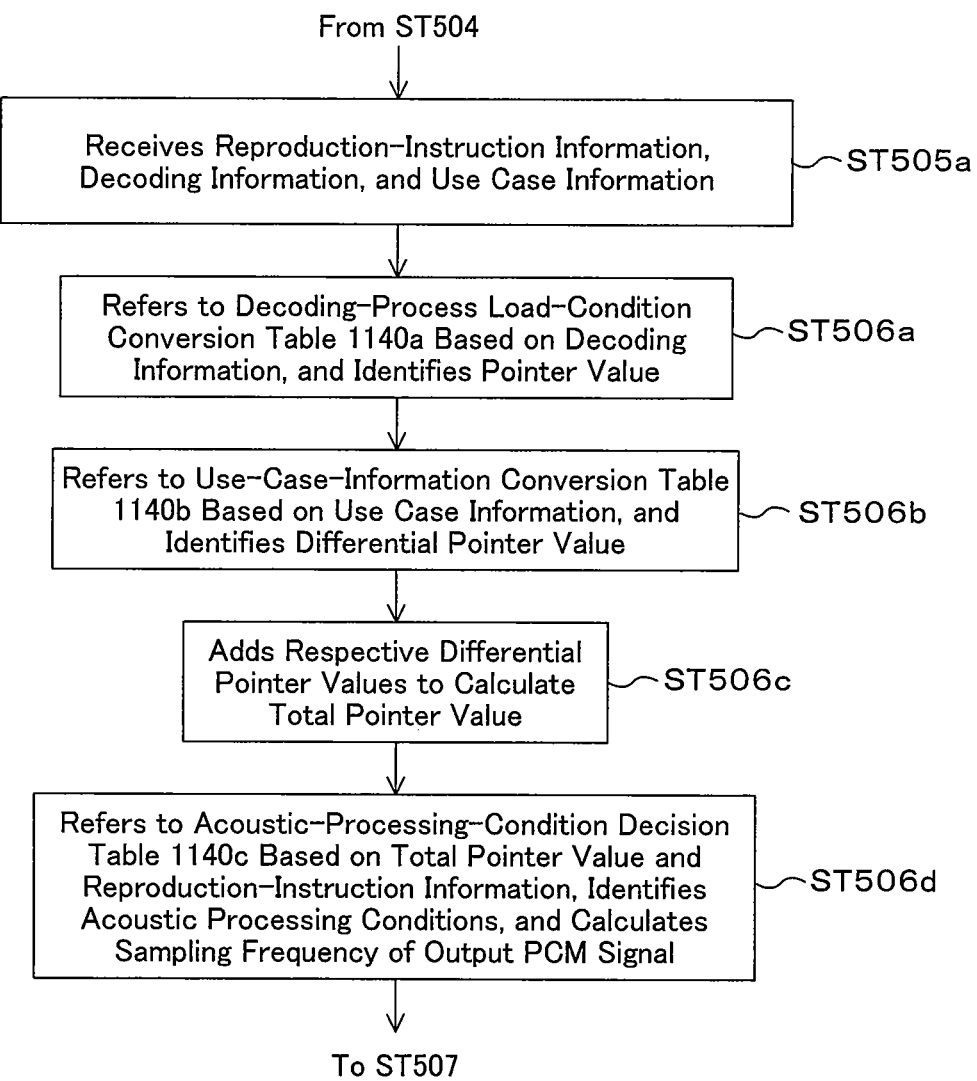
FIG. 38 is a flowchart showing a procedure of the sound reproducing device according to the tenth embodiment.

The process flow performed by the sound reproducing device of this embodiment is very similar to that of the flowchart shown in FIGS. 20-21. However, this embodiment is different in that step ST505a (FIG. 38) is executed instead of the step ST505 (FIG. 20), and in that steps ST506a, ST506b, ST506c, and ST506d (FIG. 38) are executed instead of the step ST506 (FIG. 20). The operation in these different steps will be described below.

At step ST505a, the control section 1100 also receives the use case information, in addition to the reproduction-instruction information, from the outside world, and receives the decoding information from the decoder section 1200.

At step ST506a, the control section 1100 refers to the decoding-process load-condition conversion table 1140a (FIG. 37), and identified a pointer value associated with the decoding information received at step ST505a.

At step ST506b, the control section 1100 refers to the use-case-information conversion table 1140b (FIG. 37), and identified a differential pointer value associated with the use case information received at step ST505a.

At step ST506c, the control section 1100 adds the pointer value identified at step ST506a with the differential pointer value identified at step ST506b to calculates a total pointer value.

At step ST506d, the control section 1100 refers to the acoustic-processing load-condition decision table 1140c (FIG. 37), and identifies an acoustic processing condition associated with the total pointer value calculated at step ST506c and with the reproduction-instruction information received at step ST505a.

Eleventh Embodiment

A sound reproducing device according to the eleventh embodiment is assumed to be in a form in which the sound reproducing device 6000 (FIG. 23) of the sixth embodiment is implemented on a single processor (system) together with other processing devices, and has a similar configuration thereto.

However, in this embodiment, the control section 1100 includes therein a decoding-process load-condition conversion table 1150a, a use-case-information conversion table 1150b, and a process-flow decision table 1150c. The control section 1100 refers to these tables 1150a, 1150b, and 1150c based on the decoding information, the reproduction-instruction information, and the use case information, and determines the processing order with respect to the sampling-frequency conversion section 1300, the acoustic processing section 1400, and the additional-audio addition section 1500.

FIG. 39 shows contents of the decoding-process load-condition conversion table 1150a, the use-case-information conversion table 1150b, and the process-flow decision table 1150c. In the decoding-process load-condition conversion table 1150a, the decoding information and pointer values are associated. In the use-case-information conversion table 1150b, the use case information and differential pointer values are associated. In the process-flow decision table 1150c, combinations of total pointer values and the reproduction-instruction information and the processing orders are associated.

Figure 24:
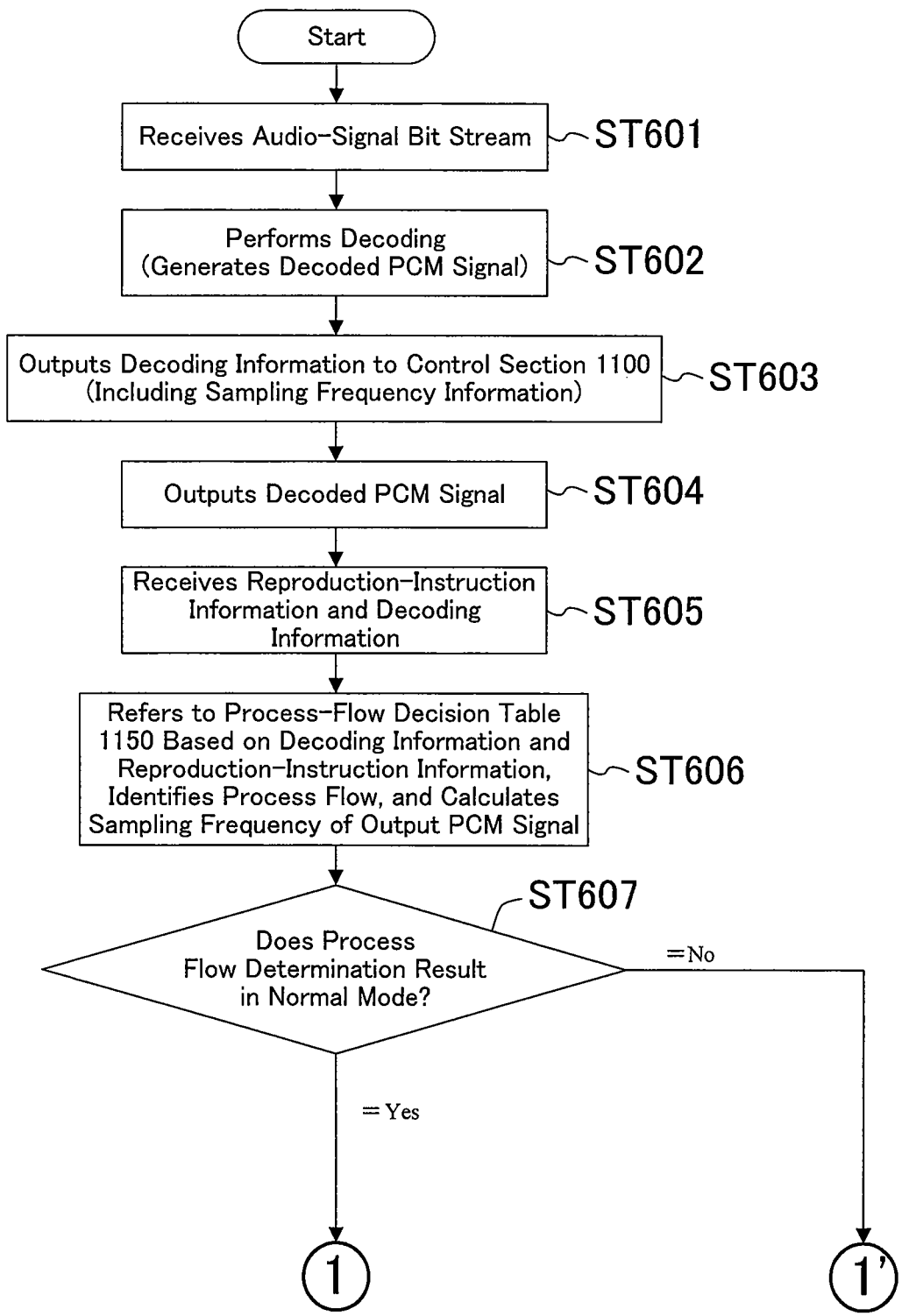
FIG. 24 is a flowchart showing a procedure of the sound reproducing device according to the sixth embodiment.
Figure 25:
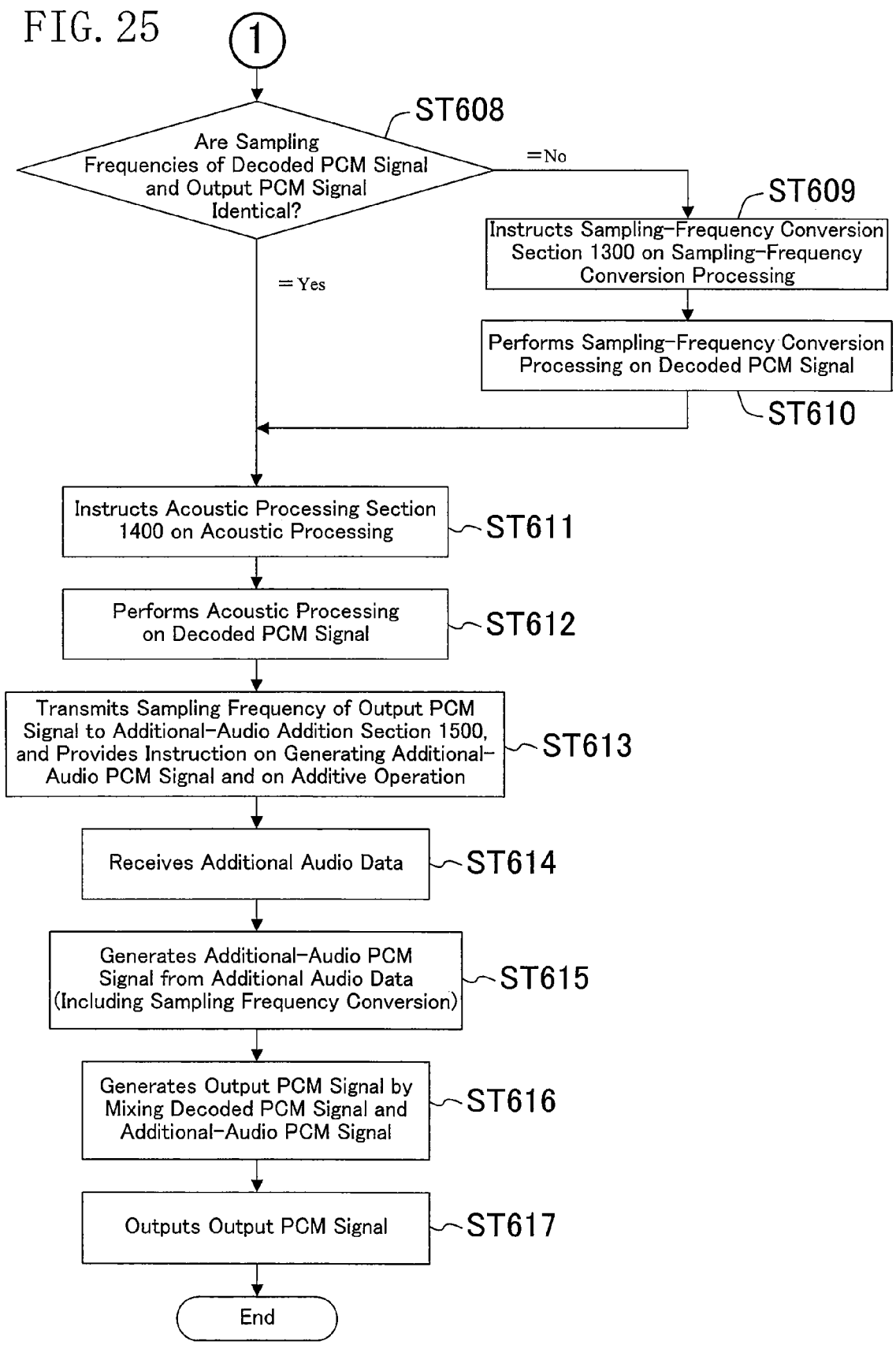
FIG. 25 is a flowchart showing a procedure of the sound reproducing device according to the sixth embodiment.
Figure 26:
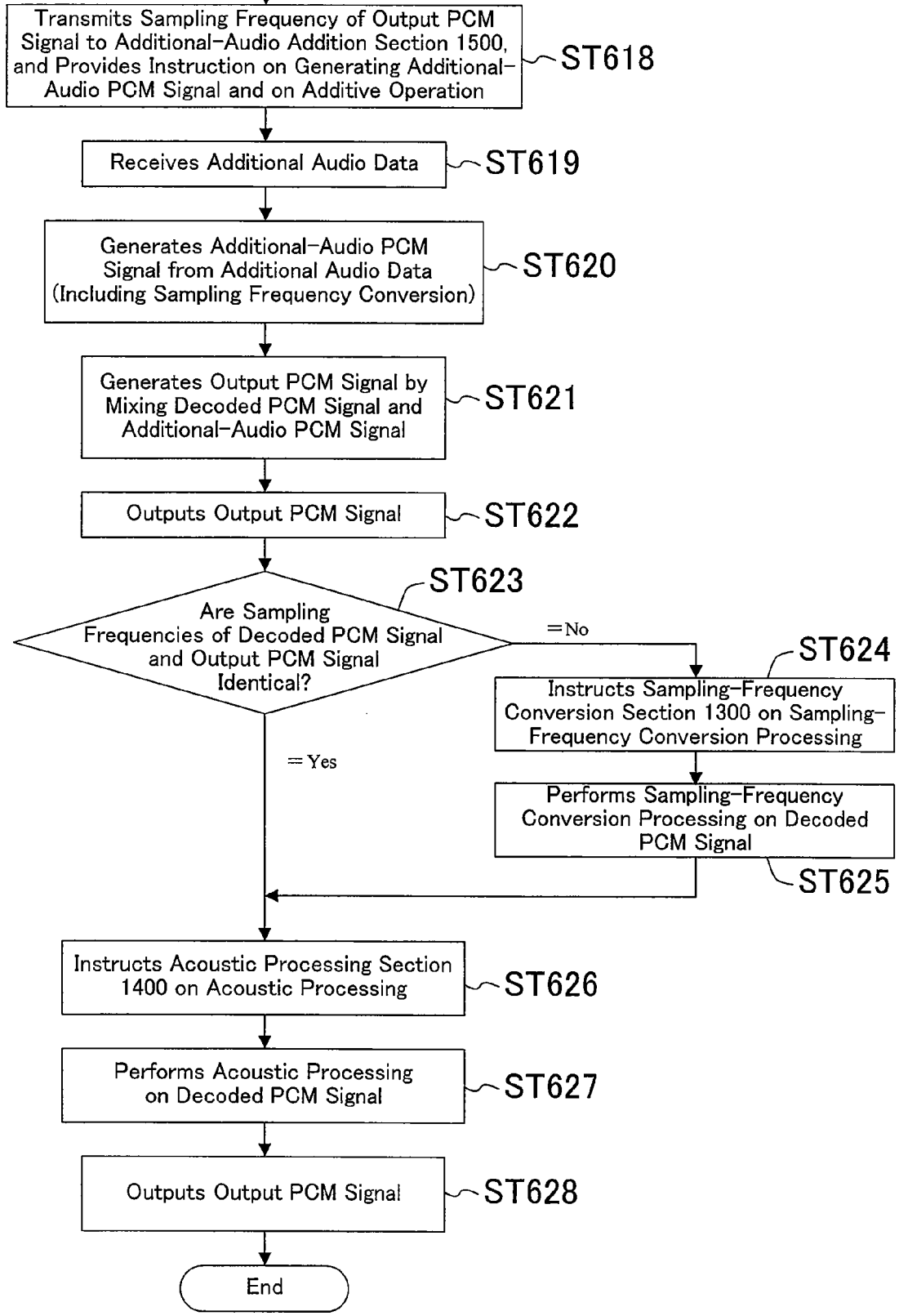
FIG. 26 is a flowchart showing a procedure of the sound reproducing device according to the sixth embodiment.
Figure 40:
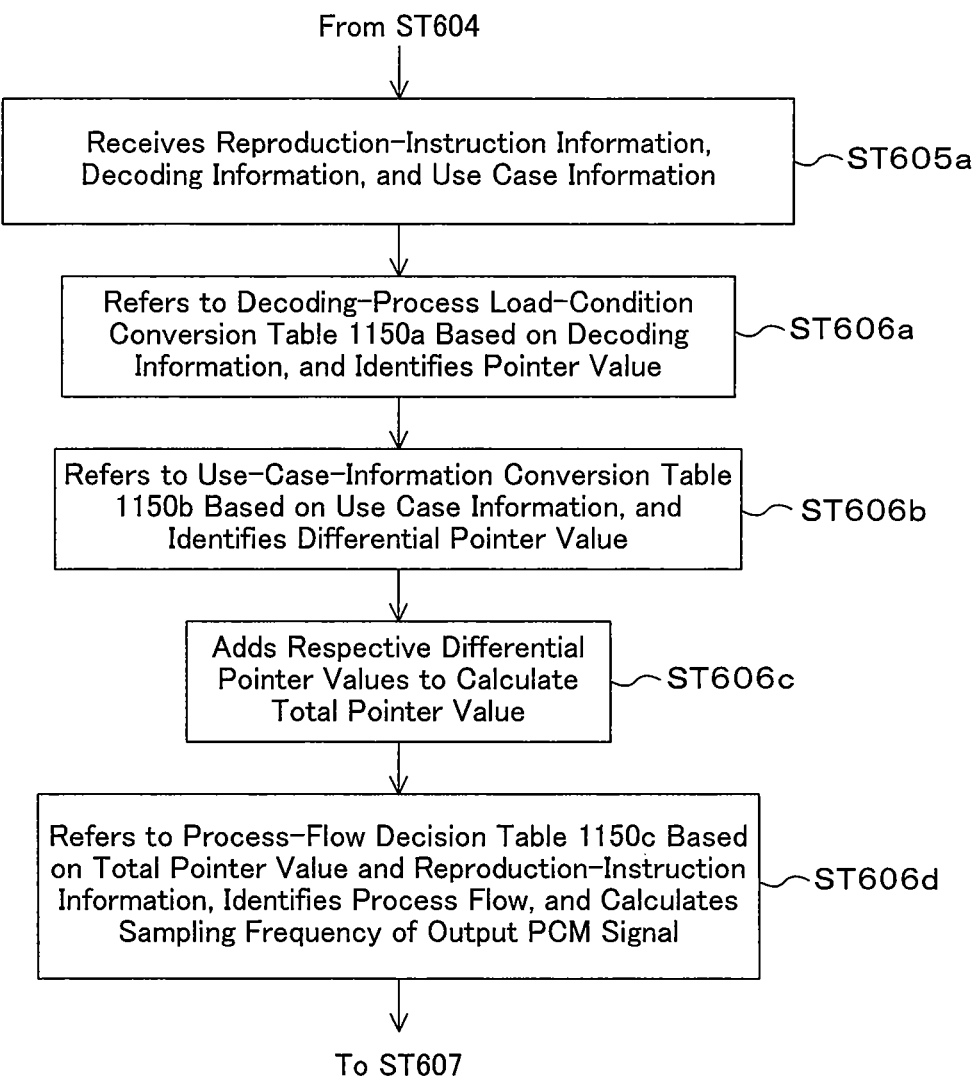
FIG. 40 is a flowchart showing a procedure of the sound reproducing device according to the eleventh embodiment.
Figure 41:
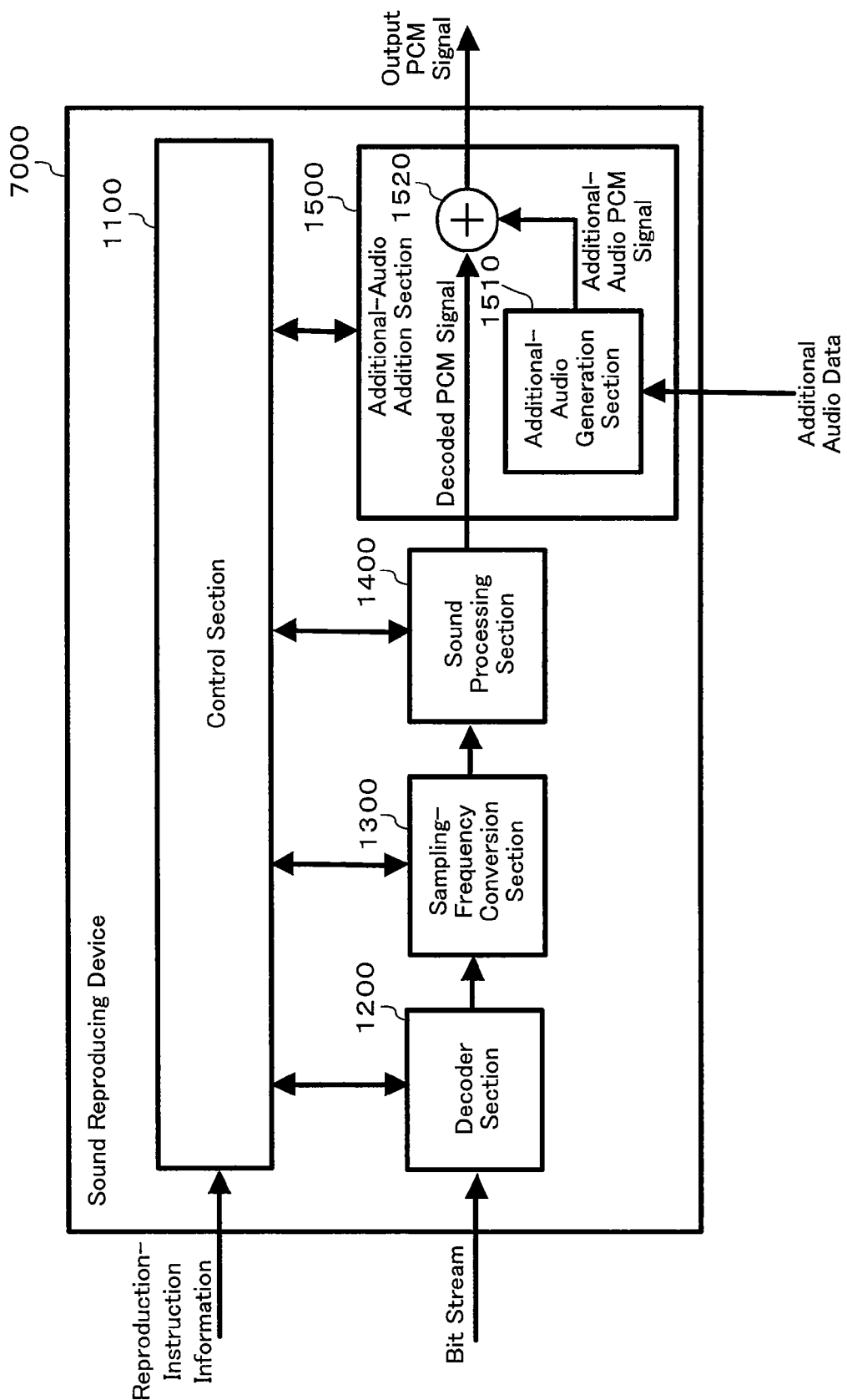
FIG. 41 is a block diagram illustrating an example configuration of a conventional sound reproducing device.
Figure 42:
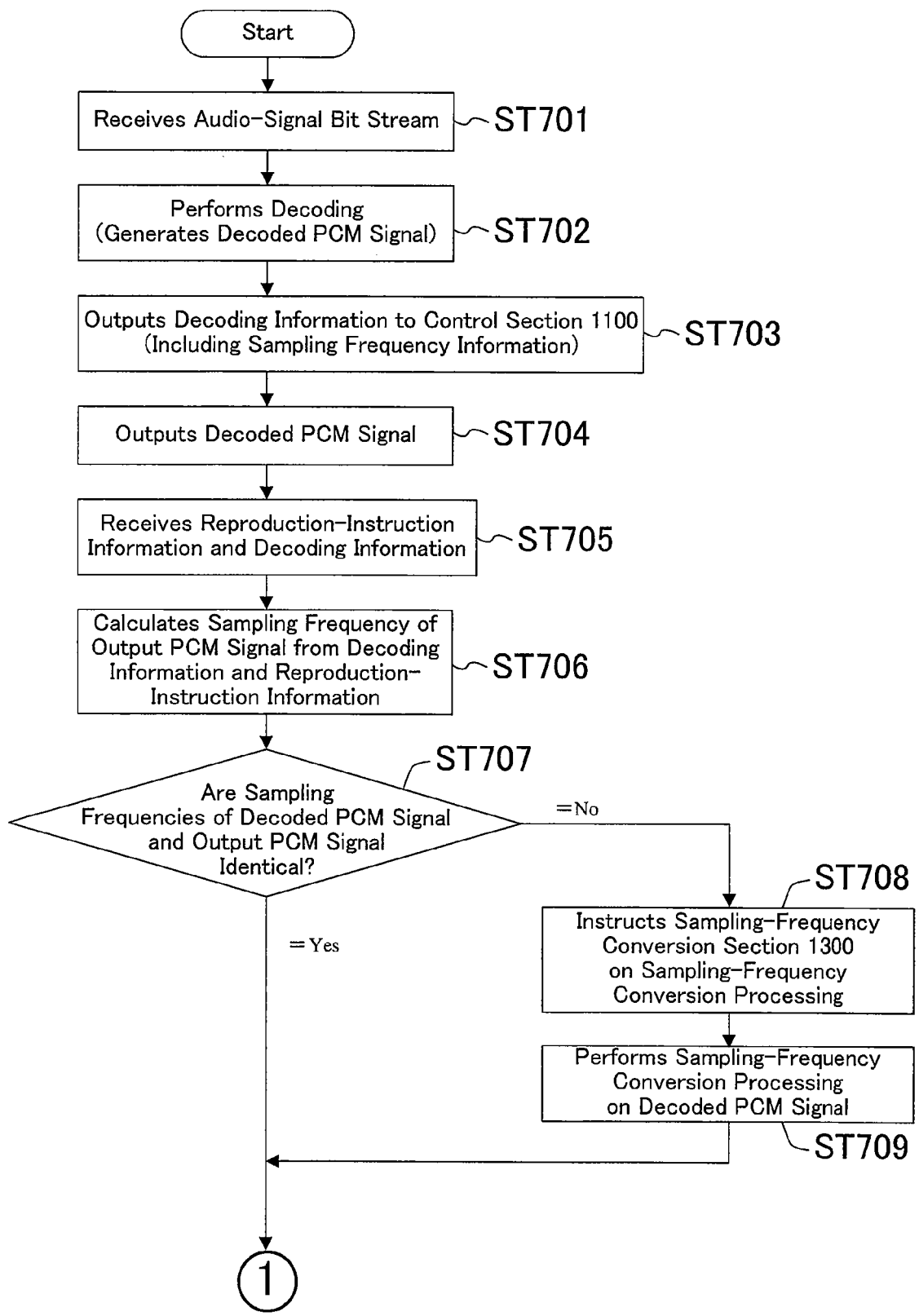
FIG. 42 is a flowchart showing a procedure of a conventional sound reproducing device.
Figure 43:
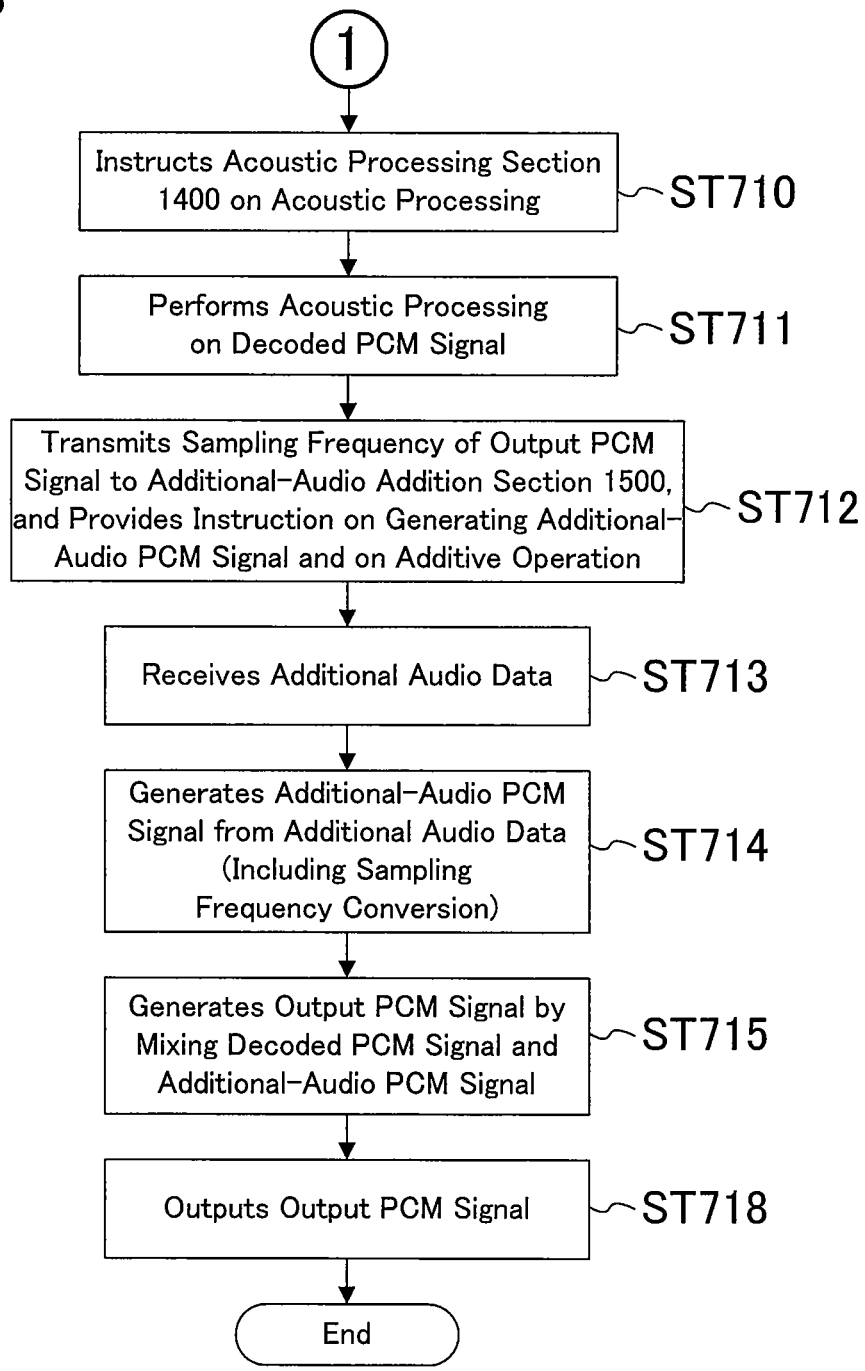
FIG. 43 is a flowchart showing a procedure of a conventional sound reproducing device.

The process flow performed by the sound reproducing device of this embodiment is very similar to that of the flowchart shown in FIGS. 24-26. However, this embodiment is different in that step ST605a (FIG. 40) is executed instead of the step ST605 (FIG. 24), and in that steps ST606a, ST606b, ST606c, and ST606d (FIG. 40) are executed instead of the step ST606 (FIG. 24). The operation in these different steps will be described below.

At step ST605a, the control section 1100 also receives the use case information, in addition to the reproduction-instruction information, from the outside world, and receives the decoding information from the decoder section 1200.

At step ST606a, the control section 1100 refers to the decoding-process load-condition conversion table 1150a (FIG. 39), and identifies a pointer value associated with the decoding information received at step ST605a.

At step ST606b, the control section 1100 refers to the use-case-information conversion table 1150b (FIG. 39), and identifies a differential pointer value associated with the use case information received at step ST605a.

At step ST606c, the control section 1100 adds the pointer value identified at step ST606a with the differential pointer value identified at step ST606b to calculates a total pointer value.

At step ST606d, the control section 1100 refers to the process-flow decision table 1150c (FIG. 39), and identifies a process flow associated with the total pointer value calculated at step ST606c and with the reproduction-instruction information received at step ST605a.

INDUSTRIAL APPLICABILITY

According to the present invention, even when the processing load increases depending on a decoding process and/or a reproduction condition, the processing load can be attempted to be reduced internally and automatically; therefore, the limitation of processing capability and sound quality degradation which occur for every decoding condition for various bit streams and every reproduction condition of acoustic processing can be minimized, and a mixing process with additional audio can be achieved as easily as possible and in an optimal condition.

The invention claimed is:

1. A sound reproducing device, comprising:
a decoder section configured to decode an audio-signal bit stream input from the outside world, and to generate a decoded PCM signal;
a control section configured to identify reproduction conditions from reproduction-instruction information obtained from the outside world and decoding information obtained from the decoder section, and to provide a reproduction instruction; and
an additional-audio addition section configured to process additional audio data input from the outside world, to add a result with the decoded PCM signal, and to output a result as an output PCM signal,
wherein the additional-audio addition section includes
an additional-audio generation section configured to process the additional audio data so that the additional audio data can be added with the decoded PCM signal, and to output a result as an additional-audio PCM signal, and
an adder configured to mix the additional-audio PCM signal and the decoded PCM signal,
the additional-audio generation section includes
a plurality of processing means depending on a trade-off between the amount of load of computation process in the processing and acoustic properties of a processing result,
the control section identifies one of the plurality of processing means based on the reproduction-instruction information and the decoding information, and
the additional-audio generation section processes the additional audio data by the processing means identified by the control section.

2. The sound reproducing device of claim 1, further comprising:
a sampling-frequency conversion section configured to perform sampling-frequency conversion processing on the decoded PCM signal according to the reproduction instruction transmitted from the control section.

3. The sound reproducing device of claim 1 or 2, further comprising:
an acoustic processing section configured to perform acoustic processing on the decoded PCM signal according to the reproduction instruction transmitted from the control section.

4. The sound reproducing device of claim 1 or 2, wherein the control section includes an external-audio generation-condition decision table in which combinations of the decoding information and the reproduction-instruction information and ones of the plurality of processing means are associated.

5. The sound reproducing device of claim 1 or 2, wherein the sound reproducing device is implemented on a single processor (system) together with other processing devices, and the control section identifies the one of the plurality of processing means based on system load information and on the reproduction-instruction information obtained from the outside world, and on the decoding information.

6. A sound reproducing device, comprising:
a decoder section configured to decode an audio-signal bit stream input from the outside world, and to generate a decoded PCM signal;
a control section configured to identify reproduction conditions from reproduction-instruction information obtained from the outside world and decoding information obtained from the decoder section, and to provide a reproduction instruction;
an acoustic processing section configured to perform acoustic processing on the decoded PCM signal generated in the decoder section; and
an additional-audio addition section configured to process additional audio data input from the outside world, to add a result with the decoded PCM signal on which the acoustic processing is performed by the acoustic processing section, and to output a result as an output PCM signal,
wherein the additional-audio addition section includes
an additional-audio generation section configured to process the additional audio data input from the outside world so that the additional audio data can be added with the decoded PCM signal, and to output a result as an additional-audio PCM signal, and
an adder configured to mix the additional-audio PCM signal and the decoded PCM signal,
the control section identifies processing load based on the reproduction-instruction information and the decoding information, and identifies acoustic processing conditions in the acoustic processing section according to the processing load, and the acoustic processing section performs the acoustic processing on the decoded PCM signal according to the acoustic processing conditions identified by the control section.

7. The sound reproducing device of claim 6, wherein the control section includes an acoustic-processing-condition decision table in which combinations of the decoding information and the reproduction-instruction information and the acoustic processing conditions are associated.

8. The sound reproducing device of claim 6 or 7, further comprising:
a sampling-frequency conversion section configured to perform sampling-frequency conversion processing on the decoded PCM signal generated in the decoder section, according to the reproduction instruction transmitted from the control section.

9. The sound reproducing device of claim 6, wherein
the sound reproducing device is implemented on a single processor (system) together with other processing devices, and
the control section identifies processing load based on system load information and on the reproduction-instruction information obtained from the outside world, and on the decoding information, and identifies the acoustic processing conditions in the acoustic processing section according to the processing load.

10. A sound reproducing device, comprising:
a decoder section configured to decode an audio-signal bit stream input from the outside world, and to generate a decoded PCM signal;
a control section configured to identify reproduction conditions from reproduction-instruction information obtained from the outside world and decoding information obtained from the decoder section, and to provide a reproduction instruction;
a sampling-frequency conversion section configured to perform sampling-frequency conversion processing on the decoded PCM signal generated in the decoder section, according to the reproduction instruction transmitted from the control section;
an acoustic processing section configured to perform acoustic processing on the decoded PCM signal output from the decoder section or output from the sampling-frequency conversion section, according to the reproduction instruction transmitted from the control section; and
an additional-audio addition section configured to process additional audio data input from the outside world, to add a result with the decoded PCM signal output from the decoder section or output from the acoustic processing section, and to output a result as an output PCM signal,
wherein the additional-audio addition section includes
an additional-audio generation section configured to process the additional audio data input from the outside world so that the additional audio data can be added with the decoded PCM signal, and to output a result as an additional-audio PCM signal, and
an adder configured to mix the additional-audio PCM signal and the decoded PCM signal, and
the control section identifies processing load based on the reproduction-instruction information and the decoding information, and determines, depending on the processing load, a processing order of the sampling-frequency conversion processing by the sampling-frequency conversion section and the processing and the additive processes of the additional audio data by the additional-audio addition section.

11. The sound reproducing device of claim 10, wherein the control section includes a process-flow decision table in which combinations of the decoding information and the reproduction-instruction information, and the processing order of the sampling-frequency conversion processing by the sampling-frequency conversion section and the processing and the additive processes of the additional audio data by the additional-audio addition section are associated.

12. The sound reproducing device of claim 10, wherein
the sound reproducing device is implemented on a single processor (system) together with other processing devices, and
the control section identifies processing load based on system load information and on the reproduction-instruction information obtained from the outside world, and on the decoding information, and determines, depending on the processing load, a processing order of the sampling-frequency conversion processing by the sampling-frequency conversion section and the processing and the additive processes of the additional audio data by the additional-audio addition section.

13. A sound reproducing device, comprising:
a decoder section configured to decode an audio-signal bit stream input from the outside world, and to generate a decoded PCM signal;
a control section configured to identify reproduction conditions from reproduction-instruction information obtained from the outside world and decoding information obtained from the decoder section, and to provide a reproduction instruction;
an internally-installed-additional-audio-data buffer configured to store additional audio data installed in the sound reproducing device (internally-installed additional audio data); and
an additional-audio addition section configured to process additional audio data input from the outside world (externally-input additional audio data) or the internally-installed additional audio data, to add a result with the decoded PCM signal, and to output a result as an output PCM signal,
wherein the control section identifies the externally-input additional audio data or the internally-installed additional audio data based on the reproduction-instruction information and the decoding information, and
the additional-audio addition section includes
an additional-audio generation section configured to process the externally-input additional audio data or the internally-installed additional audio data, whichever has been identified by the control section, so that the identified additional audio data can be added with the decoded PCM signal, and to output a result as an additional-audio PCM signal, and
an adder configured to mix the additional-audio PCM signal and the decoded PCM signal, and
wherein the sound reproducing device is implemented on a single processor (system) together with other processing devices, and
the control section identifies the externally-input additional audio data or the internally-installed additional audio data based on system load information and on the reproduction-instruction information obtained from the outside world, and on the decoding information.

14. The sound reproducing device of claim 13, further comprising:
- a sampling-frequency conversion section configured to perform sampling-frequency conversion processing on the decoded PCM signal according to the reproduction instruction transmitted from the control section.

15. The sound reproducing device of claim 13 or 14, further comprising:
- an acoustic processing section configured to perform acoustic processing on the decoded PCM signal according to the reproduction instruction transmitted from the control section.

16. The sound reproducing device of claim 13 or 14, wherein the control section includes an external-audio generation-condition decision table in which combinations of the decoding information and the reproduction-instruction information and information indicating the externally-input additional audio data or the internally-installed additional audio data are associated.

17. A sound reproducing device, comprising:
- a decoder section configured to decode an audio-signal bit stream input from the outside world, and to generate a decoded PCM signal;
- a control section configured to identify reproduction conditions from reproduction-instruction information obtained from the outside world and decoding information obtained from the decoder section, and to provide a reproduction instruction;
- an additional-audio addition section configured to process additional audio data input from the outside world, to add a result with the decoded PCM signal, and to output a result as an output PCM signal; and
- a PCM output buffer configured to accumulate the output PCM signals output from the additional-audio addition section, wherein the additional-audio addition section includes
- an additional-audio generation section configured to process the additional audio data so that the additional audio data can be added with the decoded PCM signal, and to output a result as an additional-audio PCM signal, and
- an adder configured to mix the additional-audio PCM signal and the decoded PCM signal, the additional-audio generation section includes
- a plurality of processing means depending on a trade-off between the amount of load of computation process in the processing and acoustic properties of a processing result, the control section includes a PCM-output-buffer remaining-amount monitoring means configured to monitor a remaining amount of the output PCM signals of the PCM output buffer, and identifies one of the plurality of processing means based on the remaining amount status of the output PCM signals of the PCM output buffer, and the additional-audio generation section processes the additional audio data by the processing means identified by the control section.

18. A sound reproducing device, comprising:
- a decoder section configured to decode an audio-signal bit stream input from the outside world, and to generate a decoded PCM signal;
- a control section configured to identify reproduction conditions from reproduction-instruction information obtained from the outside world and decoding information obtained from the decoder section, and to provide a reproduction instruction;
- an additional-audio-data input buffer configured to accumulate additional audio data input from the outside world; and
- an additional-audio addition section configured to process the additional audio data accumulated in the additional-audio-data input buffer, to add a result with the decoded PCM signal, and to output a result as an output PCM signal, wherein the additional-audio addition section includes
- an additional-audio generation section configured to process the additional audio data so that the additional audio data can be added with the decoded PCM signal, and to output a result as an additional-audio PCM signal, and
- an adder configured to mix the additional-audio PCM signal and the decoded PCM signal, the additional-audio generation section includes
- a plurality of processing means depending on a trade-off between the amount of load of computation process in the processing and acoustic properties of a processing result, the control section includes an additional-audio-data-input-buffer remaining-amount monitoring means configured to monitor a remaining amount of the additional audio data of the additional-audio-data input buffer, and identifies one of the plurality of processing means based on the remaining amount status of the additional audio data of the additional-audio-data input buffer, and the additional-audio generation section processes the additional audio data by the processing means identified by the control section.

* * * * *